United States Patent
Fick et al.

(10) Patent No.: US 9,492,768 B2
(45) Date of Patent: Nov. 15, 2016

(54) FILTER APPARATUS

(75) Inventors: Walter J. Fick, Kearney, NE (US);
John H. Beard, Kearney, NE (US);
James N. Marshall, Elm Creek, NE (US); Joshua L. Quackenbush, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 2873 days.

(21) Appl. No.: 11/358,478

(22) Filed: Feb. 21, 2006

(65) Prior Publication Data

US 2006/0186031 A1    Aug. 24, 2006

Related U.S. Application Data

(60) Provisional application No. 60/655,178, filed on Feb. 22, 2005.

(51) Int. Cl.
*B01D 29/11* (2006.01)
*B01D 35/147* (2006.01)
(Continued)

(52) U.S. Cl.
CPC ............ *B01D 29/118* (2013.01); *B01D 29/21* (2013.01); *B01D 35/147* (2013.01); *B01D 36/003* (2013.01); *B01D 37/025* (2013.01); *B01D 2201/0407* (2013.01); *B01D 2201/0415* (2013.01); *B01D 2201/12* (2013.01); *B01D 2201/127* (2013.01); *B01D 2201/28* (2013.01);
(Continued)

(58) Field of Classification Search
CPC B01D 29/118; B01D 35/147; B01D 37/025; B01D 36/003; B01D 29/21; B01D 2201/40; B01D 2201/4015; B01D 2201/52; B01D 2201/4084; B01D 2201/28; B01D 2201/12; B01D 2201/0415; B01D 2201/127
USPC ................... 210/232–238, 440–446, 497.01
See application file for complete search history.

(56) References Cited

U.S. PATENT DOCUMENTS 1,761,924 A    6/1930    Kamrath
3,361,260 A    1/1968    Buckman
(Continued)

FOREIGN PATENT DOCUMENTS

DE    199 60 600 A1    6/2001
EP     0 880 987 A1    2/1998
(Continued)

OTHER PUBLICATIONS

Dahl Baldwin, Marine Diesel Fuel/Water Separators, installation pamphlet, 2005, 9 pages, pp. 1-9.

*Primary Examiner* — David C Mellon
(74) *Attorney, Agent, or Firm* — Reinhart Boerner Van Deuren P.C.

(57) ABSTRACT

A fluid filtering apparatus and method may include keyed components to ensure that a correct filter element is being installed into a filter base, and to automatically actuate a fluid valve as the filter element is rotated into place on the base. Tool-less replacement of the element is provided. An embodiment of the element may include inner and outer substantially tubular-shaped media packs disposed about an axis, with one end of each of the inner and outer media packs being attached to an end cap of the element in a manner defining a fluid flow space between the inner and outer media packs for receiving a flow of fluid directed in parallel through the inner and outer media packs. A housing of the filter apparatus may include a flow tube configured to fit into the space between the inner and outer media packs.

25 Claims, 50 Drawing Sheets

(51) Int. Cl.
  *B01D 29/21* (2006.01)
  *B01D 36/00* (2006.01)
  *B01D 37/02* (2006.01)
(52) U.S. Cl.
  CPC ... *B01D 2201/295* (2013.01); *B01D 2201/305* (2013.01); *B01D 2201/40* (2013.01); *B01D 2201/4015* (2013.01); *B01D 2201/4046* (2013.01); *B01D 2201/4084* (2013.01); *B01D 2201/52* (2013.01); *B01D 2201/60* (2013.01)

(56) References Cited

U.S. PATENT DOCUMENTS

| | | | |
|---|---|---|---|
| 3,370,708 A | 2/1968 | Hultgren et al. | |
| 3,384,241 A | 5/1968 | Nostrand | |
| 3,420,377 A | 1/1969 | Vandersip | |
| 3,988,244 A | 10/1976 | Brooks | |
| 4,372,847 A | 2/1983 | Lewis | |
| 4,812,235 A | 3/1989 | Seleman et al. | |
| 4,915,831 A | 4/1990 | Taylor | |
| 5,078,877 A | 1/1992 | Cudaback et al. | |
| 5,102,541 A | 4/1992 | Breitbach | |
| 5,114,572 A * | 5/1992 | Hunter et al. | 210/120 |
| 5,203,994 A | 4/1993 | Janik | |
| 5,259,953 A | 11/1993 | Baracchi et al. | |
| 5,302,284 A | 4/1994 | Zeiner et al. | |
| 5,342,511 A | 8/1994 | Brown et al. | |
| 5,350,506 A | 9/1994 | Dombek et al. | |
| 5,362,390 A | 11/1994 | Widenhoefer et al. | |
| 5,364,528 A | 11/1994 | Schwarz et al. | |
| 5,390,701 A | 2/1995 | Lessley et al. | |
| 5,486,288 A | 1/1996 | Stanford et al. | |
| 5,674,393 A | 10/1997 | Terhune et al. | |
| 5,698,093 A | 12/1997 | Pyle et al. | |
| 5,744,030 A | 4/1998 | Reid et al. | |
| 5,788,859 A | 8/1998 | Biere | |
| 5,817,234 A | 10/1998 | Dye et al. | |
| 5,837,137 A | 11/1998 | Janik | |
| 5,868,932 A | 2/1999 | Guichaoua et al. | |
| 5,876,600 A | 3/1999 | Matsubara et al. | |
| 5,906,737 A | 5/1999 | Hoeppner | |
| 5,938,921 A | 8/1999 | Janik et al. | |
| 5,985,142 A | 11/1999 | Belden | |
| 6,048,455 A | 4/2000 | Janik | |
| 6,068,763 A | 5/2000 | Goddard | |
| 6,171,491 B1 | 1/2001 | Popoff et al. | |
| 6,187,188 B1 | 2/2001 | Janik et al. | |
| 6,193,884 B1 | 2/2001 | Magnusson et al. | |
| 6,387,259 B1 | 5/2002 | Roll | |
| 6,485,635 B1 | 11/2002 | Gandini et al. | |
| 6,488,845 B1 | 12/2002 | Neufeld et al. | |
| 6,495,042 B1 | 12/2002 | Knight | |
| 6,500,335 B2 | 12/2002 | Janik et al. | |
| 6,506,302 B2 | 1/2003 | Janik | |
| 6,517,717 B1 | 2/2003 | Håkansson | |
| D472,299 S | 3/2003 | Fritze | |
| 6,533,933 B1 * | 3/2003 | Stankowski et al. | 210/232 |
| D472,604 S | 4/2003 | Fritze | |
| 6,565,746 B1 | 5/2003 | Stamey, Jr. et al. | |
| 6,615,990 B1 | 9/2003 | Jokschas et al. | |
| 6,652,740 B2 | 11/2003 | Schoess | |
| 6,662,954 B2 | 12/2003 | Gottwald-Grill et al. | |
| 6,673,250 B2 | 1/2004 | Kuennen et al. | |
| 6,716,348 B1 * | 4/2004 | Morgan | 210/232 |
| 6,723,239 B2 | 4/2004 | Maxwell | |
| 6,740,234 B1 | 5/2004 | Williams et al. | |
| 6,863,811 B2 | 3/2005 | Janik | |
| 6,881,334 B2 | 4/2005 | Janik | |
| 6,896,803 B2 | 5/2005 | Cline et al. | |
| 6,977,006 B2 | 12/2005 | Reid | |
| 7,042,346 B2 | 5/2006 | Paulsen | |
| 7,048,488 B1 | 5/2006 | Kuznetsov et al. | |
| 7,070,692 B2 | 7/2006 | Knight | |
| 7,081,201 B2 | 7/2006 | Bassett et al. | |
| 2002/0162782 A1 * | 11/2002 | Maxwell | 210/234 |
| 2002/0166805 A1 | 11/2002 | Minns et al. | |
| 2002/0185454 A1 | 12/2002 | Beard et al. | |
| 2003/0196947 A1 * | 10/2003 | Gundrum et al. | 210/232 |
| 2004/0144713 A1 | 7/2004 | Bassett et al. | |
| 2005/0056582 A1 | 3/2005 | Patel et al. | |
| 2005/0103692 A1 | 5/2005 | Stanhope et al. | |
| 2005/0161378 A1 | 7/2005 | Cline | |
| 2005/0161386 A1 | 7/2005 | Gustafson et al. | |
| 2005/0194317 A1 | 9/2005 | Ikeyama et al. | |
| 2006/0016745 A1 | 1/2006 | Nguyen et al. | |
| 2006/0016769 A1 | 1/2006 | Hacker et al. | |
| 2006/0054547 A1 | 3/2006 | Richmond et al. | |
| 2006/0060512 A1 | 3/2006 | Astle et al. | |
| 2006/0096934 A1 | 5/2006 | Weinberger et al. | |
| 2006/0118475 A1 | 6/2006 | Girondi | |
| 2006/0124516 A1 | 6/2006 | Merritt et al. | |
| 2006/0151371 A1 | 7/2006 | Weinberger et al. | |
| 2006/0180539 A1 | 8/2006 | Wolf et al. | |
| 2006/0191836 A1 | 8/2006 | Dworatzek et al. | |
| 2006/0219621 A1 | 10/2006 | Dworatzek | |
| 2006/0219626 A1 | 10/2006 | Dworatzek et al. | |
| 2007/0215561 A1 | 9/2007 | Yates et al. | |

FOREIGN PATENT DOCUMENTS

| | | |
|---|---|---|
| EP | 1 690 581 A1 | 8/2006 |
| JP | 09173717 | 8/1997 |
| WO | WO 02/078816 A1 | 10/2002 |
| WO | WO 2007/053228 A2 | 5/2007 |

* cited by examiner

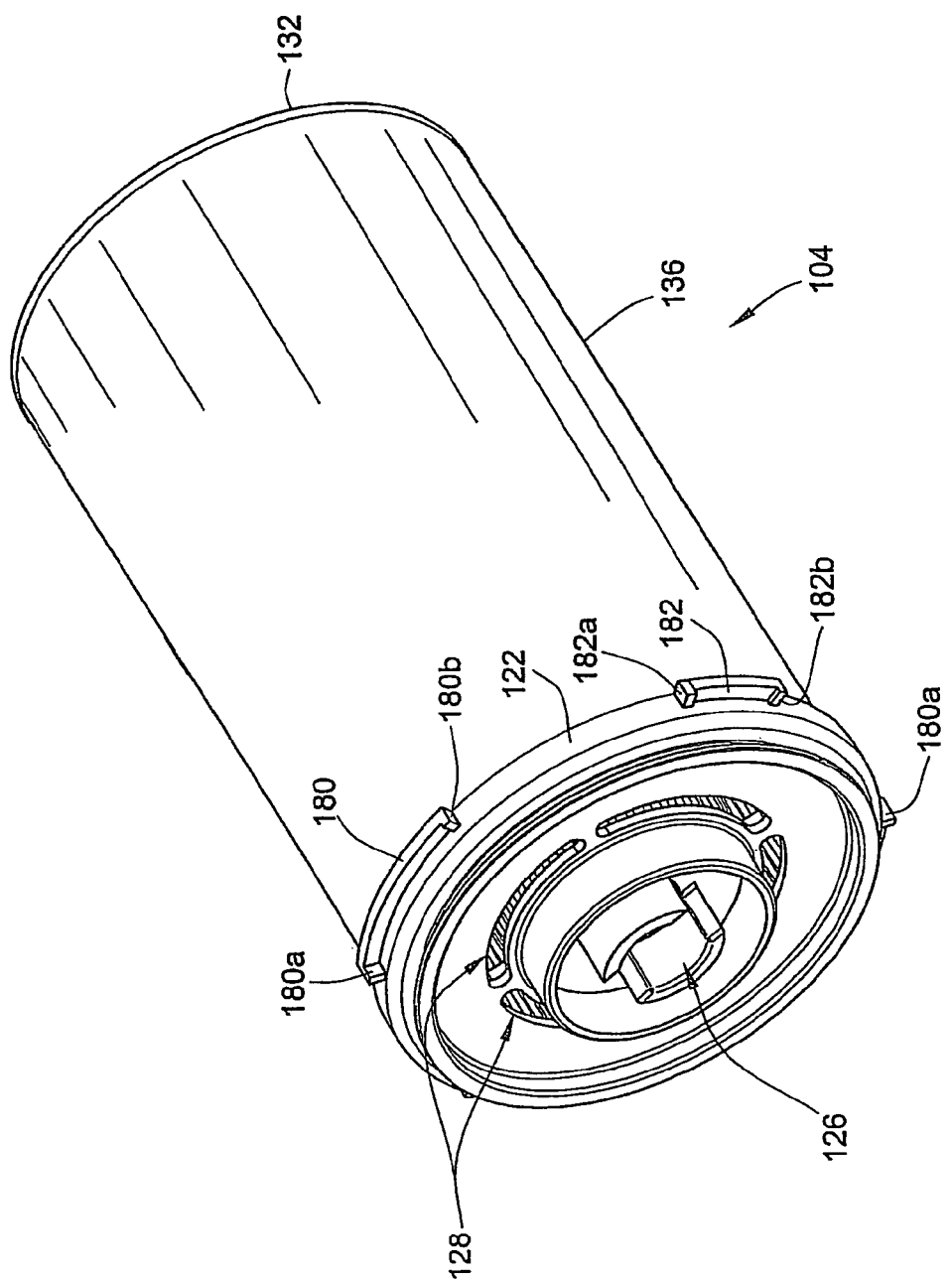

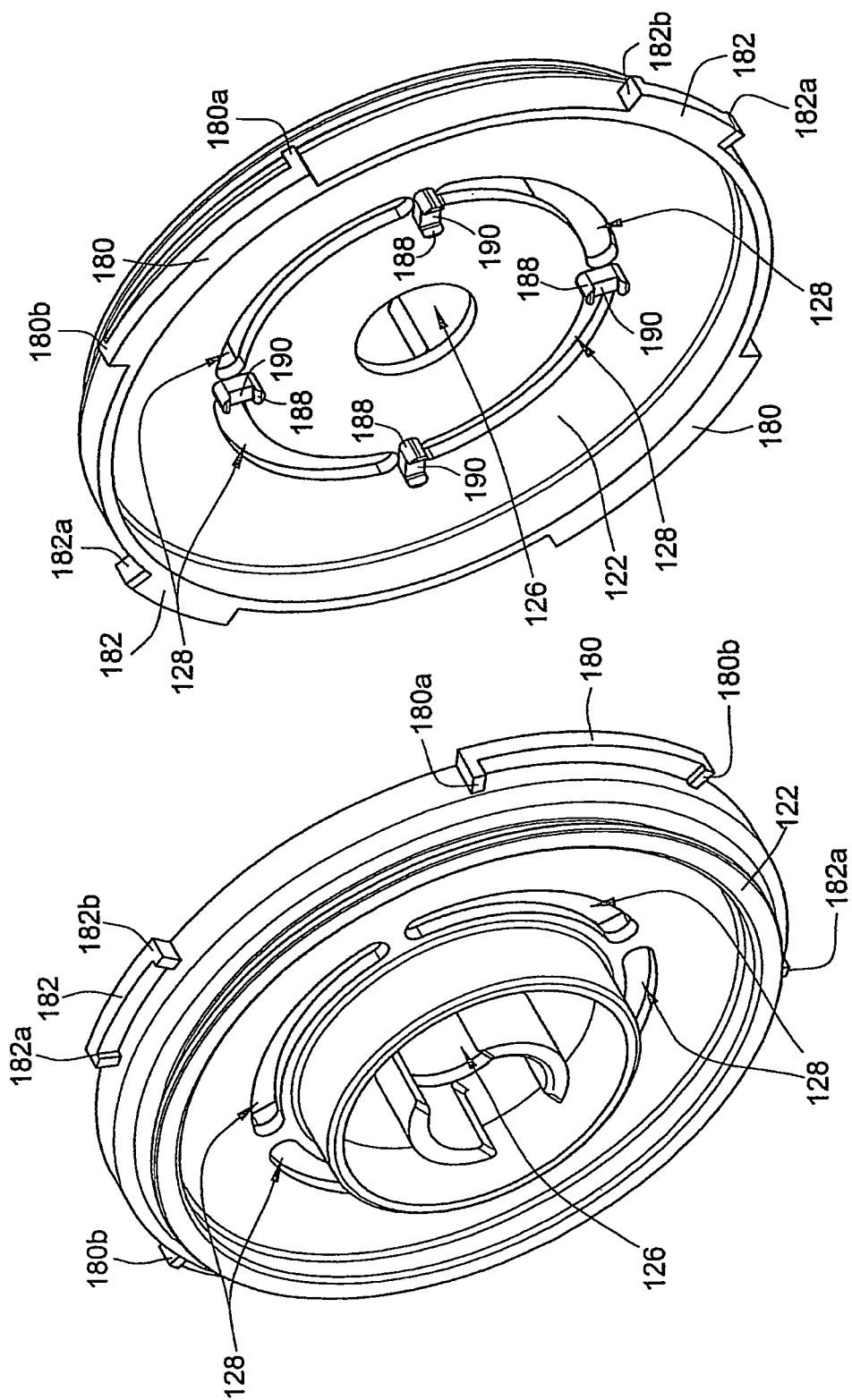

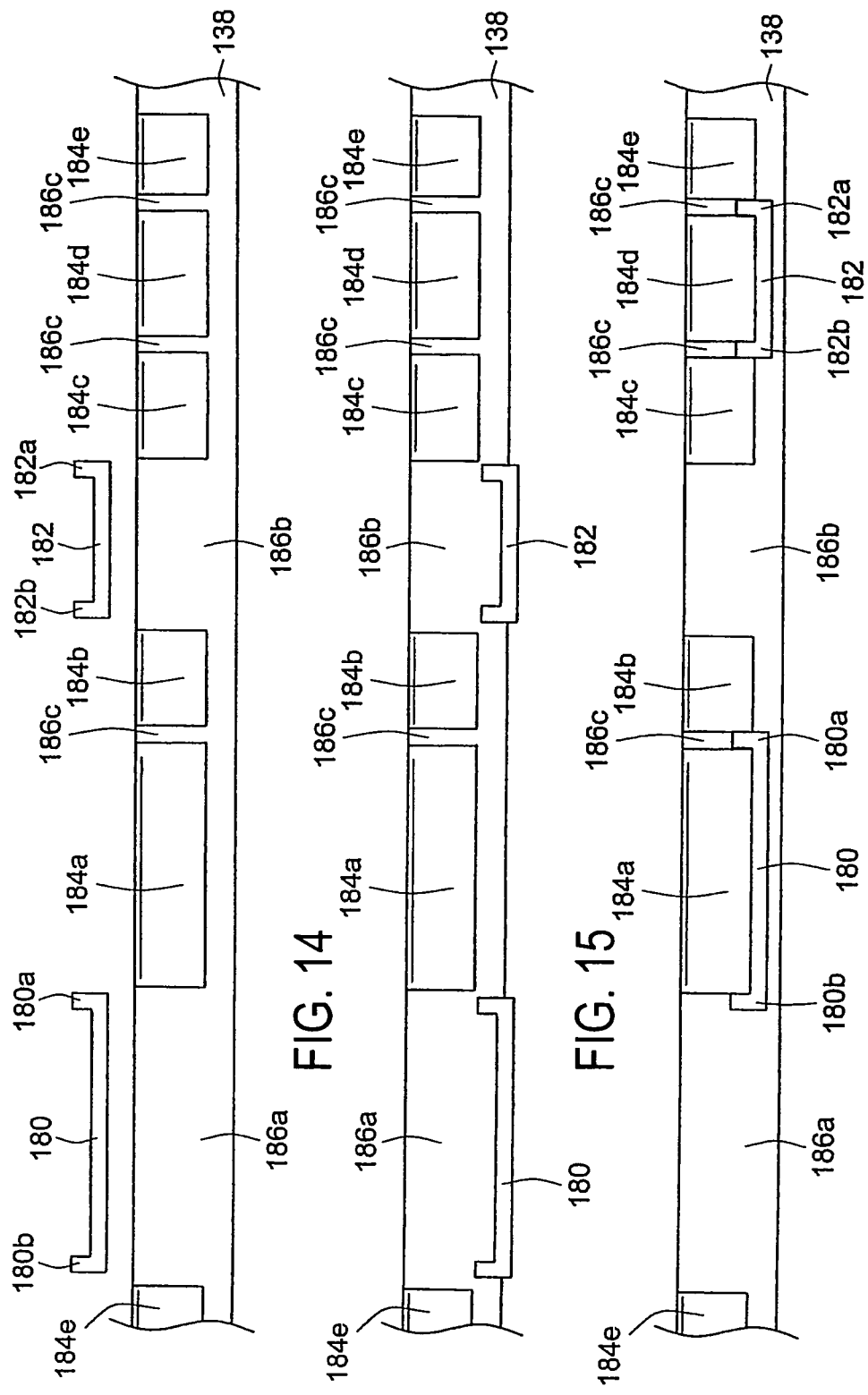

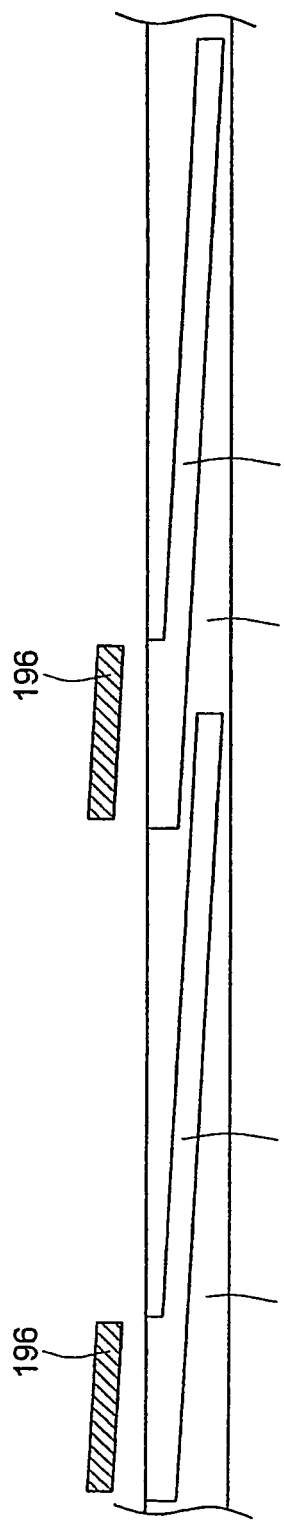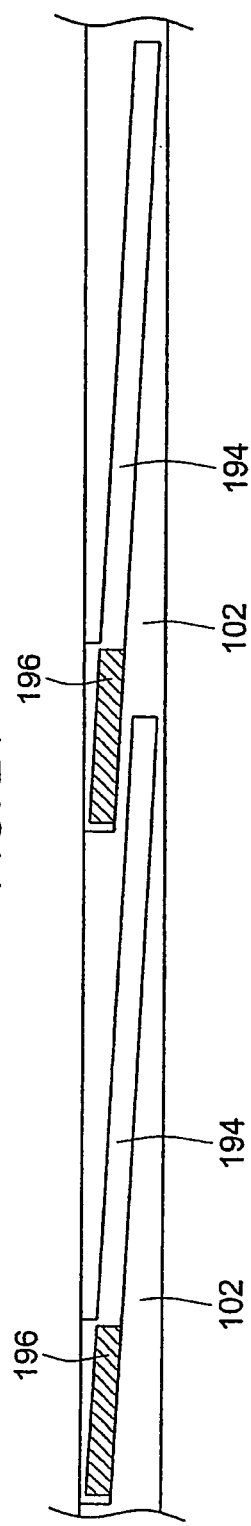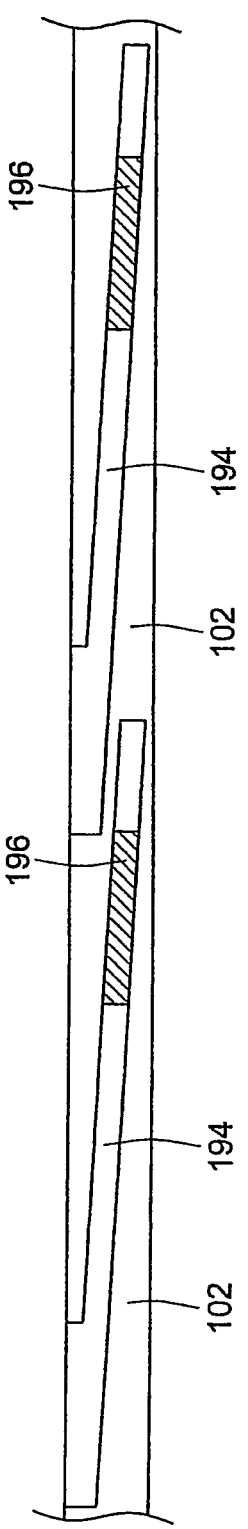

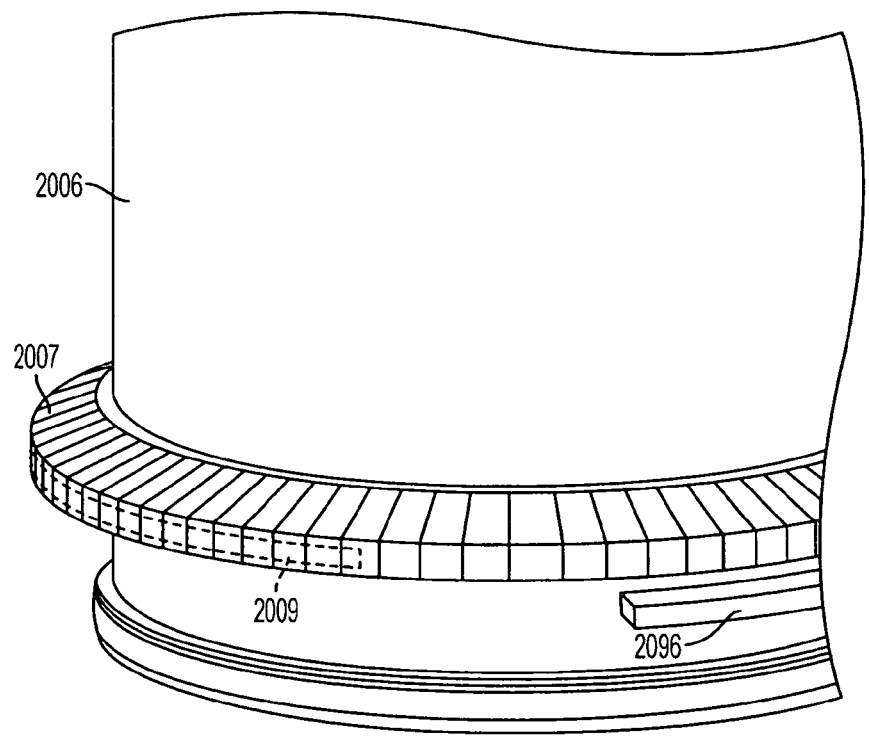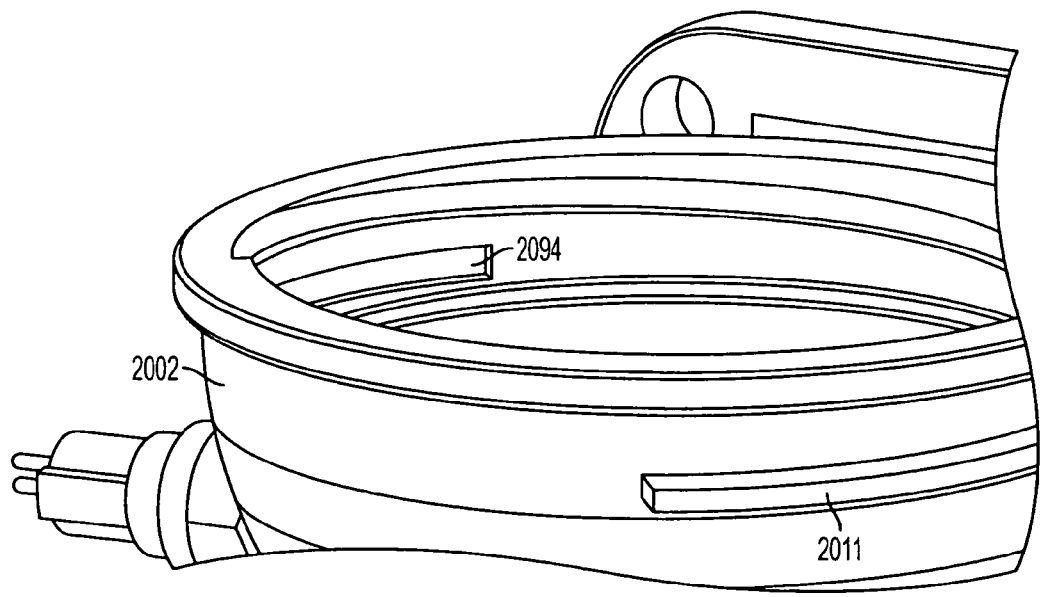
FIG. 45

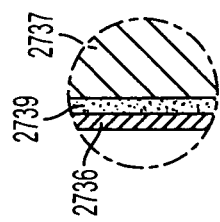
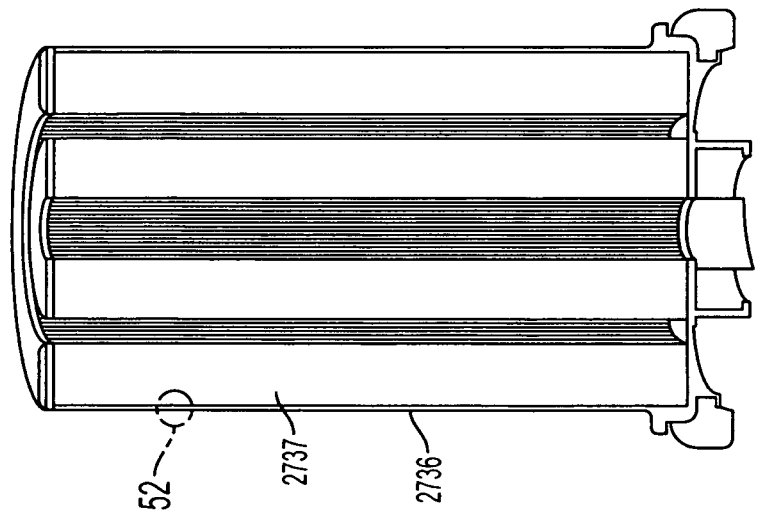

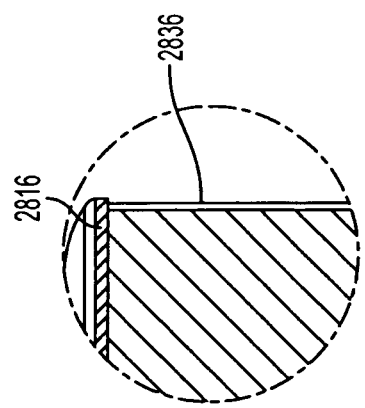
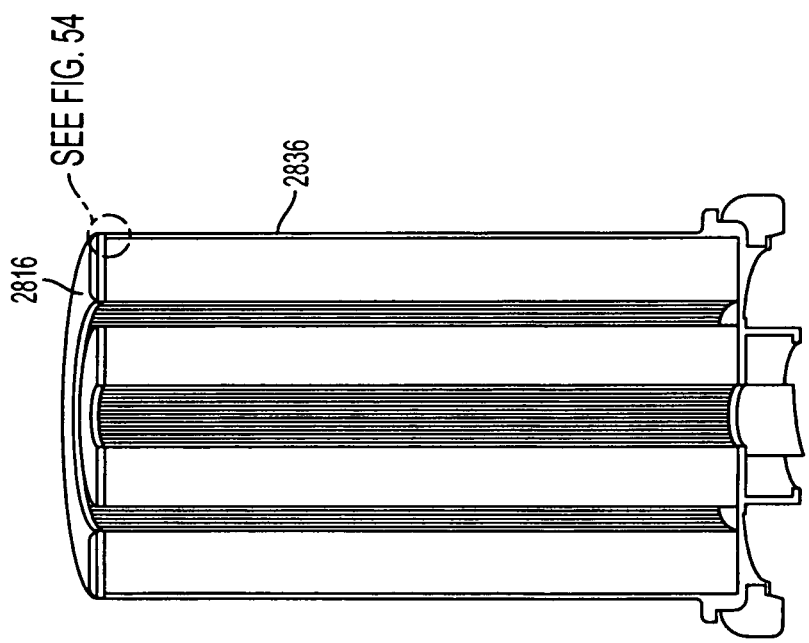

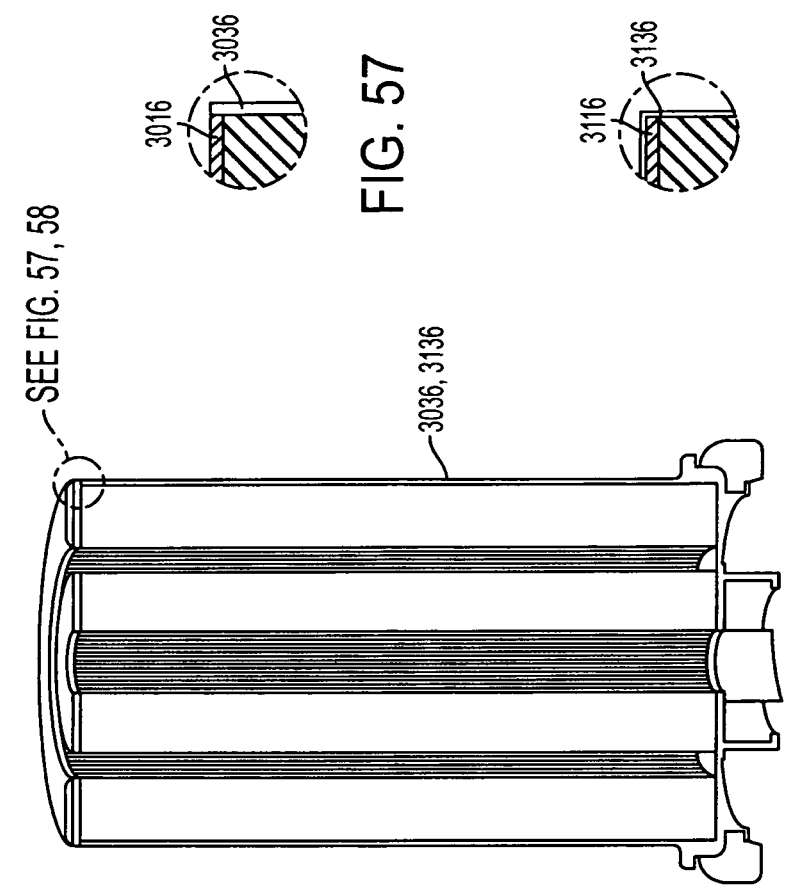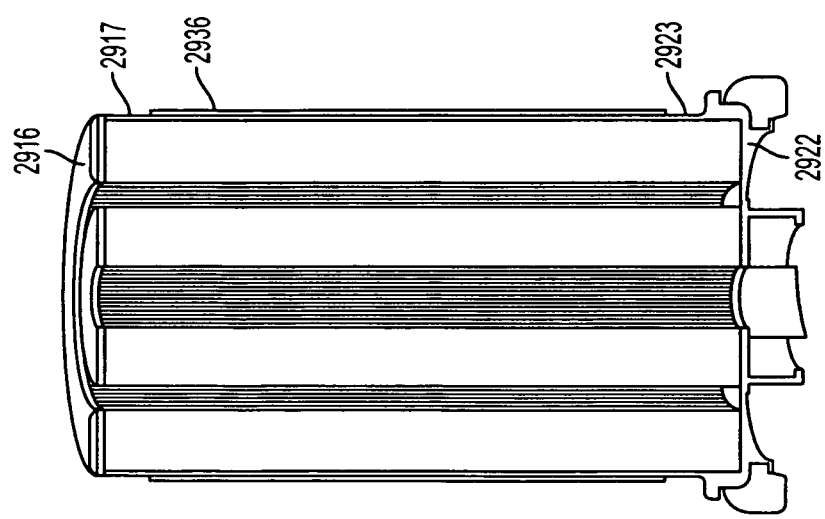

FILTER APPARATUS

CROSS-REFERENCE TO RELATED APPLICATIONS

This patent application claims the benefit of U.S. Provisional Patent Application No. 60/655,178, filed Feb. 22, 2005, which is incorporated herein in its entirety.

FIELD OF THE INVENTION

This invention relates generally to filtering and separating liquids, and more particularly to filter apparatuses of the type used for the fuel supply of an engine or for the lubrication system of an engine.

BACKGROUND OF THE INVENTION

It is necessary to remove particulate matter and water from fuel being supplied to an engine in order for the engine to operate properly and to have a long service life. Accordingly, the fuel supply system for an engine will typically include a fuel filter apparatus for removing particulate matter from the fuel before it is supplied to the engine. Such filter apparatuses also sometimes include provisions for removing water from the fuel, pre-heating the fuel, and provisions for injecting anti-gel or lubricity additives. Such filter apparatuses may also include other devices such as thermostats, pressure sensors, or water sensors. The filter may also be required to perform additional functions to neutralize acids or oxidants in the fuel. In addition, a filter apparatus may be used for the lubrication system of an engine.

Such filters typically include a filter element for trapping the particulate matter in a media. The element is configured so that it can be removed and replaced periodically as it becomes plugged with particulate matter. In order to allow for removal and replacement of the element, it is often mounted inside of a filter housing, which is in turn attached to a filter base having an inlet and an outlet port adapted for attachment of fluid lines directing fluid in to and away from the filter apparatus.

It is desirable that the filter apparatus and element be constructed to facilitate servicing of the filter. It is also desirable that the element and apparatus be configured in such a manner that only the proper element can be inserted into the base and housing, to preclude errors during servicing. It is further desirable, particularly in filters used in dirty or dusty environments of the type encountered in earth moving and farm equipment, that the filter apparatus include features for precluding entry of dirt or dust into the system while the filter element is being replaced.

For convenience, and to protect the environment, it is desirable that the filter include provisions for draining the fluid from the filter before replacement of the element, and to prevent leakage of fluid from the fuel system while the filter element is being replaced. It is also desirable that the filter element be made of materials that are incinerable or recyclable, and that the majority of the filter apparatus be reusable, with only the element being replaced.

It is also desirable that a filter apparatus include built-in features for facilitating replacement of the filter element, preferably without the need for tools, and that the filter apparatus provide a pleasing aesthetic appearance.

Previous filter apparatuses have been less than satisfactory in providing such needs, desired features and functionality. It is desirable, therefore, to provide an improved apparatus and method for filtering a fluid, and in particular for filtering fuel or lubricants supplied to an engine, in a manner that better fulfills one or more of the needs described above.

BRIEF SUMMARY OF THE INVENTION

The invention provides an improved method and apparatus for filtering a fluid, and in particular for filtering fuel or lubricants supplied to an engine.

In one form of the invention, a filter element includes inner and outer substantially tubular-shaped media packs disposed one inside of the other, about or along an axis, with one end of each of the inner and outer media packs being attached to an end cap of the element in a manner defining a fluid flow space between the inner and outer media packs for receiving a flow of fluid directed in parallel through the inner and outer media packs. The element may include a keyed axial projection thereof for engaging a corresponding keyed element of a filter base, for ensuring that the filter element is the proper element for use with that filter base. By changing the configuration of the corresponding keys on the filter element and filter base, a variety of mating filter element and base combinations can be produced for different filter configurations, for particular customers, for particular machine types of given manufacturer, or other purposes where it is desirable to ensure that only a particular filter element configuration is installed.

The keyed axial projection of the filter element may be part of the end cap of the filter element. Where the element is first installed into a filter housing, before being attached to the base, the keyed axial projection may also be part of the housing.

In one form of the invention, the keyed axial projection engages a flow control valve in the filter base. The flow control valve may include a torsion spring for urging the flow control valve to a position blocking fluid from entering the element or leaking from the base when the element is not in place. A filter apparatus, according to the invention, may also be configured in such a manner that the element must be rotated in the base, after engagement of the keyed axial projection with the flow control valve, in order to complete operative attachment of the element to the filter base, so that the step of rotating the filter element into proper alignment simultaneously rotates the flow control valve from the closed to an open position in which fuel is allowed to flow into the element.

The keyed axial projection of the filter element or housing may also be used as part of a locking mechanism of a filter apparatus, according to the invention, for precluding separation of the element or housing from the filter base during operation, as a result of forces such as vibration. The flow control valve may also be part of the locking mechanism. A fluid drain valve apparatus may be provided, so that fluid may be drained from the filter apparatus before the element is replaced. The fluid drain valve apparatus may be configured to also be part of a locking mechanism. In one form of the invention, the fluid drain valve apparatus selectively engages the flow control valve, as part of the locking mechanism, for precluding rotation of the flow control valve, and thereby also precluding rotation of the filter element through operation of the keyed axial projections, unless the fluid drain valve apparatus is first placed in a drain position.

A filter element may further include an integral seal, which may be attached to the end cap of the element, for forming a fluid tight seal to the filter base.

In one form of the invention, the filter element and the base include complimentary, keyed structures, for attaching the element to the base in a particular rotational alignment of the element with respect to the base. The housing and filter element may also include a second set of complimentary, keyed structures, for attaching the housing to the filter element in a particular rotational alignment of the element with the housing. In some forms of the invention, the complimentary, keyed, structures between the element and the base, and the second set of complimentary, keyed, structures between the housing and the filter element will be selectively located with respect to one another in such a fashion that the element can only be installed in to the housing in one pre-selected orientation, and the resulting cartridge formed by the housing and the element can only be attached to the base in one pre-selected orientation, thereby ensuring that the element will only be installed onto the filter base in a predetermined orientation.

Where the filter element and filter base include complimentary keyed axial projections, the complimentary, keyed, ramp-like structures between the housing and the filter base, and between the element and the housing, ensure that the keyed axial projections on the element and the filter base engage properly. Where the base includes a flow control valve, these various keyed structures are preferably configured such that the axial projections on the filter element engage the projections on the valve, with the valve in the closed position, when the filter cartridge formed by the combined element and housing are inserted in a linear direction into the filter base, with the keys between the housing and base aligned. The cartridge is then turned a predetermined angle, such as ¼ or ½ turn, to cause the second set of complimentary, keyed, ramp-like structures between the housing and the filter base to engage and pull the cartridge into sealed engagement with the filter base, while simultaneously turning the valve from the closed to the open position. The cartridge may then be locked into position, using the drain valve apparatus, or other locking means such as a locking collar, locking pins, or toggle bolts, etc.

The housing may include an integral ramp seal, for covering the second set of complimentary, keyed, ramp-like structures at the juncture of the housing and the filter base. The housing may also include integral handles for facilitating tool-less removal of the cartridge from the filter base.

The housing may further include a flow tube configured to fit into the space between the inner and outer media packs. The flow tube may be attached to the closed end of the housing. In one form of the invention, the flow tube includes snap action tabs that lock over a rim on the inside of the housing. The rim may be formed integrally with the remainder of the housing, or may be part of a retainer/clip which is attached to an opening in the closed end of the filter housing by an adhesive, welding, brazing, a press fit, or a thread. The retainer/clip may also include a threaded portion thereof for attachment of a threaded cap or plug, or accessories such as a heater, a water separator device, etc. Alternatively, the flow tube may be formed as a separate piece from the housing, and attached to the closed end of the housing by the methods described above in relation to the retainer/clip.

In some forms of the invention, the filter element may be permanently joined to the filter housing, so that both are replaced each time that the element is replaced. The filter housing may be made of plastic or another incinerable or recyclable material. In other forms of the invention, the element may be removable from the housing, after the cartridge assembly is removed from the filter base, so that only the element is replaced. In one form of the invention, a flow tube of the housing is spring loaded, and the complimentary, keyed ramp-like structures, for attaching the element to the housing, are configured in such a manner that the element must be pushed into the housing a short distance, against the force of the spring, before being rotated to a position at which the keyed portions of the complimentary ramps lock into one another. The element is then released, and the spring pushes it axially outward to engage the keyed portions of the element with the keyed portions of the housing. Removal of the element requires the reverse of this process.

A filter apparatus, according to the invention, may be configured for mounting in virtually any attitude, including dome up and dome down. A filter apparatus may also include other elements, such as water coalescing screens. A media pack of the filter apparatus may include filter media in a variety of forms, including pleated media, fluted media, gathered media, or depth media. A media pack of the filter apparatus may also include chemical conditioners, such as calcium carbonate.

In one form of the invention, a water separator is attached to either the filter base or the housing for collecting and holding removed water. The separator may include a bowl that is constructed at least partly from transparent or translucent, light transmitting material.

Other aspects, objectives and advantages of the invention will become more apparent from the following description of the invention, in conjunction with the accompanying drawings and attachments.

BRIEF DESCRIPTION OF THE DRAWINGS AND ATTACHMENTS

FIGS. 4-9 are perspective views illustrating components and the construction of the filter element of the filter apparatus of FIGS. 1-3.

FIGS. 14-16 are roll-out views illustrating a series of steps involved in engaging complimentary keying and locking features in a filter element and housing of the exemplary embodiment of the filter apparatus shown in FIG. 1.

FIGS. 24-26 are roll-out views illustrating a series of steps involved in engaging complimentary keying and locking features in a filter base and housing of the exemplary embodiment of the filter apparatus shown in FIGS. 1-3.

FIG. 45 is a perspective view of another embodiment with a locking collar.

FIG. 51 is a cross-sectional view of another embodiment of the filter element with the wrapping attached to the media with an adhesive.

FIG. 52 is an enlarged view of the circled area in FIG. 51.

FIG. 53 is a cross-sectional view of another embodiment of the filter element with the wrapping potted into the end caps.

FIG. 54 is an enlarged cross-sectional view of the area shown in the circle in FIG. 53.

FIG. 55 is a cross-sectional view of another embodiment of the filter element with the wrapping spaced from the end cap.

FIG. 56 is a cross-sectional view of another embodiment of the filter element.

FIG. 57 is an enlarged cross-sectional view of the area shown in the circle in FIG. 56.

FIG. 58 is an enlarged cross-sectional view of another embodiment of the area shown in FIG. 56.

While the invention will be described in connection with certain preferred embodiments, there is no intent to limit it to those embodiments. On the contrary, the intent is to cover all alternatives, modifications and equivalents as included within the spirit and scope of the invention. The disclosure provided by all patents or other documents referenced herein or in the attachments is incorporated herein by reference.

DESCRIPTION OF THE INVENTION

Figure 1:
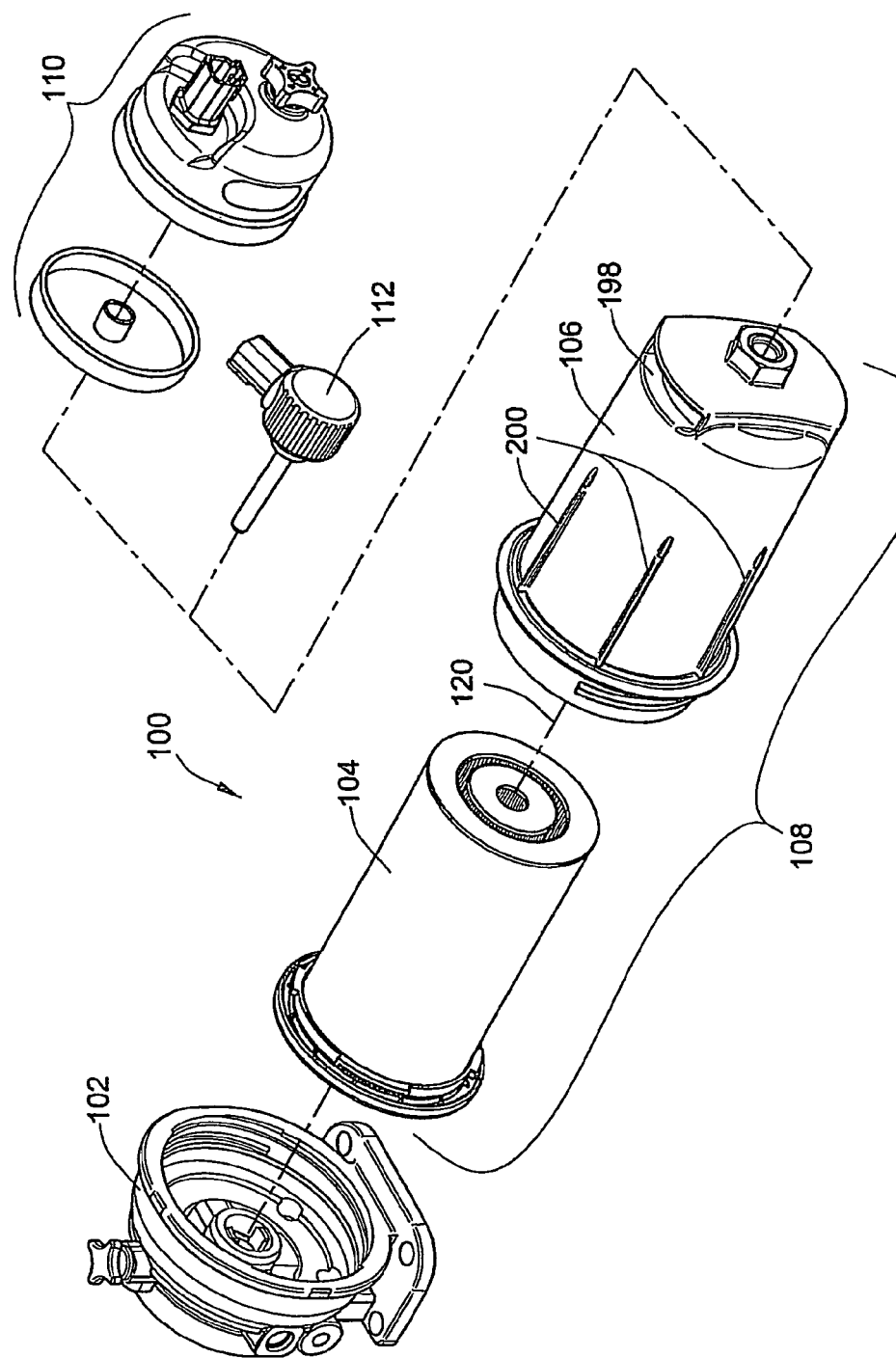
FIG. 1 is an exploded perspective view of an exemplary embodiment of a filter apparatus, according to the invention.
Figure 2:
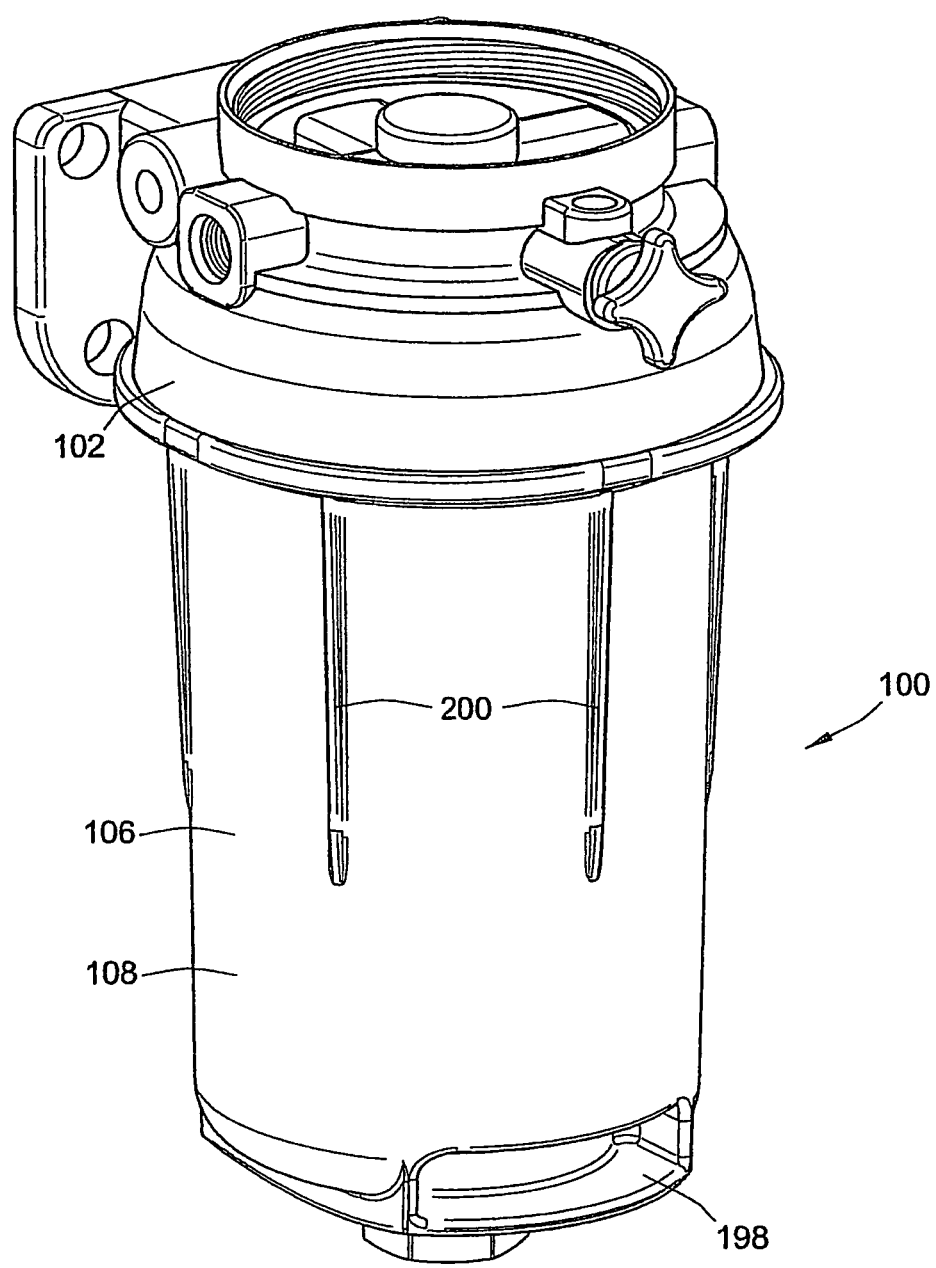
FIG. 2 is a perspective view of the filter apparatus of FIG. 1 assembled and oriented in a "dome down" position.
Figure 3:
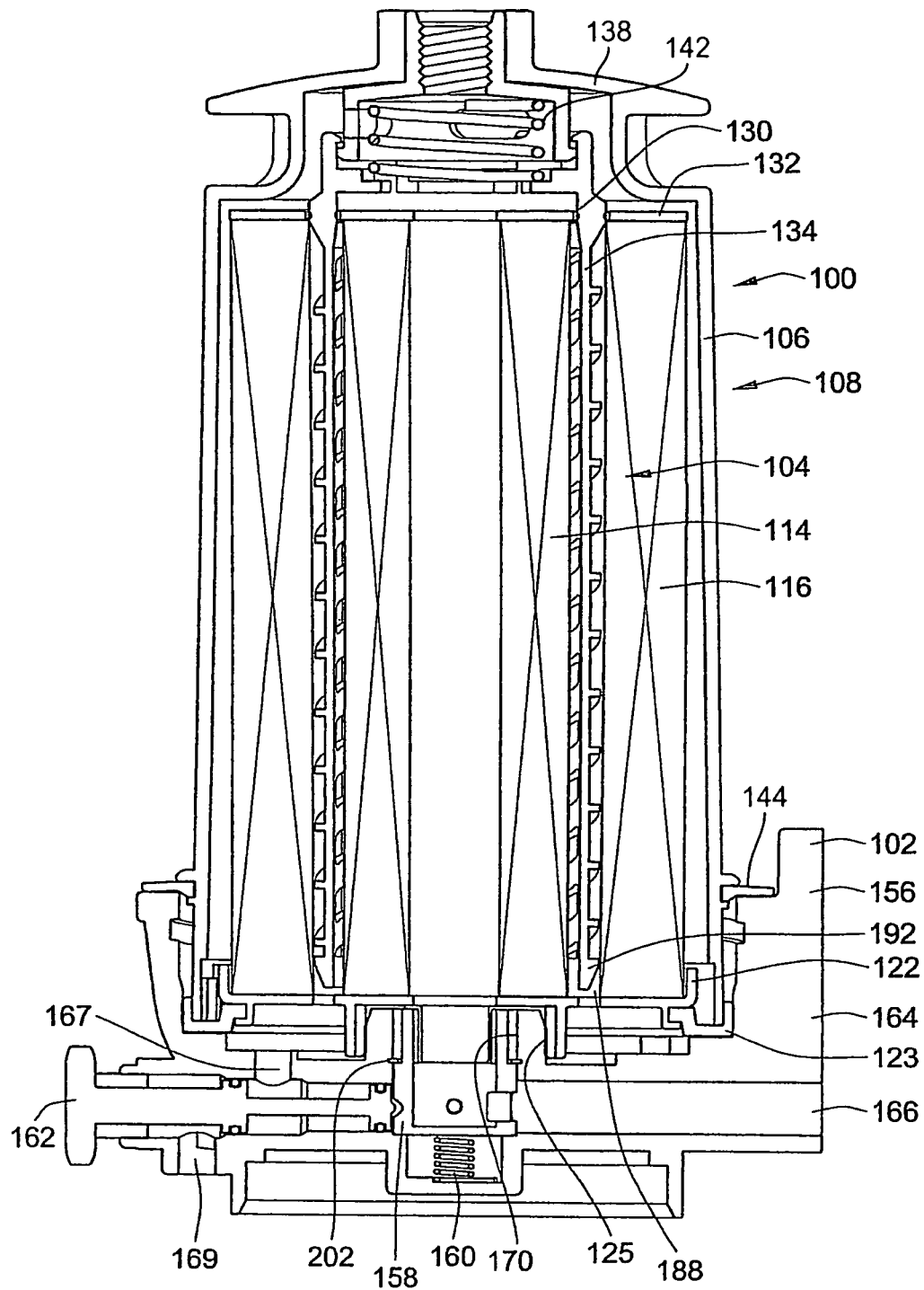
FIG. 3 is an orthographic longitudinal cross-section of the filter apparatus of FIG. 1, assembled and oriented in a "dome up" position.

FIGS. 1-3 show an exemplary embodiment of a filter apparatus 100, according to the invention, including a filter base 102, a filter element 104, and a filter housing 106. As shown generally in FIG. 1, and described in more detail below, the element 104 and housing 106 are configured to be joined together, to form a filter cartridge 108, which is then sealingly joined to the base 102. A filter apparatus, according to the invention, may also include additional components, such as the fluid pre-heater 112, or the water separator 110 shown in FIG. 1.

As shown in FIGS. 4-8, the filter element 104 includes inner and outer substantially tubular-shaped media packs 114, 116 disposed about a longitudinal axis 118 of the filter element that will be aligned with a longitudinal axis 120 of the exemplary embodiment to the filter apparatus 120, as indicated in FIG. 1. The filter element 104 also includes a first end cap 122, an outer seal 123, an inner seal 125, second end caps 130, 132, and an outer wrapper 136, which will be explained in more detail below.

In one embodiment, the media packs may be formed from pleated filter material, but in other embodiments of the invention, other forms of media may also be utilized in practicing the invention. It will also be noted that, although the inner and outer media packs 114, 116 in the exemplary filter apparatus 100 are substantially annular shaped, and concentrically positioned about the common axis, but in other embodiments of the invention, this need not be the case. In other embodiments of the invention, the media packs may have a tubular shape that are not annular in cross-section, and not necessarily sharing the same axis, such as, the embodiment shown in FIG. 29.

Figure 4:
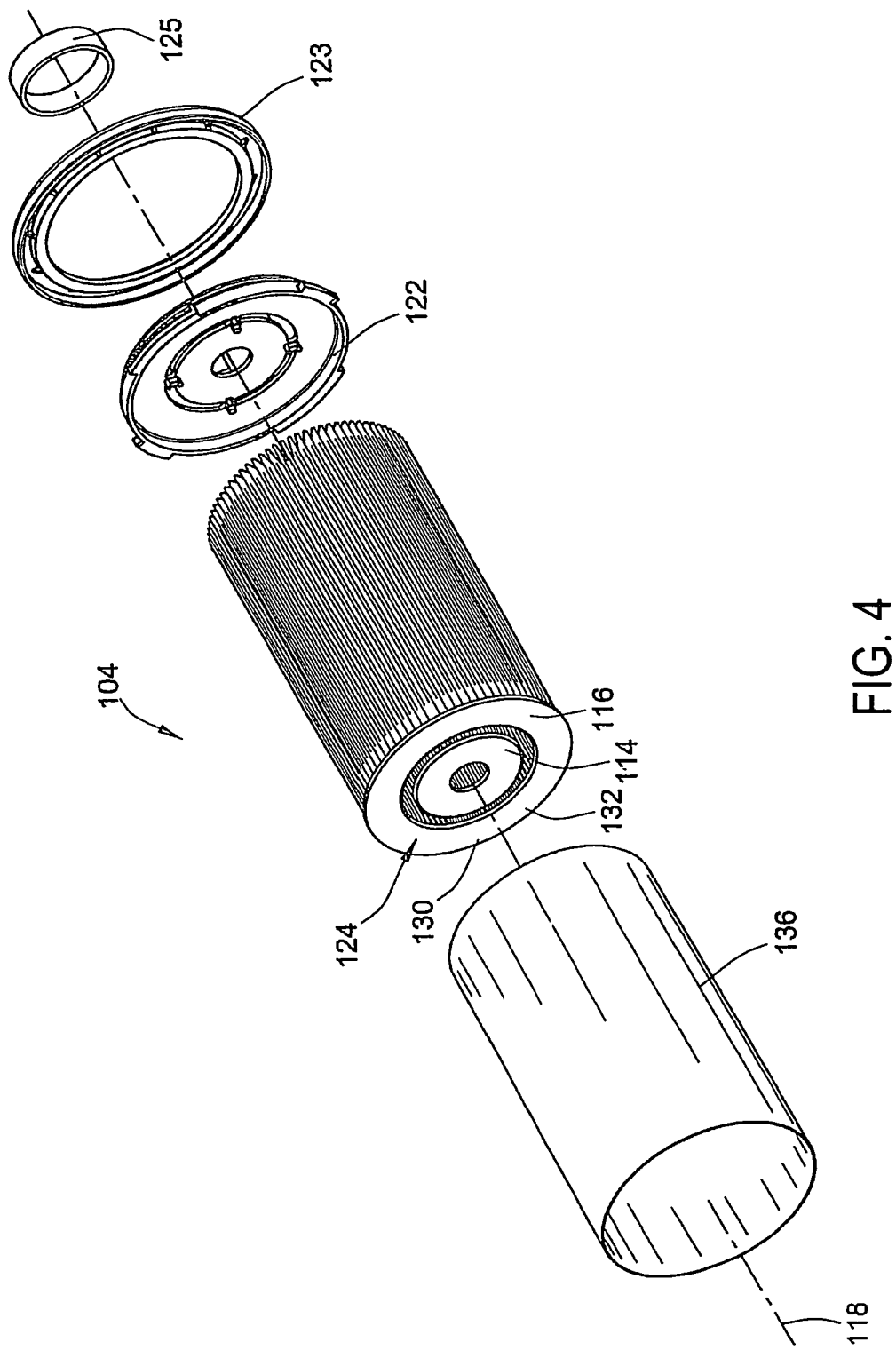

In the exemplary embodiment of the filter element 104, as shown in FIGS. 4-8, one end of each of the inner and outer media packs 114, 116 is potted into the first end cap 122 in a manner defining a fluid flow space 124 between the inner and outer media packs 124, 116 for receiving a flow of fluid directed in a parallel, bi-directional flow pattern through the inner and outer media packs 114, 116, as illustrated in FIG. 4. With this flow pattern, fluid enters the open space in the center of the inner media pack 114 of the filter element 104 through an opening 126 in the center of the first end cap 122, and exits the filter element 104 through the a series of slots 128 in the first end cap 122 that are aligned with the space 124 between the inner and outer media packs 114, 116.

Figure 10:
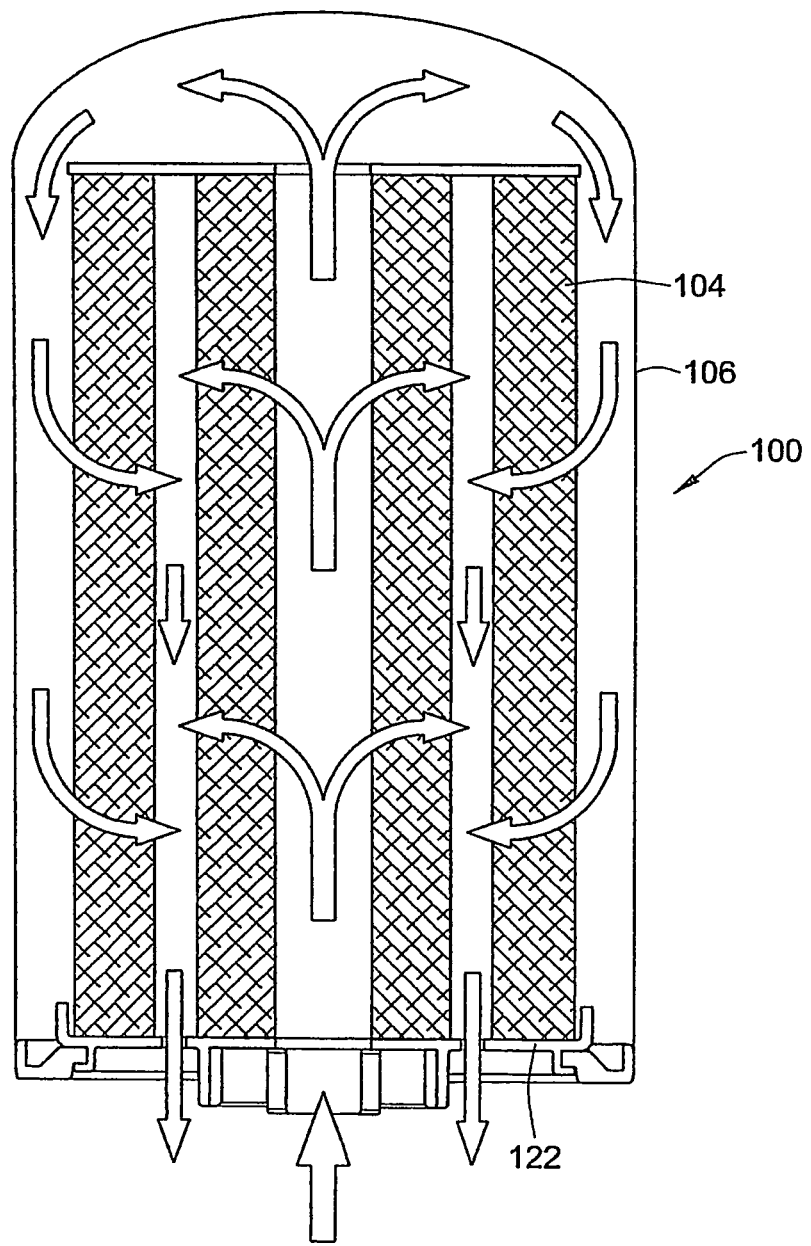
FIGS. 10-11 are schematic illustrations of two potential flow patterns through a filter apparatus according to the invention, with FIG. 10 illustrating the flow pattern in the exemplary embodiment of FIG. 1, and FIG. 11 showing an alternate flow pattern for use in alternate embodiments of the invention.
Figure 11:
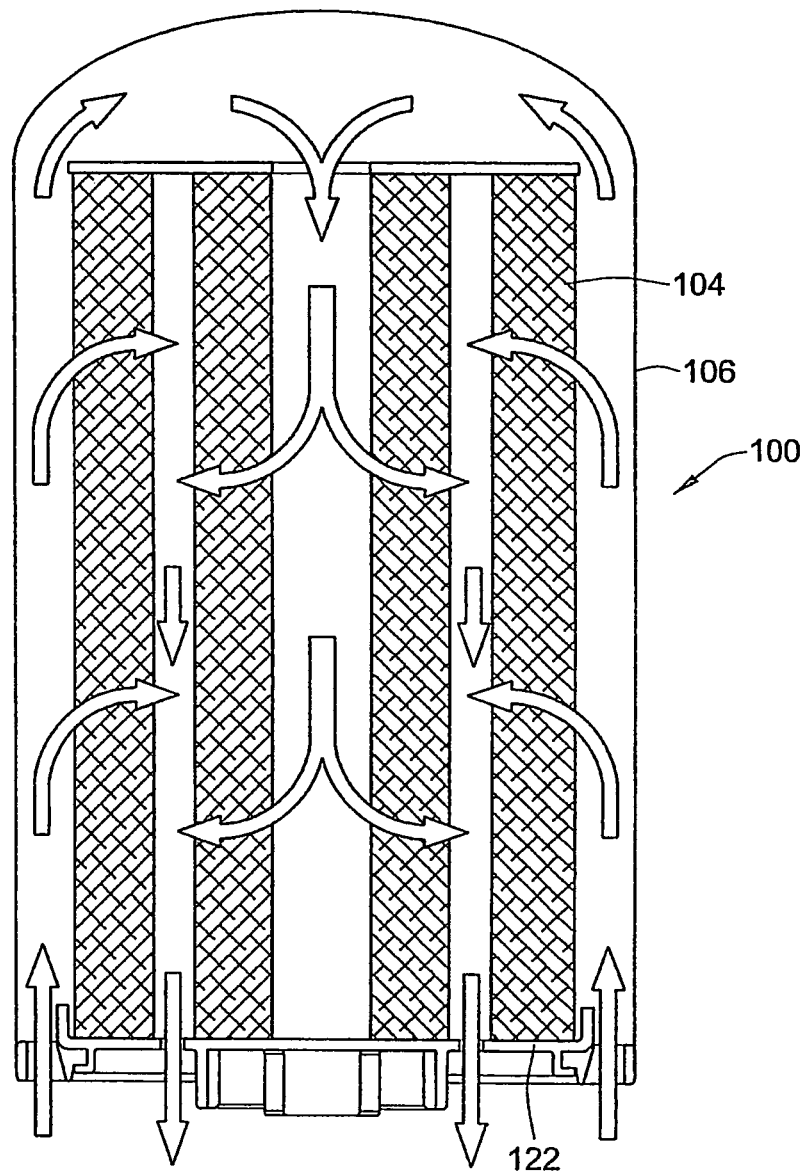

The opposite ends of the inner and outer media packs 114, 116 are blocked by the second end caps 130, 132, which, as shown in FIG. 3, include annular sealing ridges on their outer and inner peripheries, respectively for sealing against an annular-shaped sealing portion of a flow tube 134 of the housing 106. The annular-shaped sealing portion of the flow tube 134 blocks fluid from axially entering the second end (upper end as shown in FIG. 1) of the space 124 between the inner and outer filter medias 114, 116. In other embodiments of the invention, however, such a parallel, bi-directional flow pattern can also be provided by configuring the element and base such that fluid enters the element around its outer periphery and exits through the space between the inner and outer elements, as shown in FIG. 10.

A filter element incorporating a parallel, bi-directional flow pattern, in accordance with the invention, has been shown to provide a substantial increase in filter capacity, within a given volume, as compared to prior fluid filters using conventional flow patterns. Although such a parallel, bi-directional flow pattern will generally be preferred in practicing the invention, it will be understood that the invention may also be practiced with other types of fluid flow patterns through the element.

As shown in FIG. 4, the filter element 104 of the exemplary embodiment also includes a fluid-permeable outer wrapping 136 attached over the outer periphery of the outer media pack 116, to maintain spacing between the pleats of the outer media pack 116. In other embodiments of the invention, other methods of maintaining spacing may be utilized, such as beads of adhesive around the periphery, or sputtered on beads of adhesive on the outer periphery. Where a wrapper is utilized, it may be attached in a number of configurations, some of which are detailed in Attachment 3.

Figure 12:
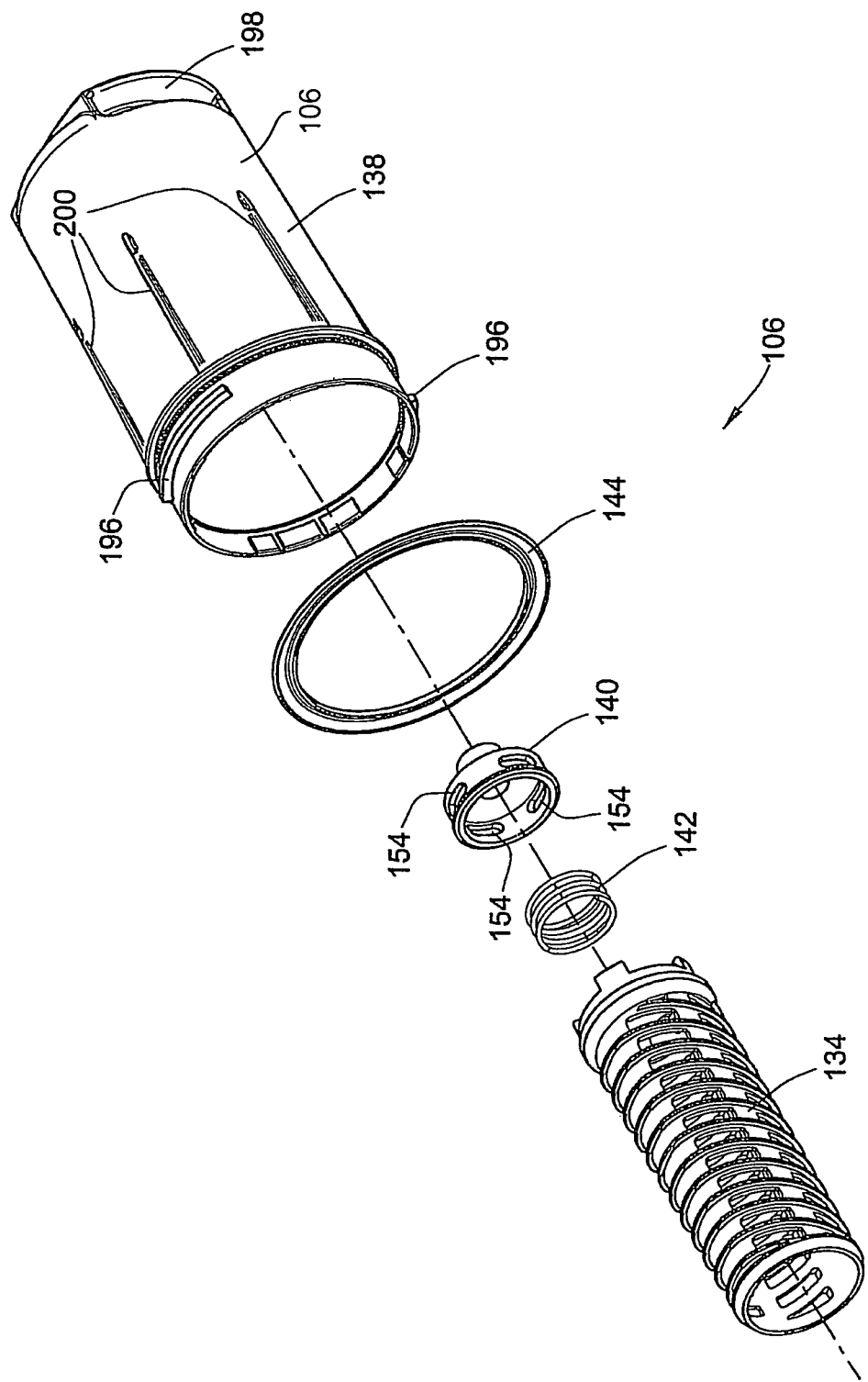
FIGS. 12 and 13 are an exploded perspective view, and an orthographic cross-section, respectively, of a filter housing of the exemplary embodiment of the filter apparatus shown in FIGS. 1-9.
Figure 13:
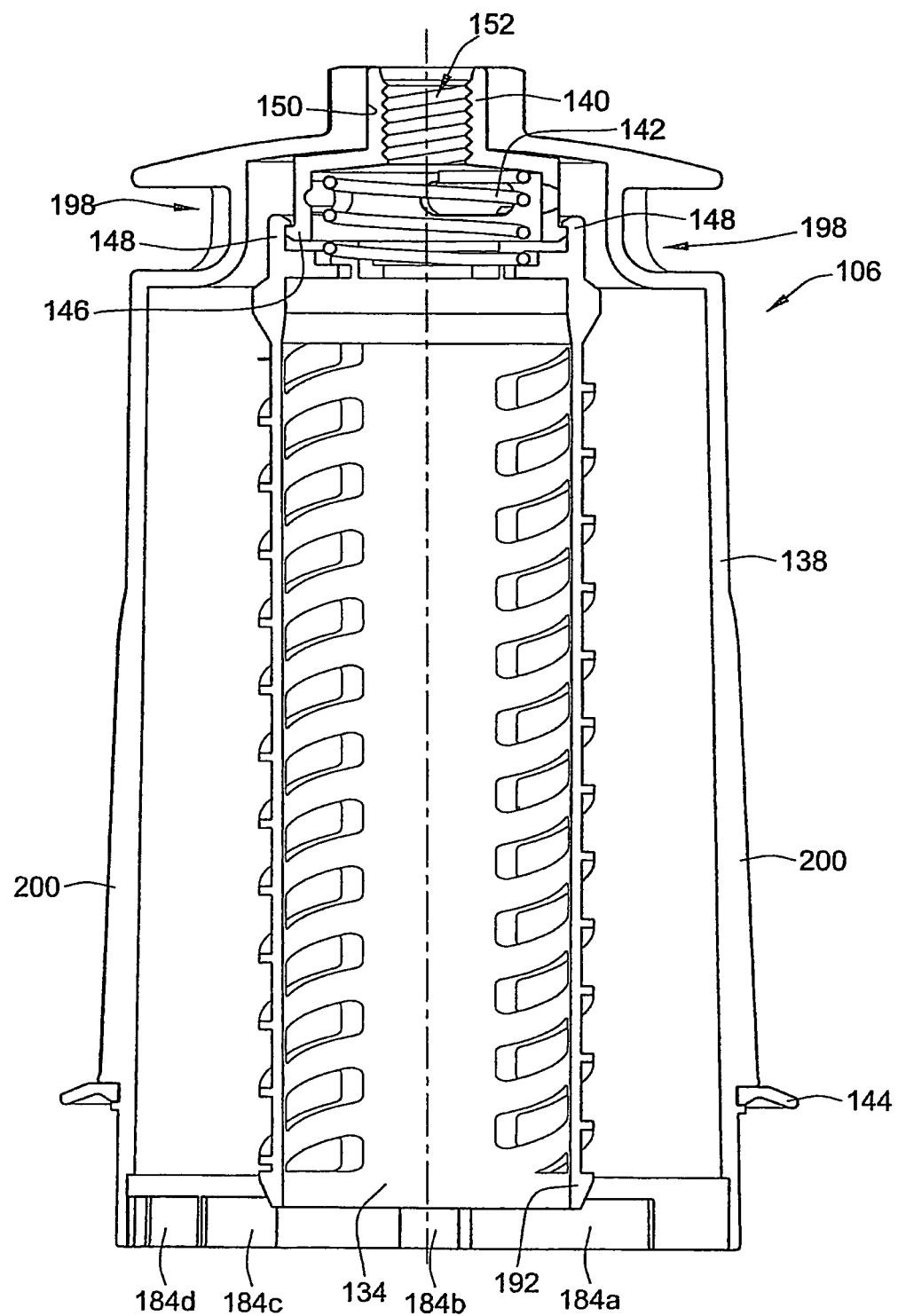
Figure 18:
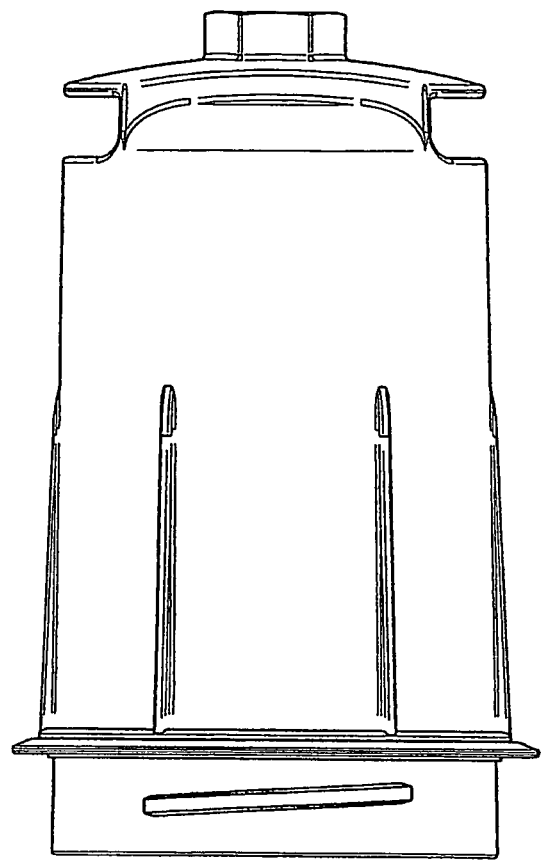
FIGS. 17-22, are external perspective and orthographic views of the housing of the exemplary embodiment of FIGS. 1-3, showing the outside appearance of the housing.
Figure 17:
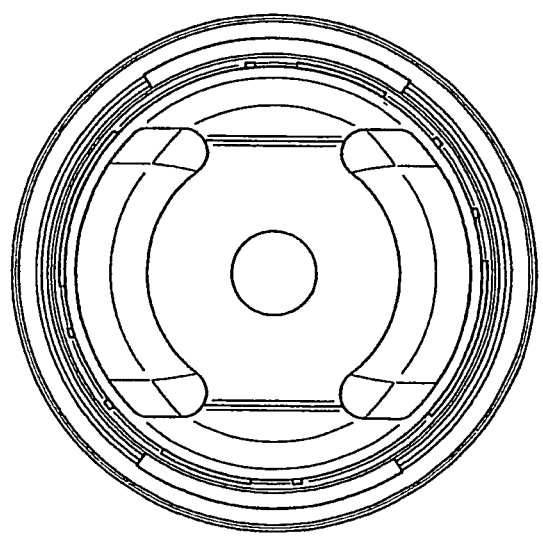
Figure 20:
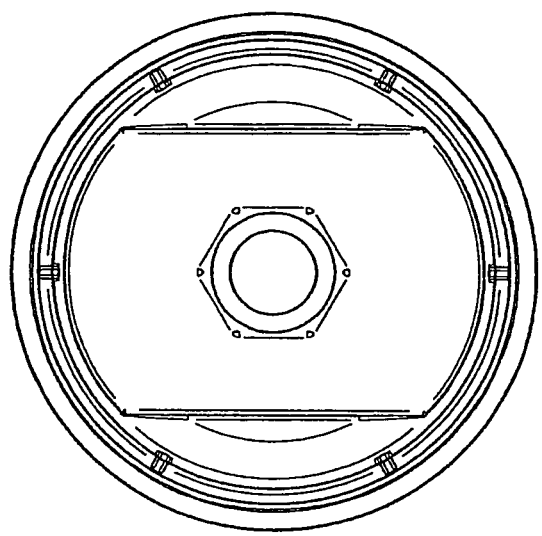
Figure 19:
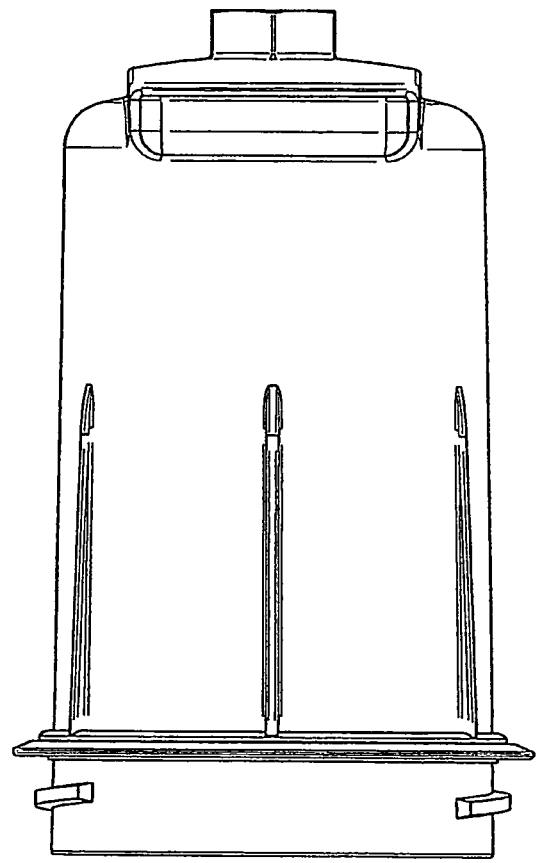
Figure 21:
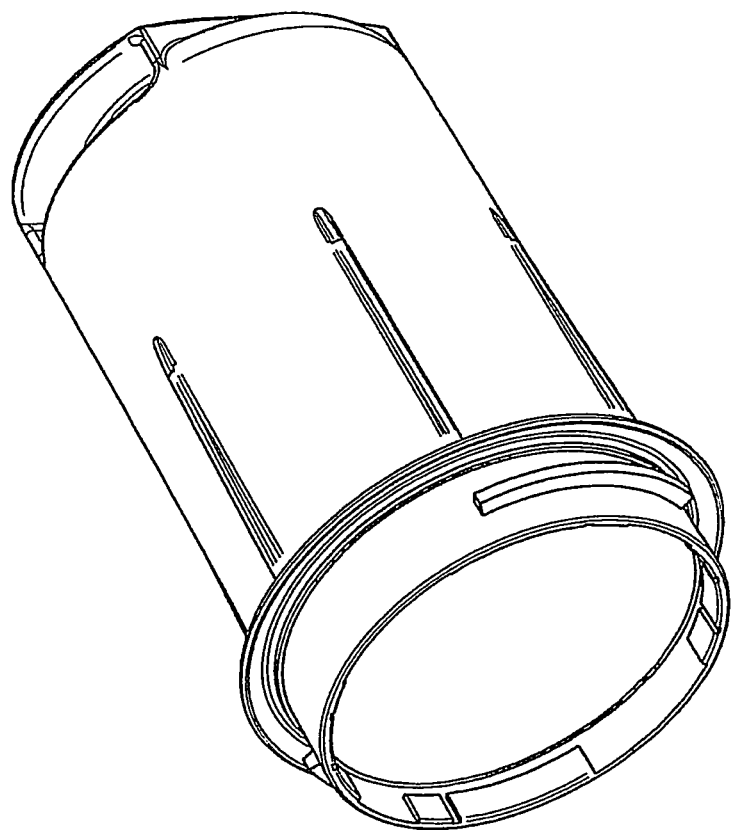
Figure 22:
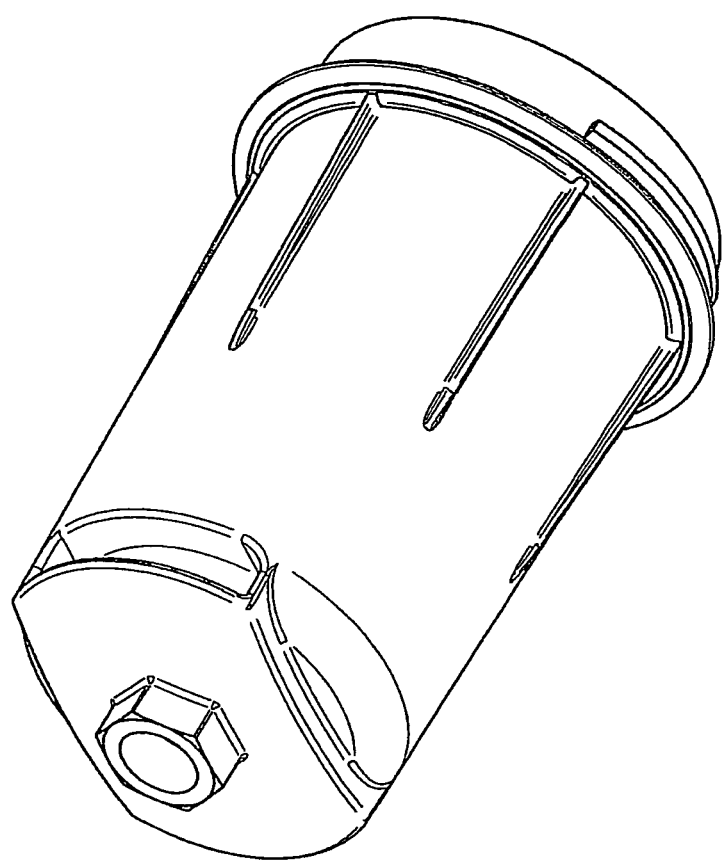

As shown in FIGS. 12 and 13, the housing 106 of the exemplary embodiment of the filter apparatus 100 shown in FIGS. 1-3, includes a dome 138, a flow tube retainer/clip 140, a spring 142, and a ramp seal 144, and the flow tube 134.

As will be understood from FIGS. 3 and 13, the flow tube 134 is configured to fit into the space 124 between the inner and outer media packs 114, 116. In the exemplary embodiment of the filter apparatus 100, the flow tube 134 is attached to the closed end of the dome 138 of the housing 106 with a retainer/clip arrangement, formed by an annular rim 146 on the flow tube retainer 140 in conjunction with several snap action tabs 148 extending from the end of the flow tube 134 that lock over the annular rim 146 of the flow tube retainer 140.

In the exemplary embodiment of the housing 106, the flow tube retainer 140 is a separate structure from the dome 138, which is attached in an opening 150 in the closed end of the dome 138 of the filter housing 104, by an adhesive, welding, brazing, a press fit, or a thread, or other attachment methods appropriate to the materials utilized for forming the dome 138 and retainer 140. In other embodiments of the invention, however, the retainer 140 and/or the rim 146 may be formed integrally with the remainder of the dome 138. The retainer 140 of the exemplary embodiment also includes a threaded port 152 therein, for attachment of a threaded plug, or accessories such as a heater, a water separator device, etc. As best seen in FIG. 12, the retainer 140 also includes a plurality of flow slots 154 for facilitating fluid flow into, or out of, the inner media pack 114 at the closed end of the dome 138.

The spring 142 is a helical-wound compression spring, in the exemplary embodiment. Mating ends of the flow tube 134 and the retainer 140 are configured to provide spring seats for capturing the spring 142, in such a manner that the spring 142 urges the flow tube 134 to move in a direction away from the retainer 140. The snap action tabs 148 of the flow tube 134 are of such a length that the spring 142 holds the remainder of the flow tube 134 at a fixed distance away from the retainer 140, but allowing the spring 142 to be compressed, so that the flow tube 134 can move a short distance toward the retainer 140, when sufficient force is applied to the opposite end of the flow tube 134 to overcome the force of generated by the spring 142.

Figure 23:
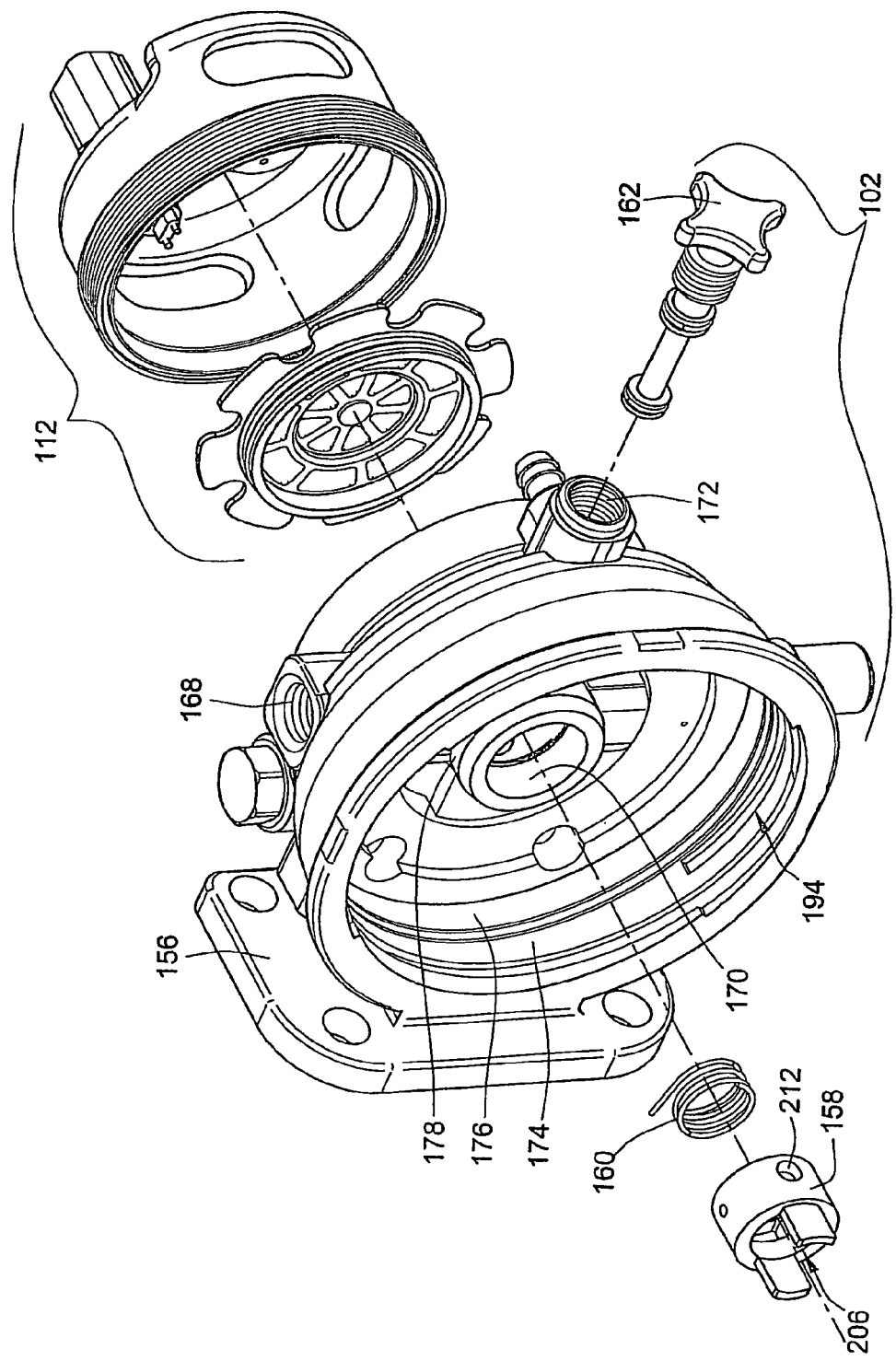
FIG. 23 is a perspective view of a filter base of the exemplary embodiment of FIGS. 1-3.

As shown in FIGS. 3 and 23, the base 102, of the exemplary embodiment of the filter apparatus 100, may include a block 156, a flow control valve 158, a torsion spring 160, and a drain valve 162. The block 156 defines a mounting flange 164 for mounting the filter apparatus 100 on a structure, such as the engine block of an engine. The block 156 also defines an inlet port 166, an outlet passage 167 connected to an outlet port 168, a drain/vent port 169, and receptacles 170, 172 for the rotating flow control valve 158 and the drain valve 162 respectively. The block 156 of the base 102 further defines an integral collar 174 for receiving and retaining the housing 104, and first and second sealing surfaces 176, 178, all of which are described in more detail below.

As best seen in FIGS. 5-7, the first end cap 122 of the element 104 includes a series of long and short keys 180, 182, extending partially around the outer periphery of the first end cap 122, and having axially extending locking tabs 180a, 180b, 182a, 182b attached to opposite ends of the long and short keys 180, 182. As shown in FIGS. 12 and 13, the inner surface of the dome 138, adjacent the open end of the dome 138, is configured to provide complimentary keys 184a-184e that are spaced and configured to define a complimentary mating structure for receiving the long and short keys 180, 182 of the first end cap 122 of the filter element 104, and the locking tabs 180a, 180b, 182a, 182b of the long and short keys 180, 182 of the first end cap 122.

As best seen in FIGS. 3 and 7, the inside surface of the first end cap 122 of the filter element also includes a plurality of castellated mounting buttons 188, each having a slot 190 in the distal end thereof for receiving the distal end 192 of the flow tube 134, when the element 104 is inserted into the dome 138.

The manner in which the element 104 is installed into the housing 106 to form the filter cartridge 108 is illustrated in FIGS. 14-16, which are roll-out views of the mating keys 180, 182, 184a-d of the first end cap 122 of the filter element 104 and the open end of the dome 138 of the housing 106. As shown in FIG. 14, the inner surface of the open end of the dome 138 includes a series of keys 184a-184e, of various sizes and spacings specifically configured to provide a sequence of long and intermediate openings 186*a*, 186*b*, with which the long and short keys 180, 182 respectively of the first end cap 122 of the filter element 104 must be aligned, in order for the element 104 to be inserted into the housing 106. The keys 184*a*-184*e* are further configured and spaced to provide a series of short slots 186*c* for receiving the locking tabs 180*a*-*b*, 182*a*-*b*, on the long and short keys of the first end cap 122.

As will be understood by examining FIGS. 14 through 16 in sequence, as the element 104 first enters the open end of the housing 106, the distal end 192 of the flow tube 134 is inserted into the space 124 between the inner and outer media packs 114, 116 of the filter element 104. As the element 104 is moved axially into the housing 106, the filter is rotated to align the long and short keys 180, 182 of the first end cap 122 of the filter element 104 with the long and intermediate spaces 186*a*, 186*b* of the dome 138, as shown in FIG. 12, in order to allow the element 104 to be inserted into the dome 138.

As the element 104 is inserted axially further into the dome 138, the distal end 192 of the flow tube 134 engages the slots 190 in the mounting buttons 188 of the first end cap 122, and the spring 142 in the housing 108 is compressed, allowing the element 104 to enter the dome 138, as shown in FIG. 15, with the keys 180, 182 in the end cap 122 aligned with long and intermediated length slots 166*a*, 186*b* of the dome 138. As shown in FIG. 16, the element 104 is then rotated to properly align the locking tabs 180*a*-*b*, 182*a*-*b* of the long and short keys with corresponding slots 186*a*, 186*c* in the dome, and axial pressure on the element 104 is released, to allow the spring 144 to push the long and short keys 180, 182 and locking tabs 180*a*-*b*, 182*a*-*b* of the first end cap 122 into seating engagement with the keys 184*a*-*e* and slots 186*a*-*c* of the dome 138, to thereby fixedly attach the element 104 to the housing 106.

In embodiments of the invention where it is desired to have the element 104 permanently attached to the housing 106, the element 104 may be secured to the housing 106 by an adhesive or other attachment methods appropriate for the materials selected for the element 104 and the housing 106. In some such embodiments, the complexity of the keying arrangements described above may be dispensed, in favor of other methods of attaching the element 104 to the housing 106, or leaving the housing 106 separate from the element 104.

It is contemplated, however, that generally it will be desirable in practicing the invention to have the element 104 and housing 106 joined with an arrangement, such as the locking keyed structure described above in relation to the exemplary embodiment of the filter apparatus 100, so that the element 104 may be replaced and the housing 106 reused, by first removing the spent element, by performing the steps described in relation to FIGS. 14-16 in reverse order, and then installing a replacement element 104 in the manner described above in relation to FIGS. 14-16.

Once the filter element is installed into the housing 106 to form the filter cartridge 108, the cartridge 108 is installed into the integral collar 174 of the base 102. Specifically, as shown in FIGS. 12, and 23, the inner surface of the integral collar 174 of the base 102 includes a series of ramp-like structures 194, which are engaged by complimentary ramps 196 formed on the outside of the dome 138, adjacent the open end of the dome 138. As shown in FIGS. 24-26, the ramp-like structures 194 and ramps 196 are configured to include keying and stops so that the housing 108 can only be fitted axially into the integrated collar 174 when the keying features on the ramps 196 of the housing 108, and the ramp-like structures 194 of the base 102 are correctly aligned with one another. After the housing 108 has been properly aligned and inserted axially into the base 102, the housing 108 is rotated with respect to the base 102 to bring the stops on the ramps 196 and ramp-like structures 194 into contact with one another, to thereby ensure a predetermined relative alignment of the housing 108 to the base 102.

Figure 8:
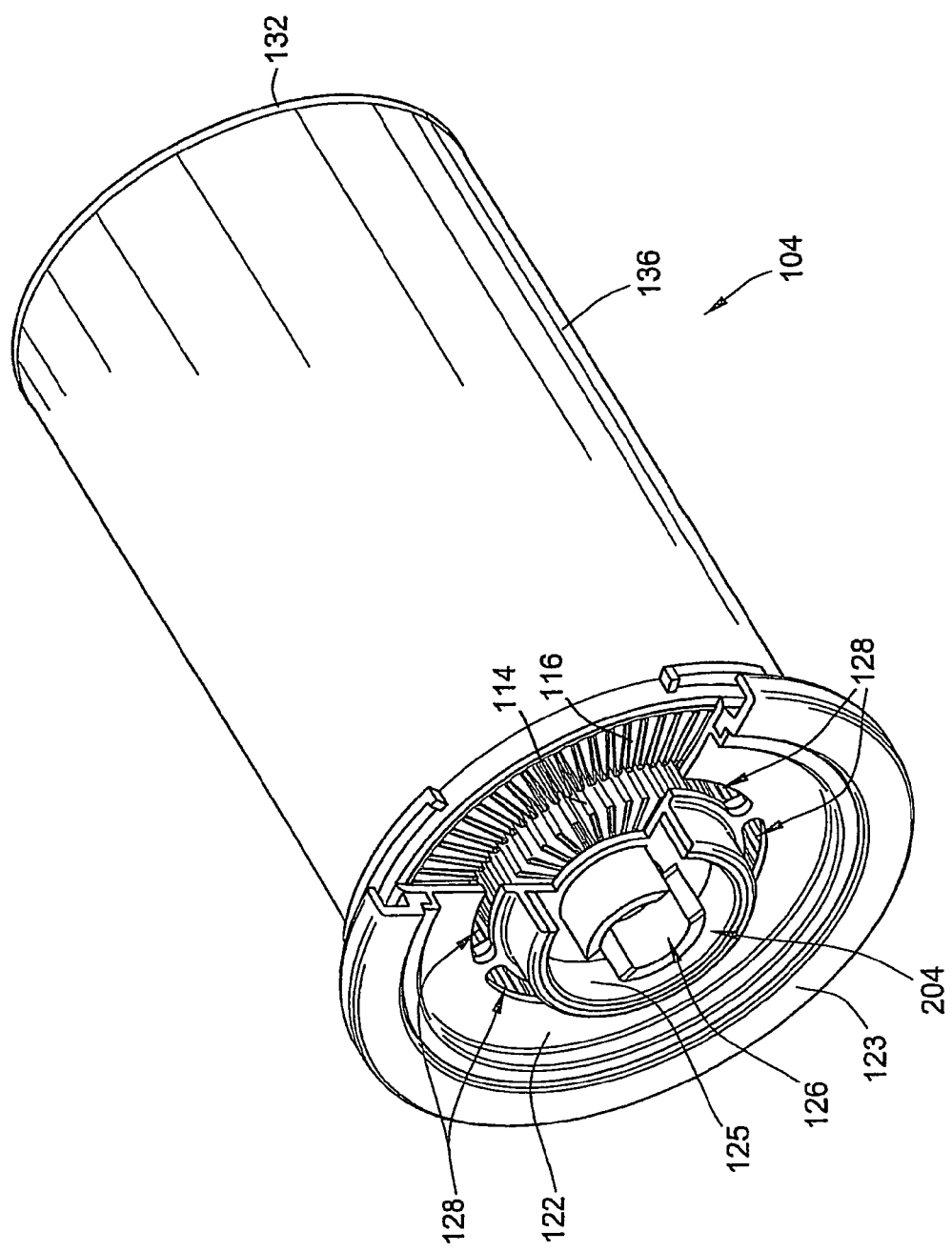
Figure 9:
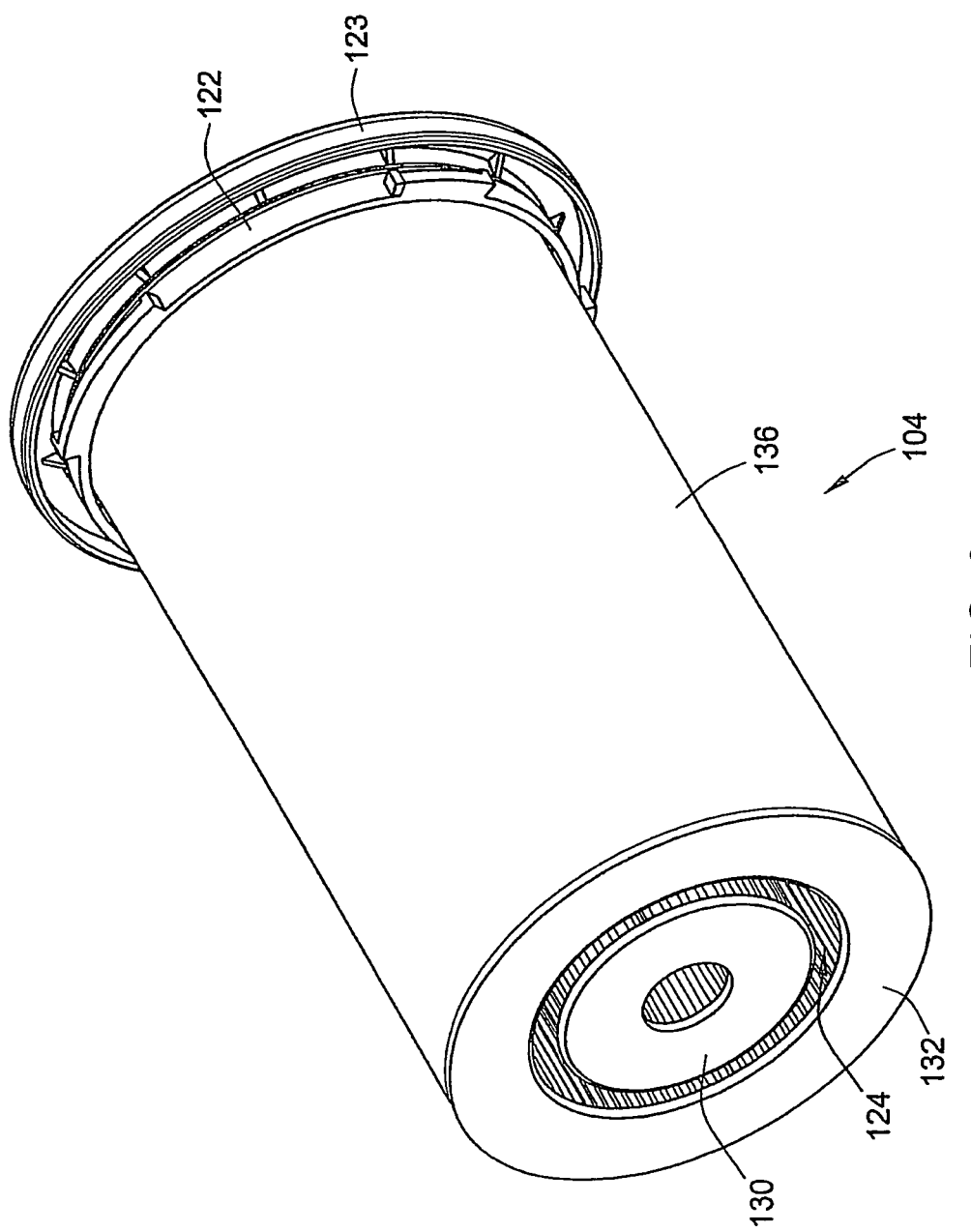

As shown in FIG. 8, the filter element 104 of the exemplary embodiment includes an outer seal 123 and an inner seal 125 attached to the first end cap 122. As shown in FIG. 3, the outer seal 123 wraps around the outer end of the dome 138 of the housing 108, when the element 104 is properly installed in the housing 108. As will be understood from FIGS. 3 and 23, the outer and inner seals 123, 125, respectively, form seals between the element 104 and the first and second sealing surfaces 176, 178 of the base 102, when the cartridge 108 is properly locked into the base 102.

Those having skill in the art will recognize, that in the exemplary embodiment of the filter apparatus 100, by virtue of the coordinated keying of the base 102, element 104, and housing 106, the ramps 196 and ramp like structures 194, in conjunction with the axially extending keyed structures 204, 206 form a first set of complimentary keyed, structures for attaching the filter element 104 to the base 102 in a particular rotational alignment of the filter element 104 with the base 102. Those skilled in the art will further recognize that in the exemplary embodiment of the filter apparatus 100, the complimentary keying of the element 104, and housing 106 form a second set of complimentary keyed, structures for attaching the filter element 104 to the housing 106 in a particular rotational alignment of the filter element 104 with the housing 102.

In the exemplary embodiment of the filter apparatus 100, as shown in FIGS. 3 and 12, the housing 106 includes an integral ramp seal 144, for covering and closing the juncture of the base 102 and the housing 106, when the cartridge 108 is locked into the base 102, to preclude dirt, water or other foreign matter from entering the space occupied by the ramps 196 and ramp-like structures 194. The housing 106 of the exemplary embodiment also includes handles 198 and ribs 200 positioned to facilitate tool-less removal of the cartridge 108 from the base 102. As shown in FIGS. 18-22, the handles 198 and ribs 200, and other features of the housing 106 of the exemplary embodiment have been selected to provided a pleasing aesthetic appearance. Those skilled in the art will recognize that in other embodiments of the invention, such features may or may not be included, and may have appearances different from the ones depicted herein.

The exemplary embodiment of the filter apparatus 100, of the invention, may also include an automatic valve for blocking or restricting fluid from flowing into the element 104, or from the inlet port 166 when the cartridge 108 is not properly secured in the base 102. Specifically, the valve may include the valve 158, and torsion spring 160, secured in the receptacle 170 of the base 102, by a snap ring 202, as shown in FIGS. 3, 23, 27, and 28. As shown in FIGS. 5, 23, 27 and 28, the first end cap 122 of the filter element 104, and the valve 158 include complementary axially extending keyed structures 204, 206 which are sized and oriented so that they must properly mate with one another for the filter element 104 to be inserted in to the filter base 102 in the manner indicated by the step shown in FIG. 24. As the filter element 104 is rotated into place, in the manner shown in FIGS. 25 and 26, the complimentary axially extending keyed structures 204 of the filter element 104 rotate the valve from the closed position, shown in FIG. 27, to the open position shown in FIG. 28, so that fluid can flow from the inlet passage 166 into the filter element 104.

Figure 27:
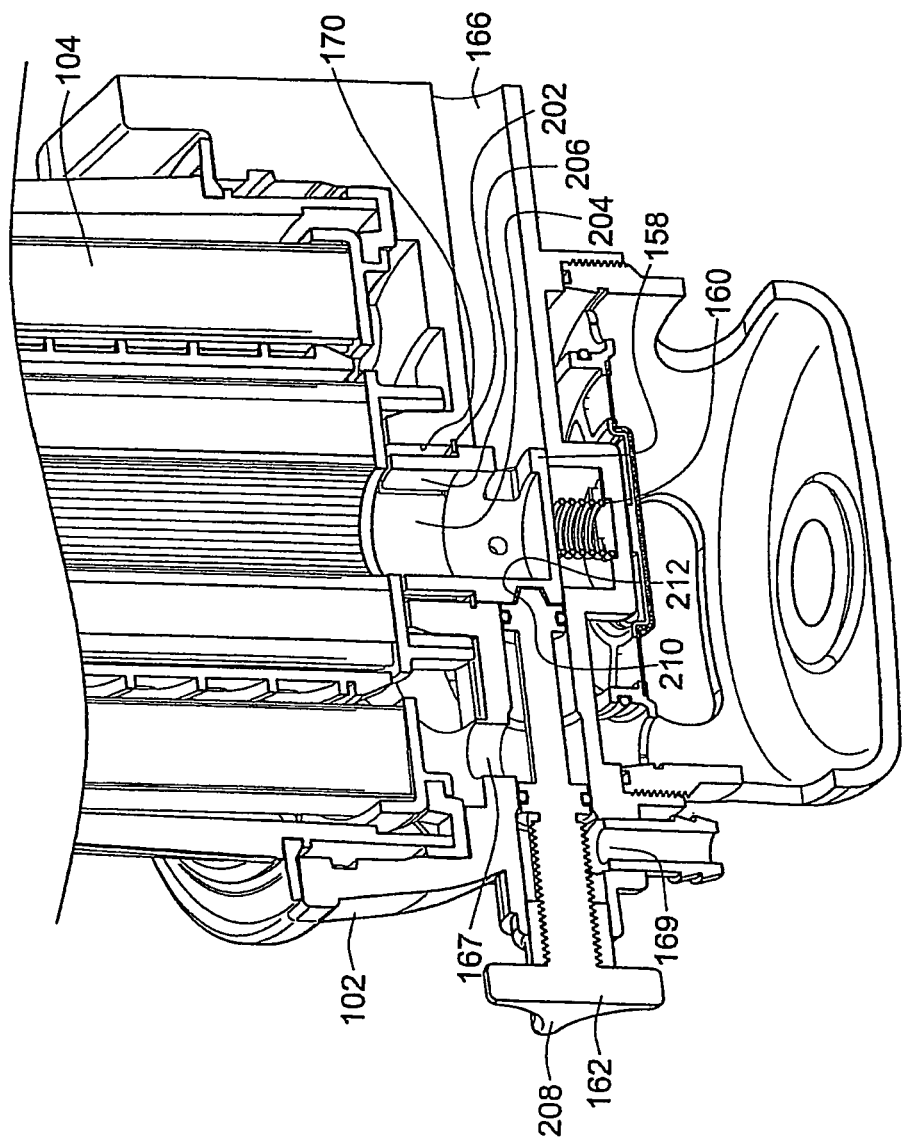
FIGS. 27-28 are perspective partial sections of the exemplary embodiment of the filter apparatus of FIGS. 1-3, with FIG. 27 showing a drain/vent valve of the filter apparatus in a closed position, and with FIG. 28 showing the drain/vent valve of the filter apparatus in an open position.
Figure 28:
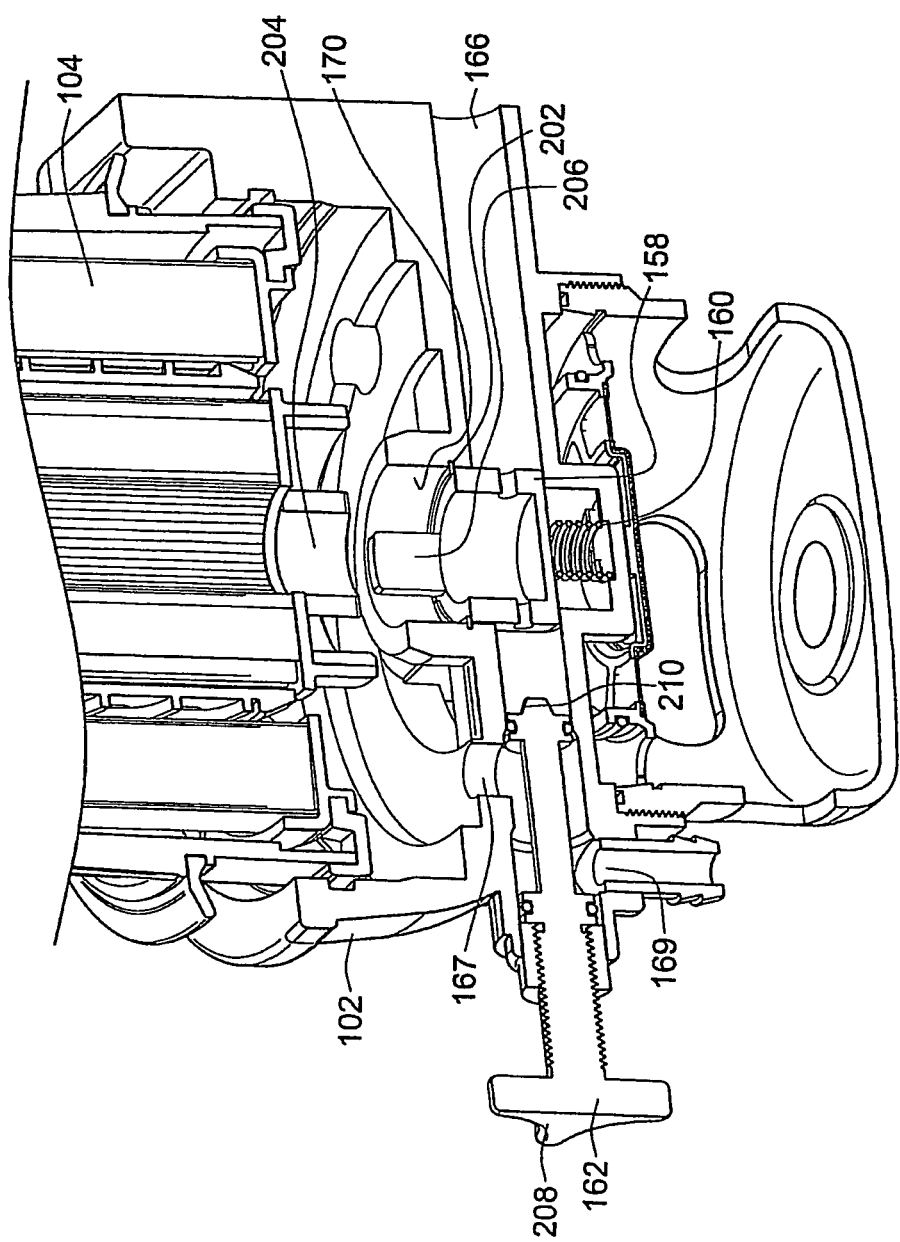

As shown in FIGS. 27 and 28, the drain/vent valve 162 on the exemplary embodiment of the filter apparatus 100, according to the invention, may serve two functions. The drain/vent valve 162 is a two position, manually operable, shuttling spool valve, having an exposed handle 206 at one end for moving the drain/vent valve from a first position, as shown in FIG. 27, to a second position as shown in FIG. 28. The second end of the drain/vent valve includes a conical shaped locking pin 210, for engaging a complimentary recess 212 in the valve 158.

In the first position, the drain/vent valve 162 blocks air or fluid from flowing between the outlet passage 167 and the drain/vent port 169, and the conical shaped locking pin 210 is positioned within the complimentary locking recess 212 in the valve 158. Those having skill in the art will recognize that, by virtue of the structure described above, when the locking pin 210 of the drain/vent valve 162 is engaging the complimentary locking recess in the valve 158, not only is the valve 158 locked in the open position, but also, the entire cartridge 108 is locked against rotation, by the locking pin 210 and recess 212, to preclude loosening of the cartridge, under the forces of vibration, for example.

In the second position, as shown in FIG. 28, the drain/vent valve 162 allows air or fluid to flow between the outlet passage 167 and the drain/vent port 169, so that the element 104 can be drained, and the conical shaped locking pin 210 is disengaged from the complimentary locking recess 212 in the valve 158. Those having skill in the art will recognize that, by virtue of the structure described above, when the locking pin 210 of the drain/vent valve 162 is disengaged from the complimentary locking recess 212 in the valve 158, the filter cartridge 108 and valve 158 are free to rotate, so the filter cartridge 108 can be disengaged from the base 102. As the filter cartridge 108 is rotated, the axially extending keyed projections 204, 206 of the first end cap 122 will rotate the valve 158 toward its closed position, until the axially extending keyed projections 204, 206 disengage due to axial movement of the cartridge 108 with respect to the base 102, caused by the ramps 196 and ramp-like structures 194. At the point of disengagement of the axially extending keyed projections 204, 206 of the first end cap 122 and valve 158, the torsion spring 160 will urge the valve to rotate further to the closed position of the valve 158, as shown in FIG. 28.

In embodiments of the invention utilizing a dome up orientation, as shown in FIGS. 3, 27 and 28, the drain/vent valve 162 functions as a drain. In dome down orientation, as shown in FIG. 2, the drain/vent valve functions as an air vent, to allow fluid to drain from the element 104 through the opening 152 in the closed end of the dome 138 of the housing 108.

Figure 29:
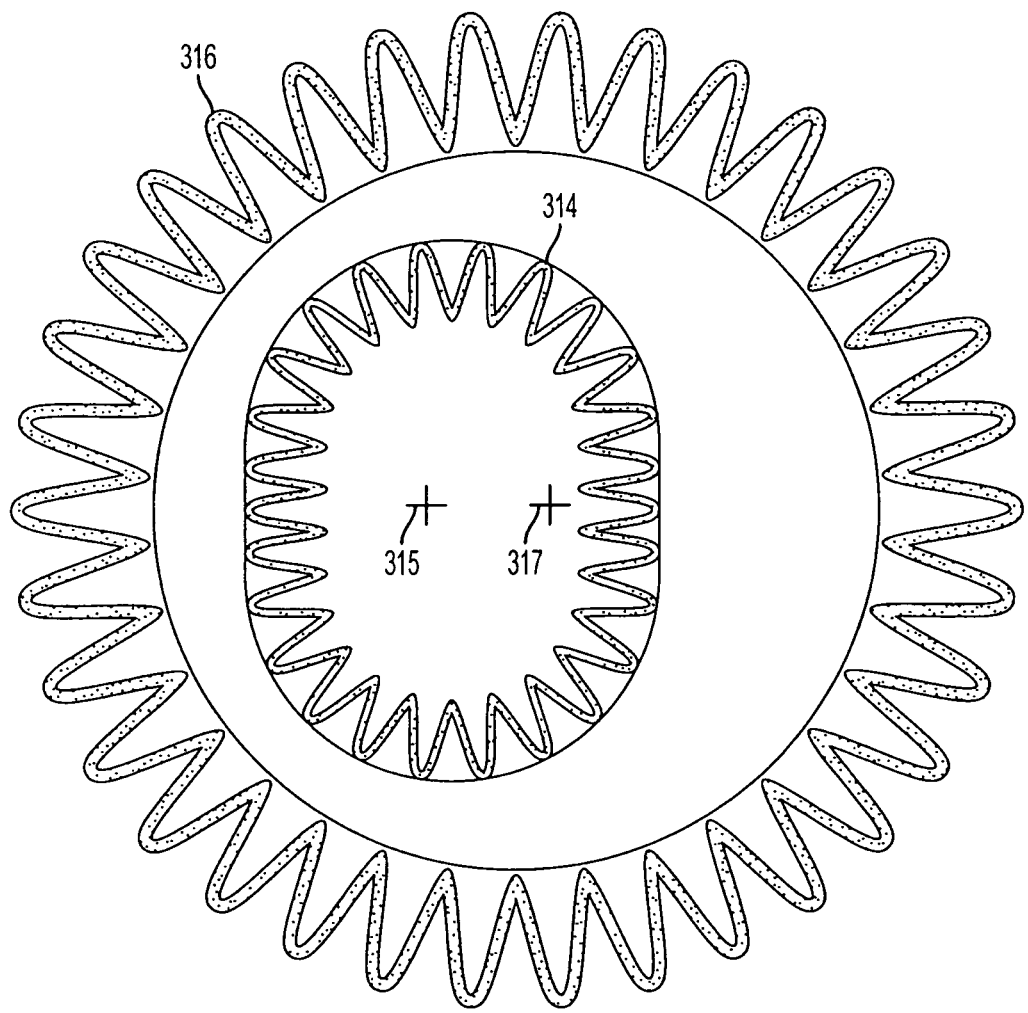
FIG. 29 is a cross-sectional view of another embodiment of the filter apparatus wherein the media packs are not concentric.

In other embodiments of the filter apparatus, the filter packs may not be concentric and the filter packs may not be annular. Referring to FIG. 29, the outer media pack 316 may have an axis 317. The inner media pack 314 may have an axis 315. In this embodiment, the axis 315 is not aligned with axis 317. In addition, the inner media pack 314 is oval in cross-section. In other embodiments, the inner media pack and the outer media pack may have other shapes in cross-section, such as polygons, i.e. triangular, rectangular, square, pentagon, hexagon or other shapes. These configurations may be used with any of the embodiments disclosed herein, as appropriate.

Figure 30:
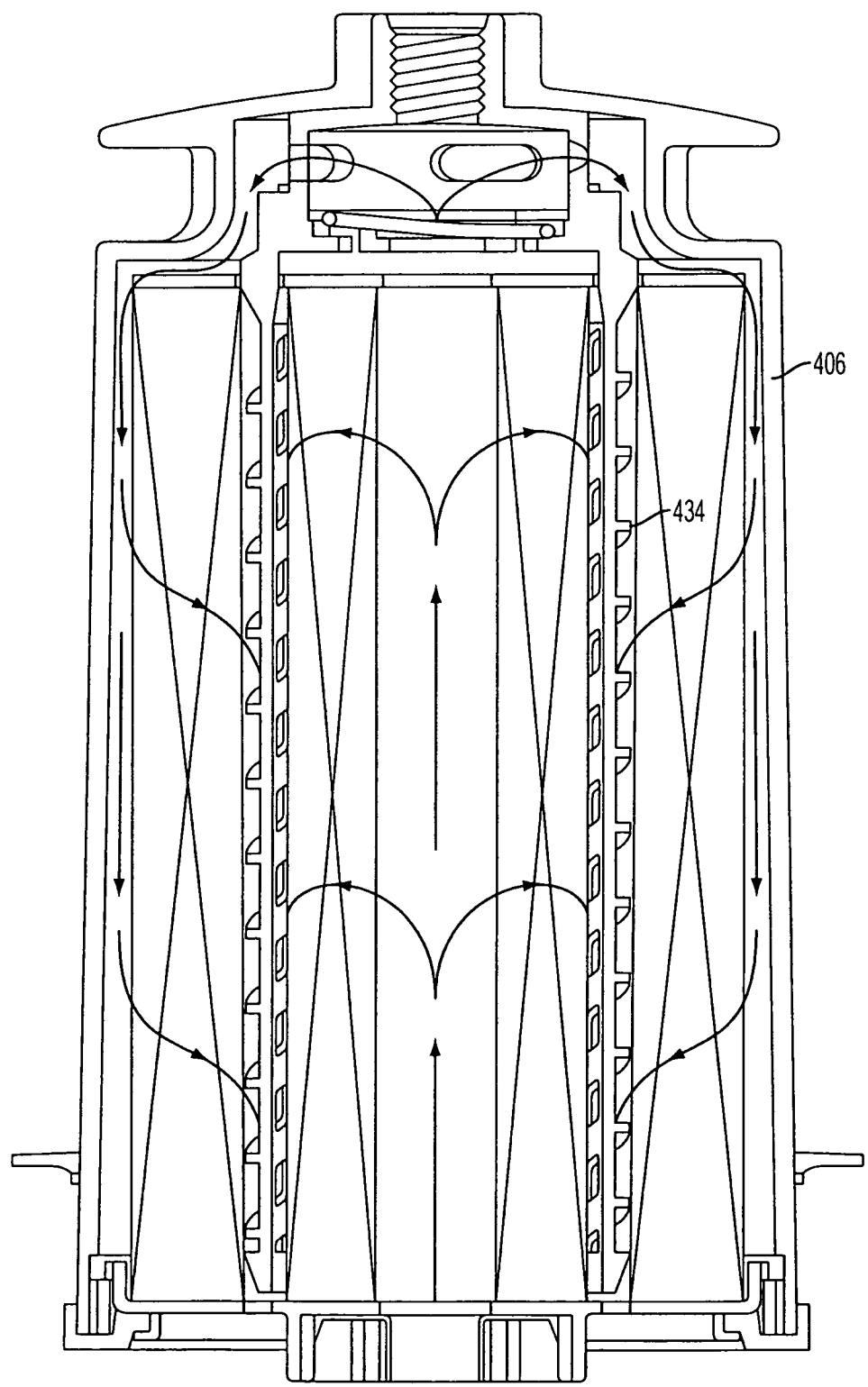
FIG. 30 is a cross-sectional view of another embodiment of the filter apparatus where the flow tube is permanently attached to the housing.

The center tube may be permanently attached to the housing. Referring to FIG. 30, in this embodiment, the flow tube 434 may be permanently attached to the filter housing 406. The flow tube may be attached by a snap fit, welding, threaded connection or press fit. The configuration may be used with any of the embodiments disclosed herein, as appropriate.

Figure 31:
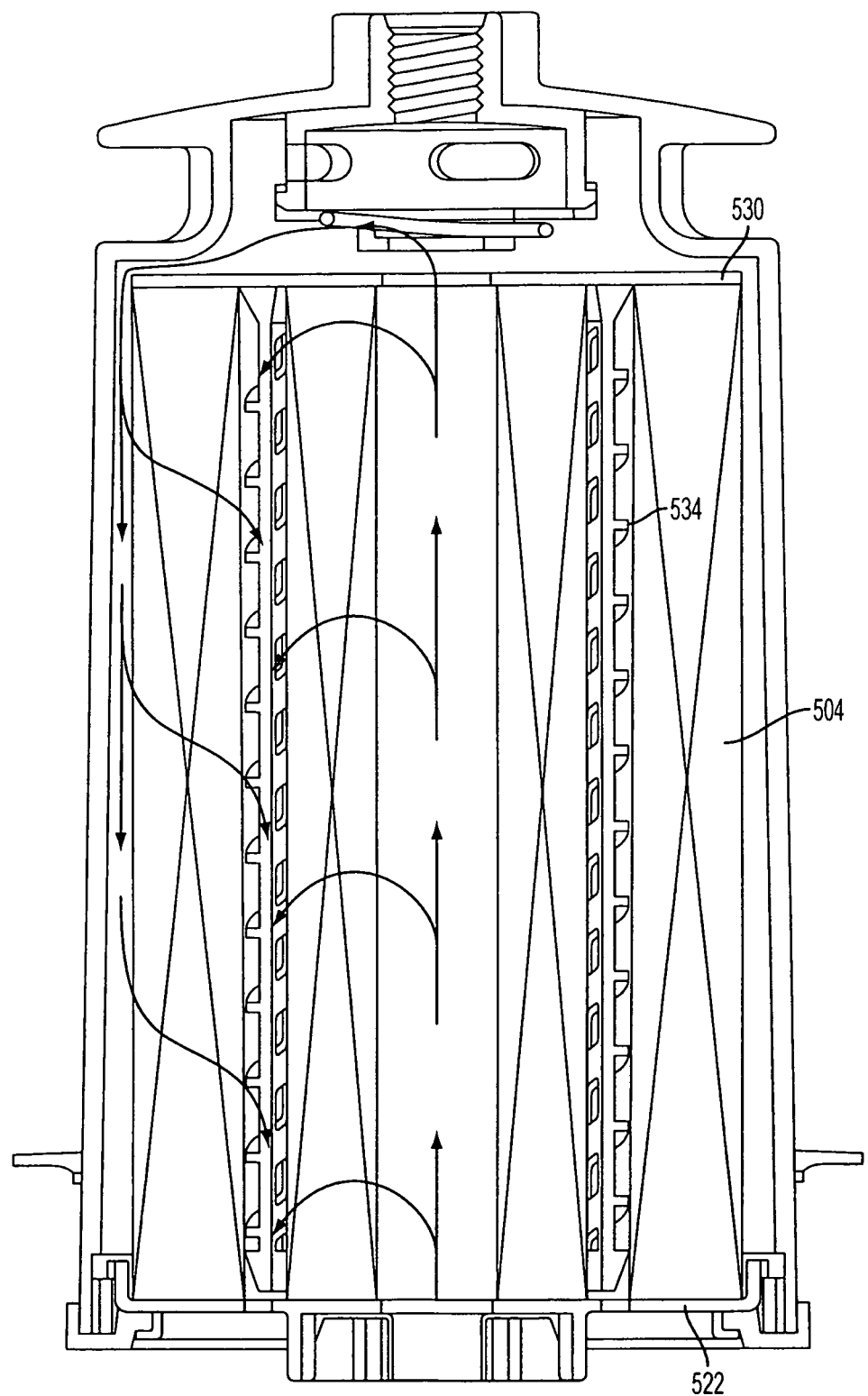
FIG. 31 is a cross-sectional view of another embodiment with the flow tube as part of the filter element.

In other embodiments the flow tube may be part of the filter element. Referring to FIG. 31, in this embodiment, the flow tube 534 is part of the filter element 504. For example, the flow tube 534 may be connected to the end cap 530. In other embodiments, the flow tube may be connected to the other end cap 522. This configuration may be used with any of the embodiments disclosed herein, as appropriate.

Figure 32:
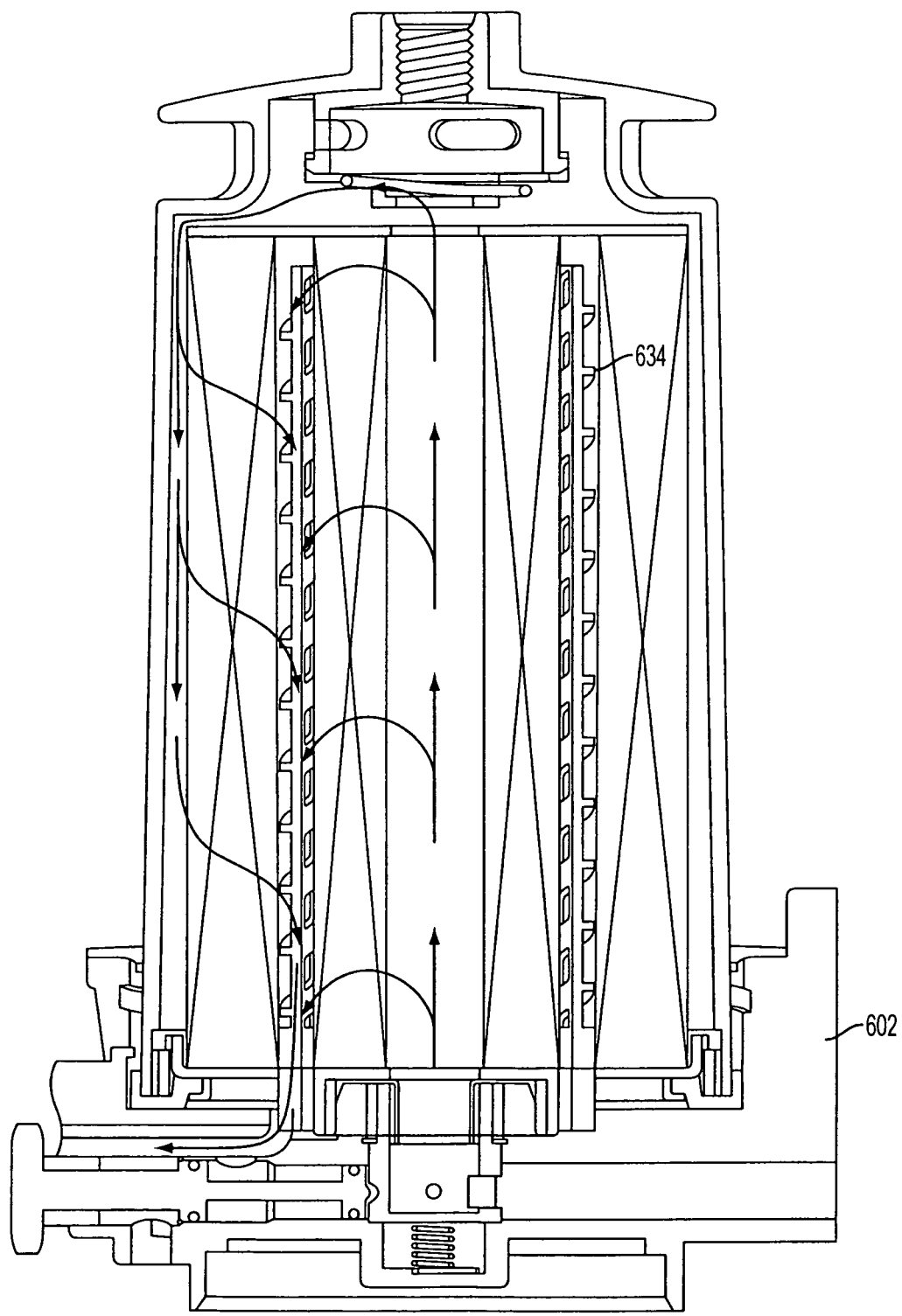
FIG. 32 is a cross-sectional view of another embodiment with the flow tube as part of the base.

In other embodiments, the flow tube may be part of the base. Referring to FIG. 32, in this embodiment, the flow tube 634 is part of the base 602. The flow tube may be connected by a snap fit, welding, threaded connection or press fit. This configuration may be used with any of the embodiments disclosed herein, as appropriate.

Figure 33:
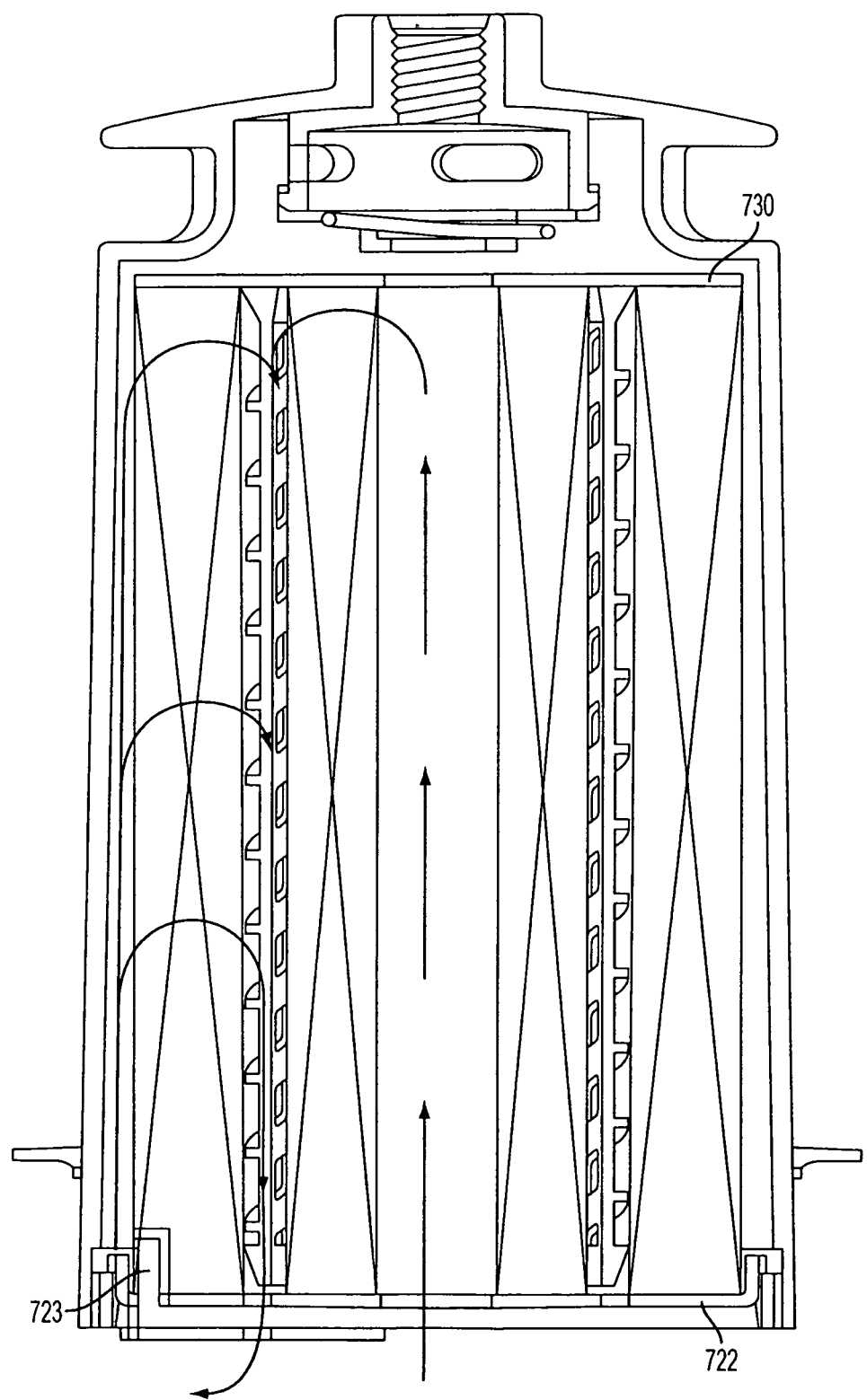
FIG. 33 is a cross-sectional view of another embodiment with a one-piece end cap at the upper end and an end cap at the lower end which has an integral flow path to the outside of the filter.

FIG. 33 shows another embodiment. The filter apparatus may have a one-piece end cap 730 at the upper end and an end cap 722 at the lower end which has an integral flow path 723 to the outside of the filter. The end cap 722 may be one part or the end cap 722 may be two or more parts connected together. This configuration may be used with any of the embodiments disclosed herein, as appropriate.

Figure 34:
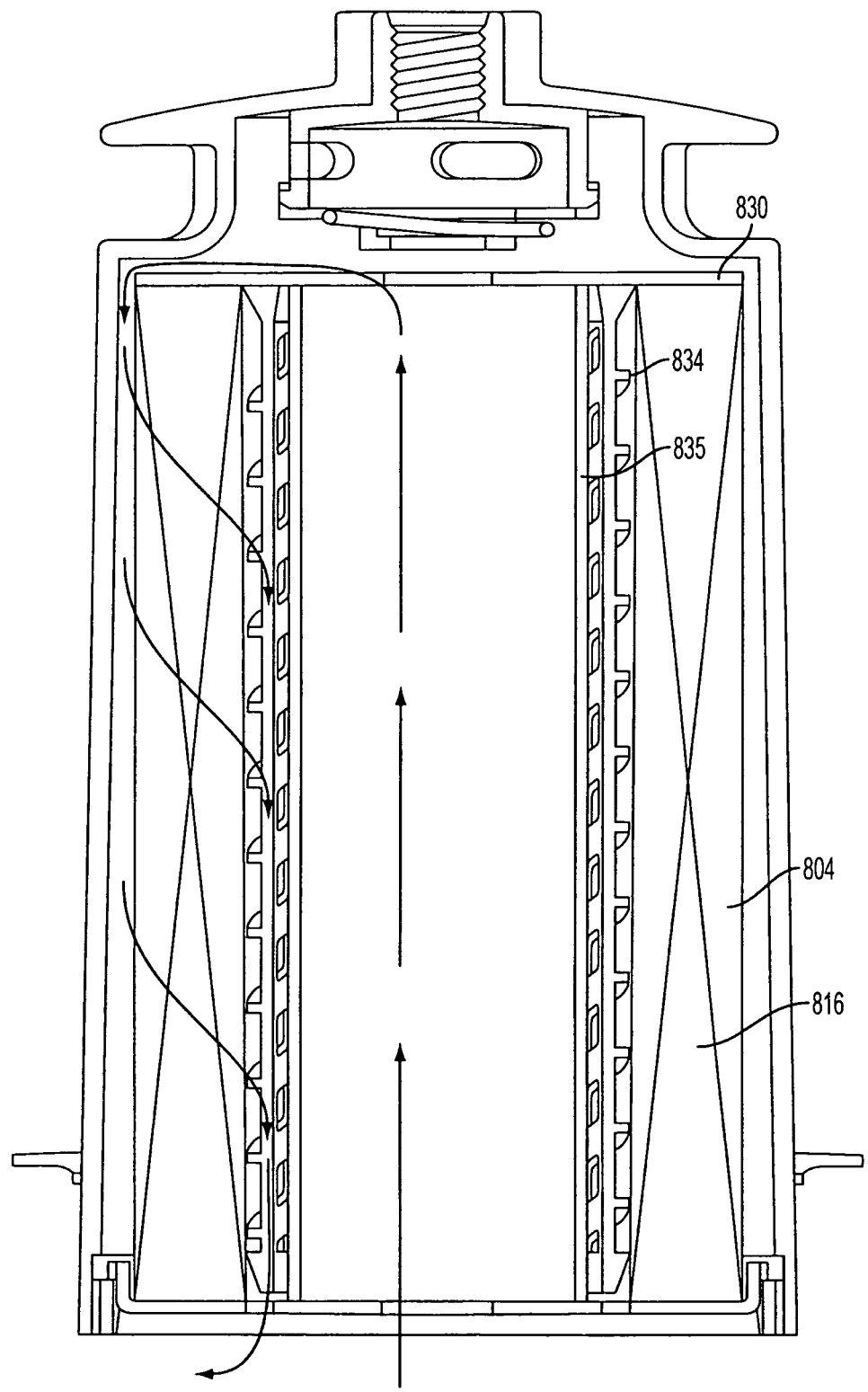
FIG. 34 is a cross-sectional view of another embodiment with an outer media pack and the flow tube is connected to the end cap.
Figure 35:
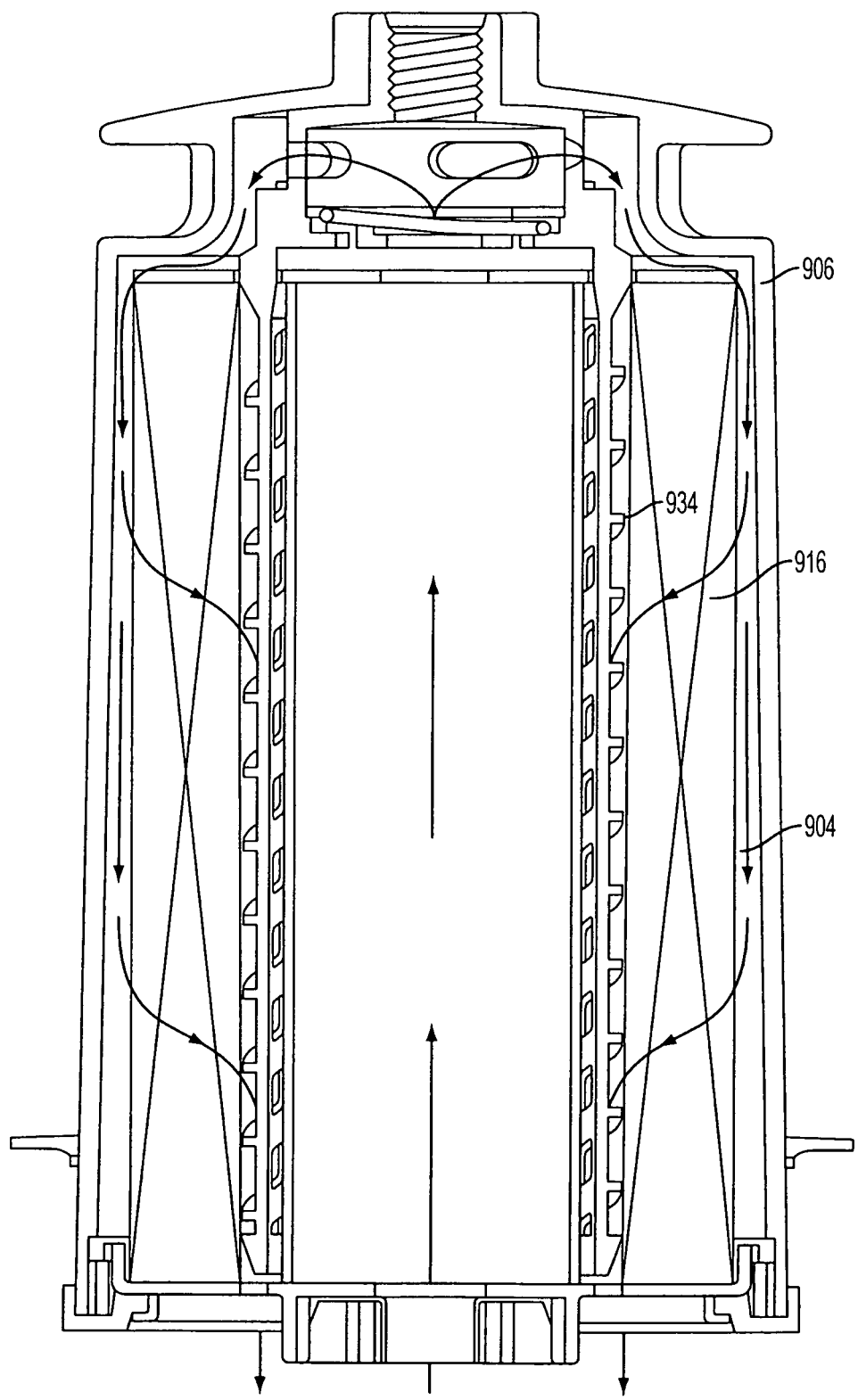
FIG. 35 is a cross-sectional view of another embodiment where the flow tube is connected to the housing.
Figure 36:
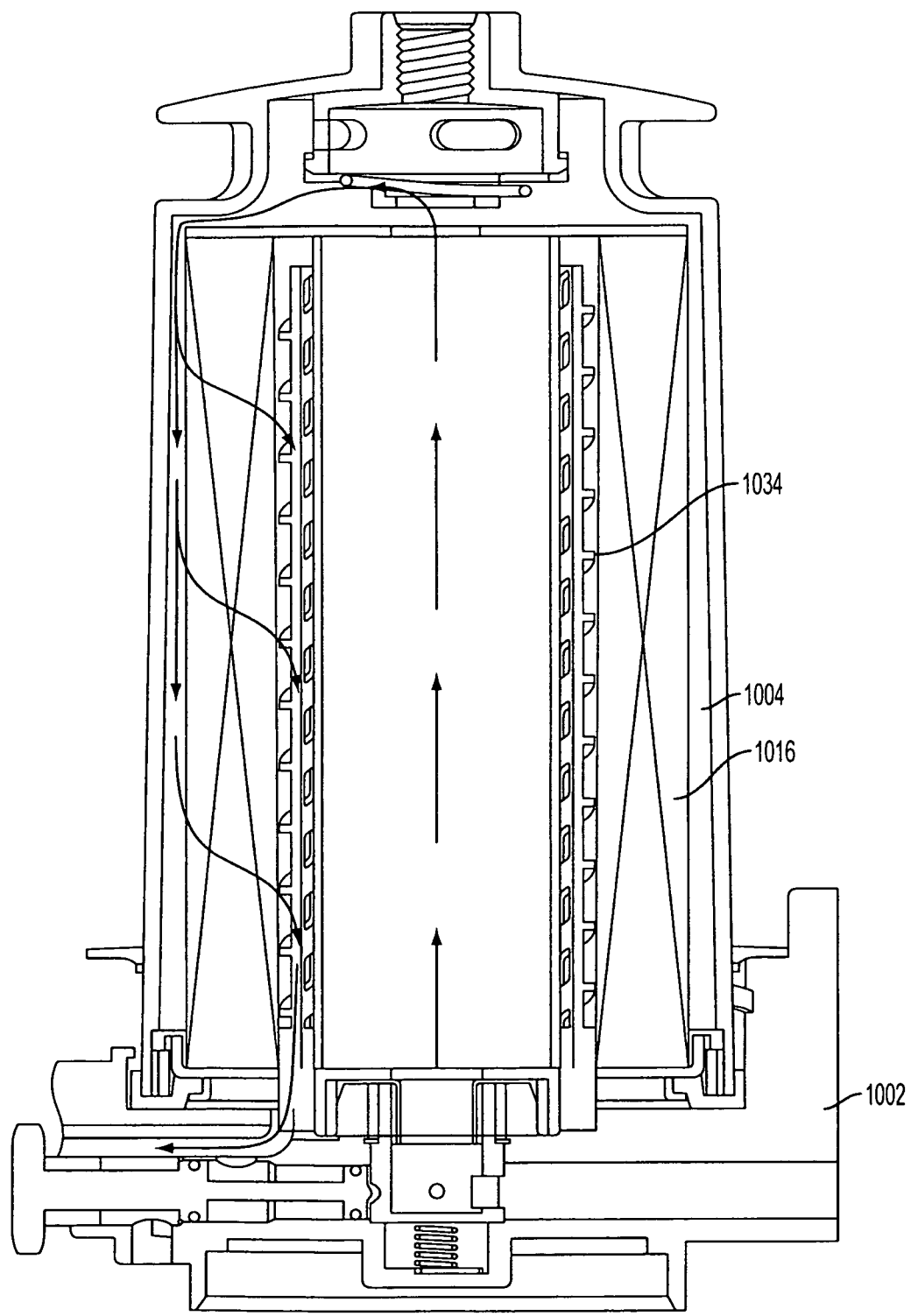
FIG. 36 is a cross-sectional view of another embodiment with an outer media pack and the flow tube is connected to the base.

In other embodiments the filter apparatus may have a single outer element and no inner element. Referring to FIG. 34, the filter element 804 may include only an outer media pack 816. In addition, the flow tube 834 may include a solid wall 835. Thus, the fluid moves to the top of the filter and enters the media pack 816 from the outside to the inside as shown by the flow arrows. Furthermore, the flow tube 834 may be connected to the filter. For example, the flow tube 834 may be connected to the end cap 830. In another embodiment, as shown in FIG. 35, the flow tube 934 may be connected to the housing 906. In this embodiment, the filter element 904 may include only an outer media pack 916. In yet another embodiment, as shown in FIG. 36, the flow tube 1034 may be connected to the base 1002. In this embodiment, the filter element 1004 may include only an outer media pack 1016. These configurations may be used with any of the embodiments disclosed herein, as appropriate.

Figure 37:
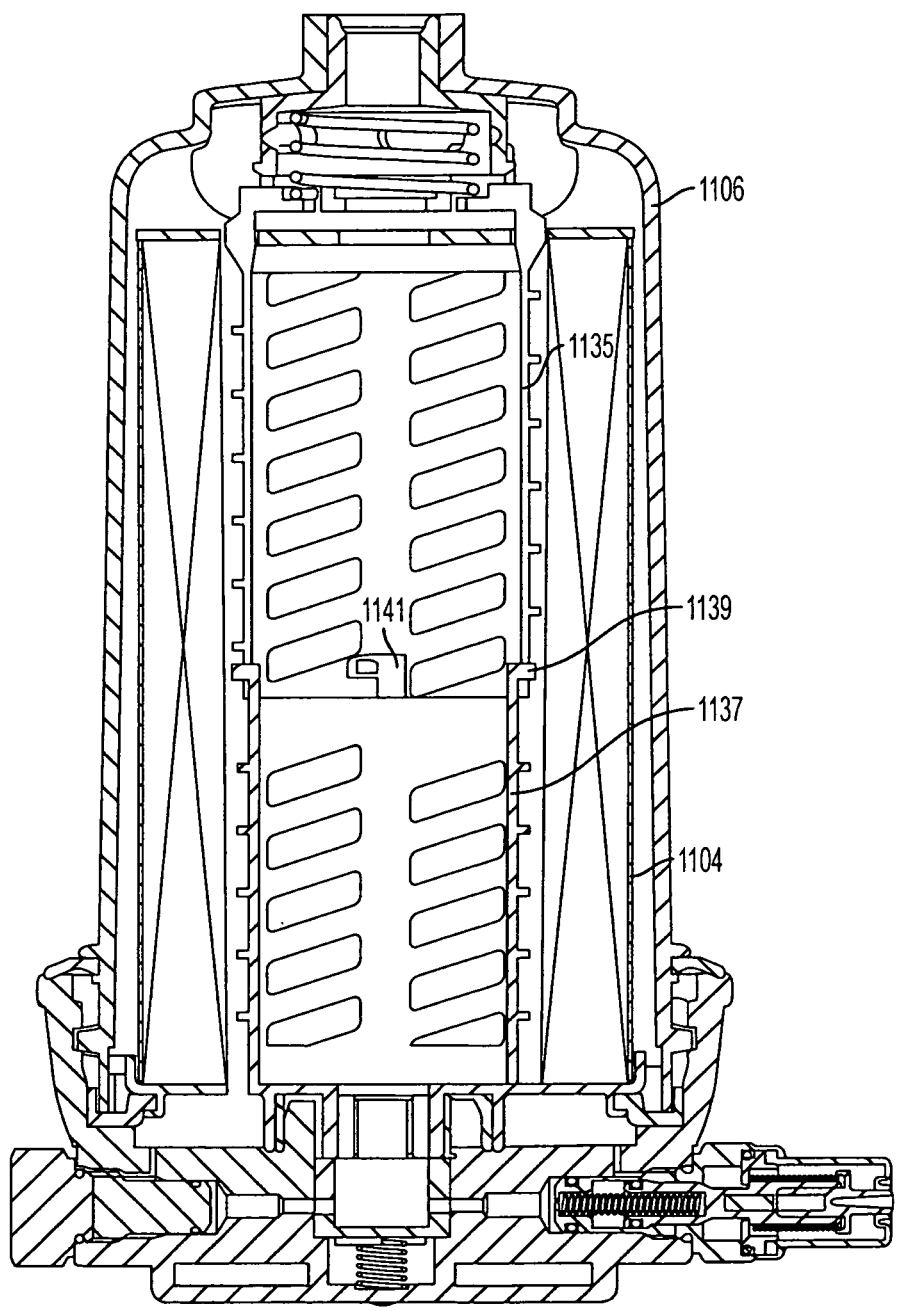
FIG. 37 is a cross-sectional view of another embodiment with a flow tube wherein one portion of the flow tube is attached to the housing and the other portion of the flow tube is attached to the filter element.

FIG. 37 is a cross-sectional view of another embodiment with a two part flow tube. The first portion 1135 of the flow tube is attached to the housing 1106. The second portion 1137 of the flow tube is attached to the filter element 1104. In one embodiment, the first portion 1135 may be connected to the second portion 1137. For example, as shown in FIG. 37, the first portion 1135 may be connected to the second portion 1137 by a tab 1139 and notch 1141 configuration. In other embodiments, other connection techniques may be used. This configuration may be used with any of the embodiments disclosed herein, as appropriate.

Figure 38:
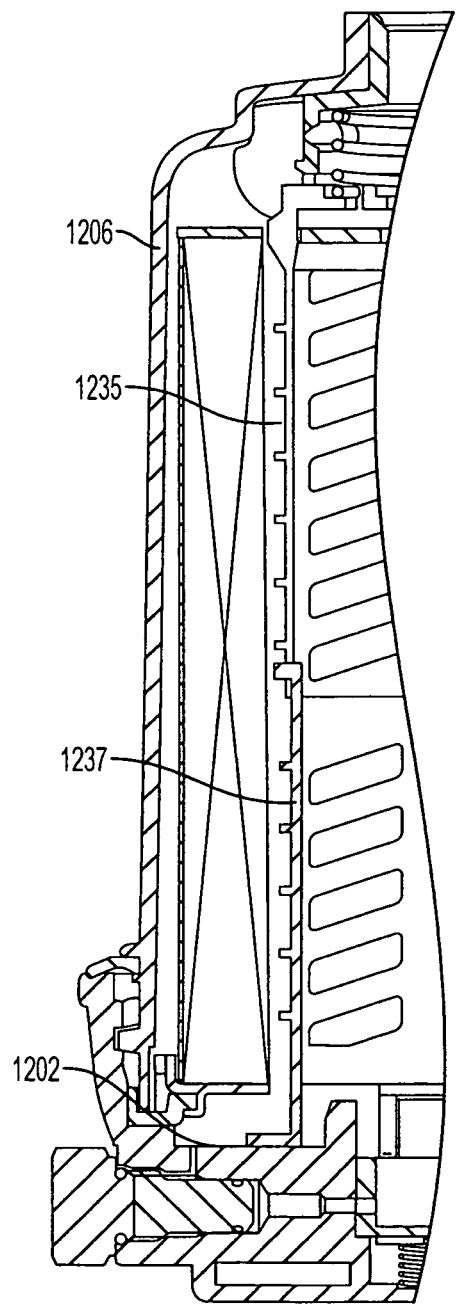
FIG. 38 is a cross-sectional view of another embodiment with a flow tube wherein one portion of the flow tube is attached to the housing and the other portion of the flow tube is attached to the base.

Referring to FIG. 38, another embodiment with a two part flow center tube is shown. In this embodiment, the first portion 1235 of the flow tube is attached to the housing 1206 and the second portion 1237 of the flow tube is attached to the base 1202. This configuration may be used with any of the embodiments disclosed herein, as appropriate.

Figure 39:
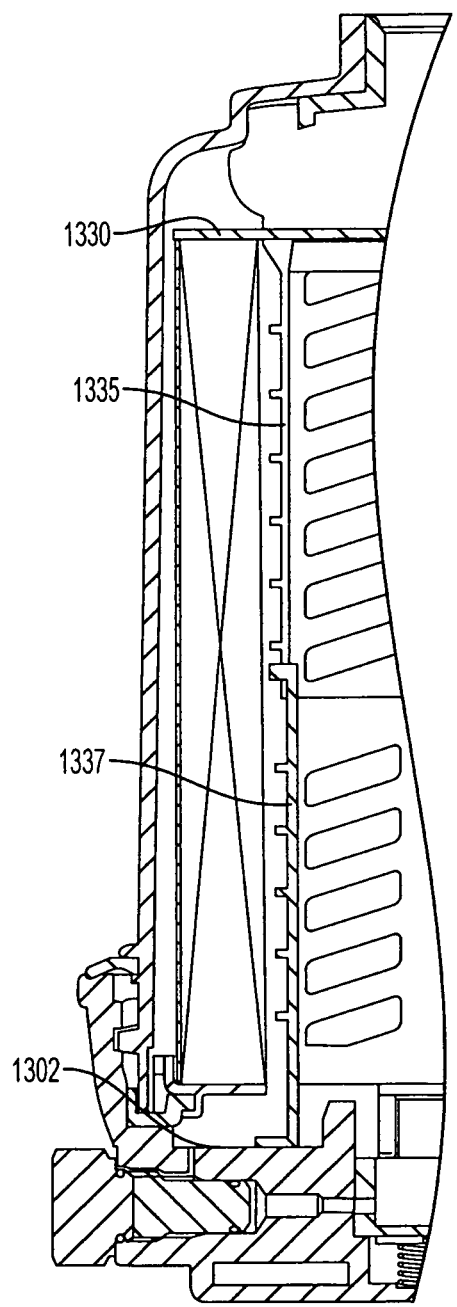
FIG. 39 is a cross-sectional view of another embodiment with a flow tube wherein a portion of the flow tube is attached to the top end cap of the filter element and the other portion is attached to the base.

Another embodiment with a two part flow tube is shown in FIG. 39. In this embodiment, the first portion 1335 of the flow tube is attached to the top end cap 1330 of the filter element and the second portion 1337 is attached to the base 1302. This configuration may be used with any of the embodiments disclosed herein, as appropriate.

Figure 40:
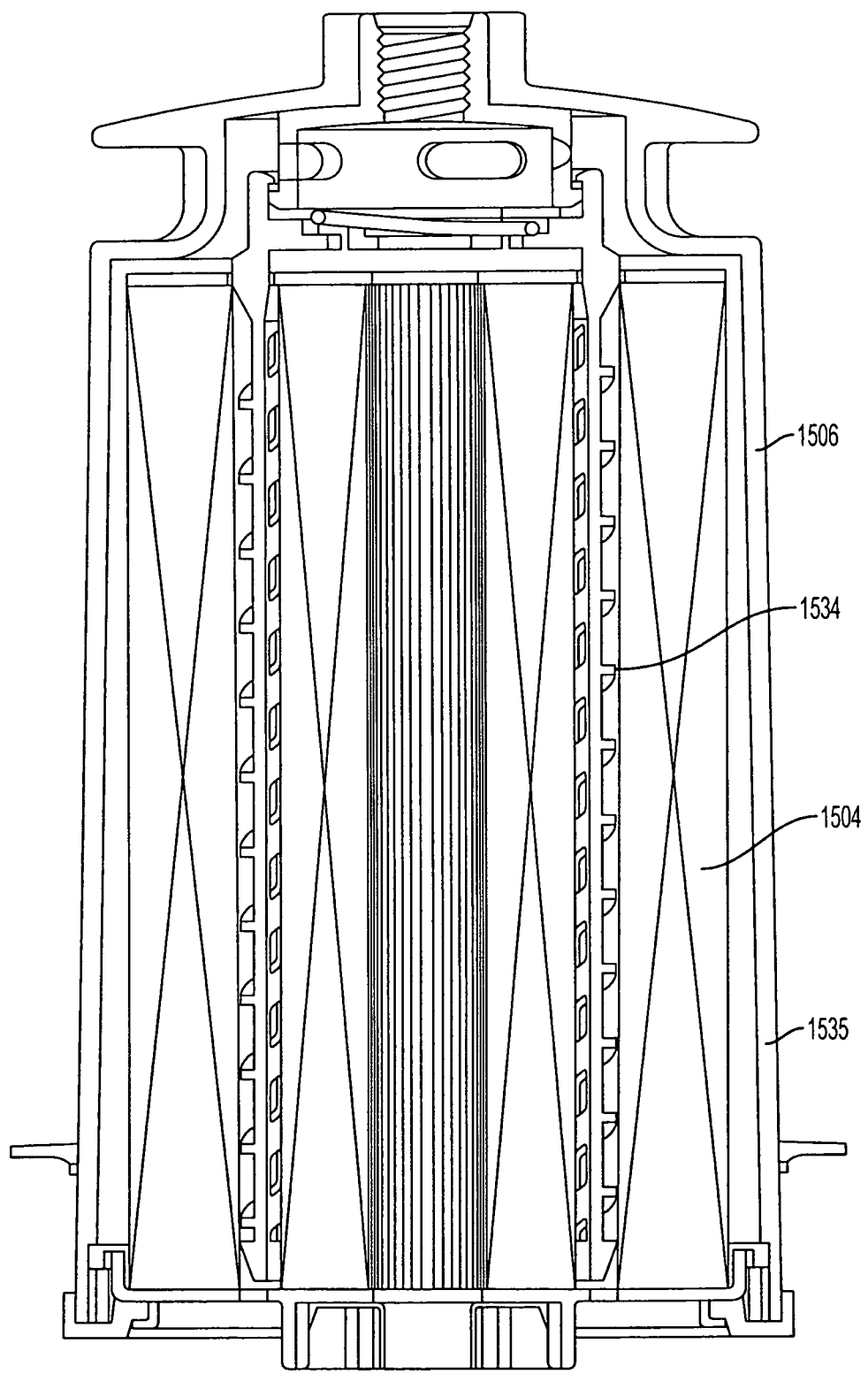
FIG. 40 is a cross-sectional view of another embodiment with the housing, flow tube and filter permanently attached.

Referring to FIG. 40, another embodiment of the filter apparatus is shown. In this embodiment, the housing 1506, the flow tube 1534 and the filter element 1504 are permanently attached together as an assembly 1535. Thus, when a user wishes to change the filter, the user merely replaces the entire assembly 1535 with a new filter assembly 1535 which includes the housing, flow tube and filter element. This configuration may be used with any of the embodiments disclosed herein, as appropriate.

Figure 41:
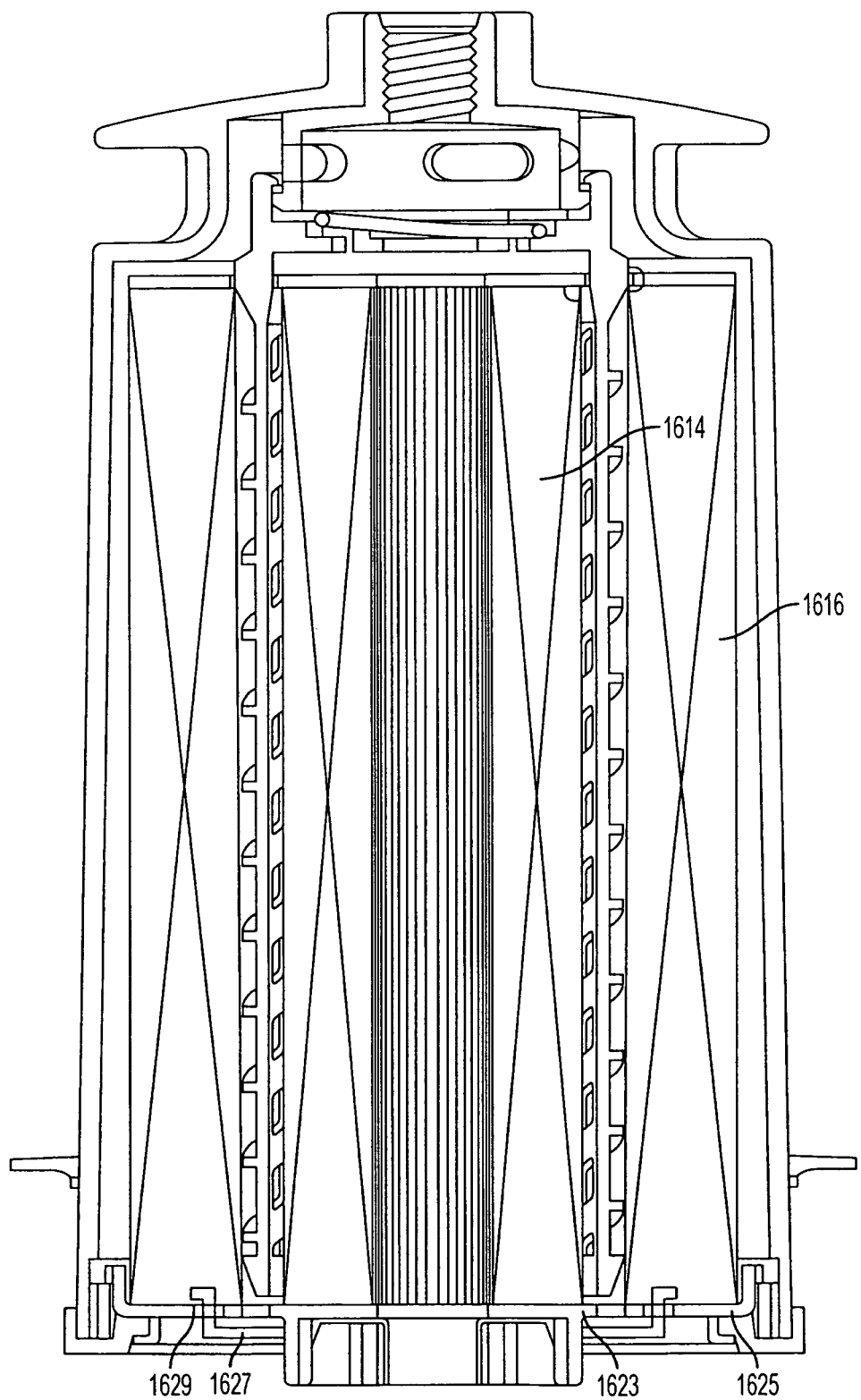
FIG. 41 is a cross-sectional view of another embodiment wherein the inner and outer media packs are separate and the two bottom end caps are attached together.

In another embodiment, the inner media pack and the outer media pack could be replaced separately. Referring to FIG. 41, in this embodiment, the inner media pack 1614 and the outer media pack 1616 may be replaced separately. The inner media pack may have an end cap 1623 and the outer media pack may have an end cap 1625. The end caps may be connected together. For example, the end caps may lock together with a tab 1627 and a notch 1629 as shown in FIG. 41. In other embodiments, the two end caps may snap together or may have mating ribs. Thus, the user may replace either one of the media pack without replacing the other media pack. In addition, the user can combine different media packs in order to customize the filter apparatus. For example, the user may use an inner media pack made of extremely efficient water removing material with an outer media pack made of pleated cellulose of efficiency appropriate for normal operation. Another user may use an inner media pack made of media with fuel conditioning chemical additives and outer media pack made of less than normal efficiency pleated cellulose appropriate for higher flow operation. At the next filter change, the users may decide to utilize different media packs. These configurations may be used with any of the embodiments disclosed herein, as appropriate.

Figure 42:
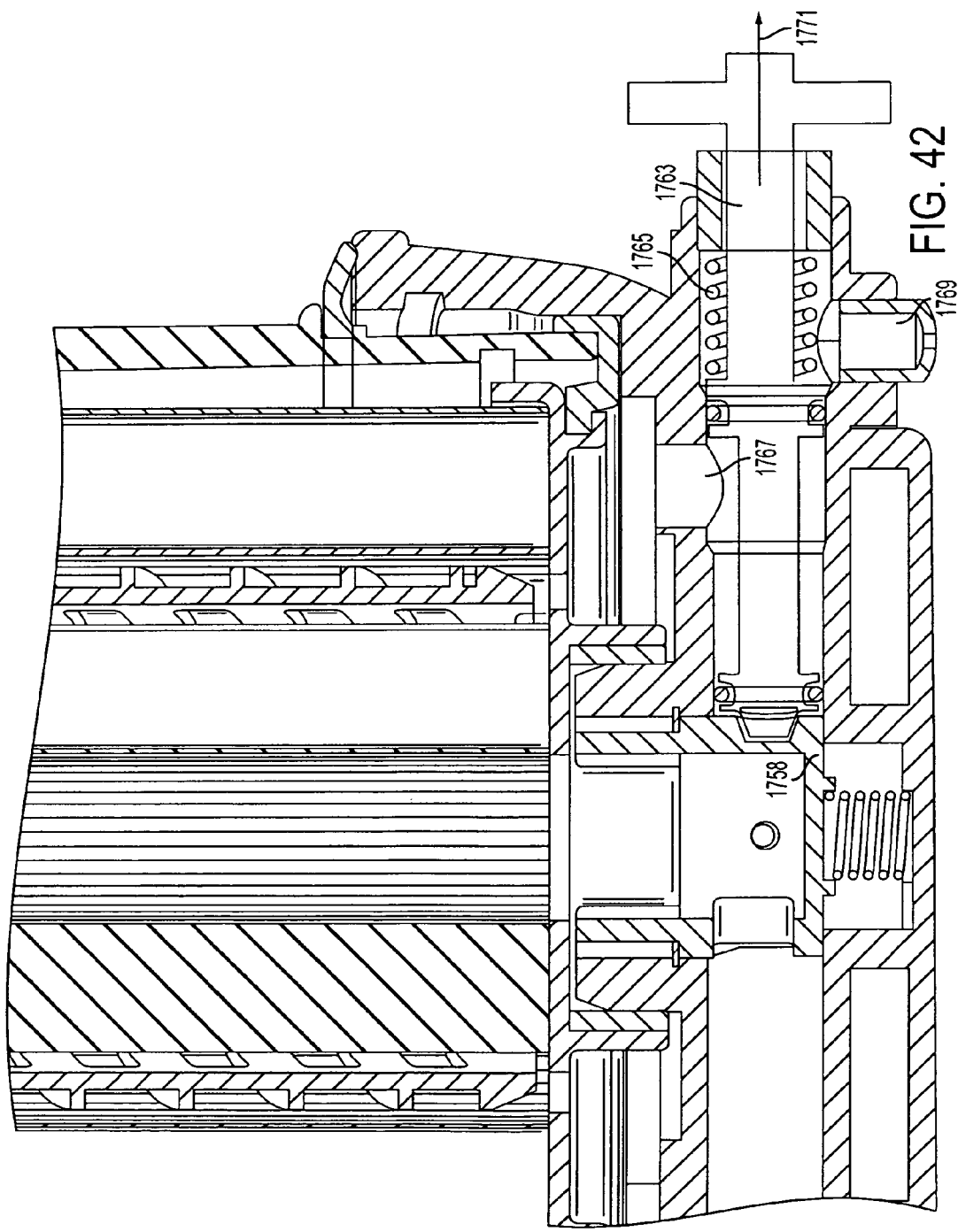
FIG. 42 is a cross-sectional view of another embodiment which uses a pin to engage the valve.

Referring to FIG. 42, another embodiment of the filter apparatus is shown. In this embodiment, a pin 1763 may be used to engage the valve 1758. The pin may be biased in the closed position by a spring 1765. When a user wishes to drain or vent the system, the user would pull the pin 1763 in direction 1771 so that the outlet passage 1767 may be connected with the drain/vent port 1769. When the user has completed draining or venting the system, the user may release the pin 1763 and the spring 1765 will return the pin to the first position. The pin may be used with any of the embodiments disclosed herein as appropriate.

Figure 43:
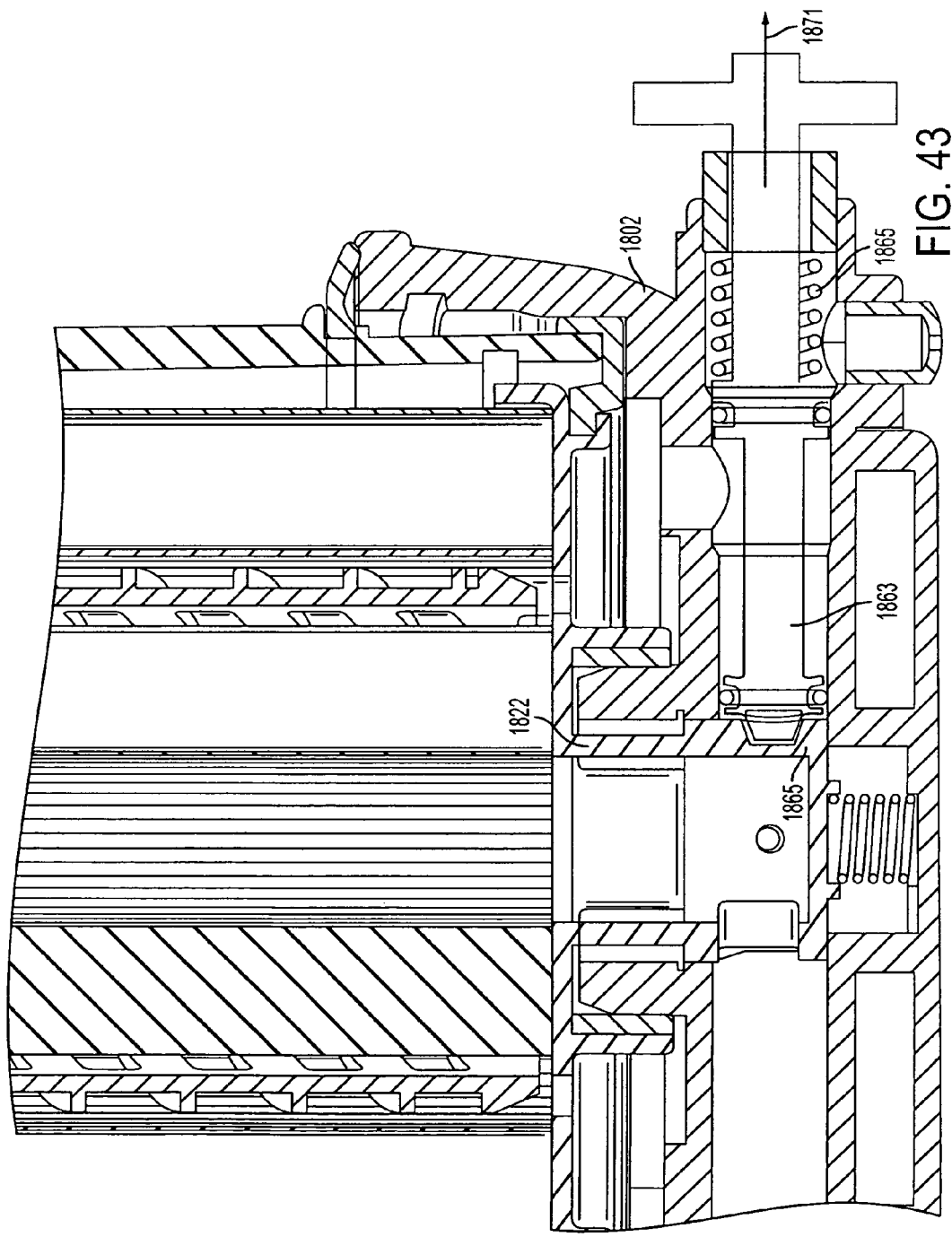
FIG. 43 is a cross-sectional view of another embodiment with a pin which engages the end cap.

For example, FIG. 43 shows another embodiment in which the pin engages the end cap. In this embodiment, the pin engages the end cap 1822 which extends into the base 1802. The pin 1863 engages a detent 1865 in the end cap 1822. Thus, the user is able to lock the filter element into position to prevent rotation. When the user wishes to change the filter element, the user would pull the pin 1863 in direction 1871 so that the end cap may rotate. This configuration may be used with any of the embodiments disclosed herein, as appropriate.

Figure 44:
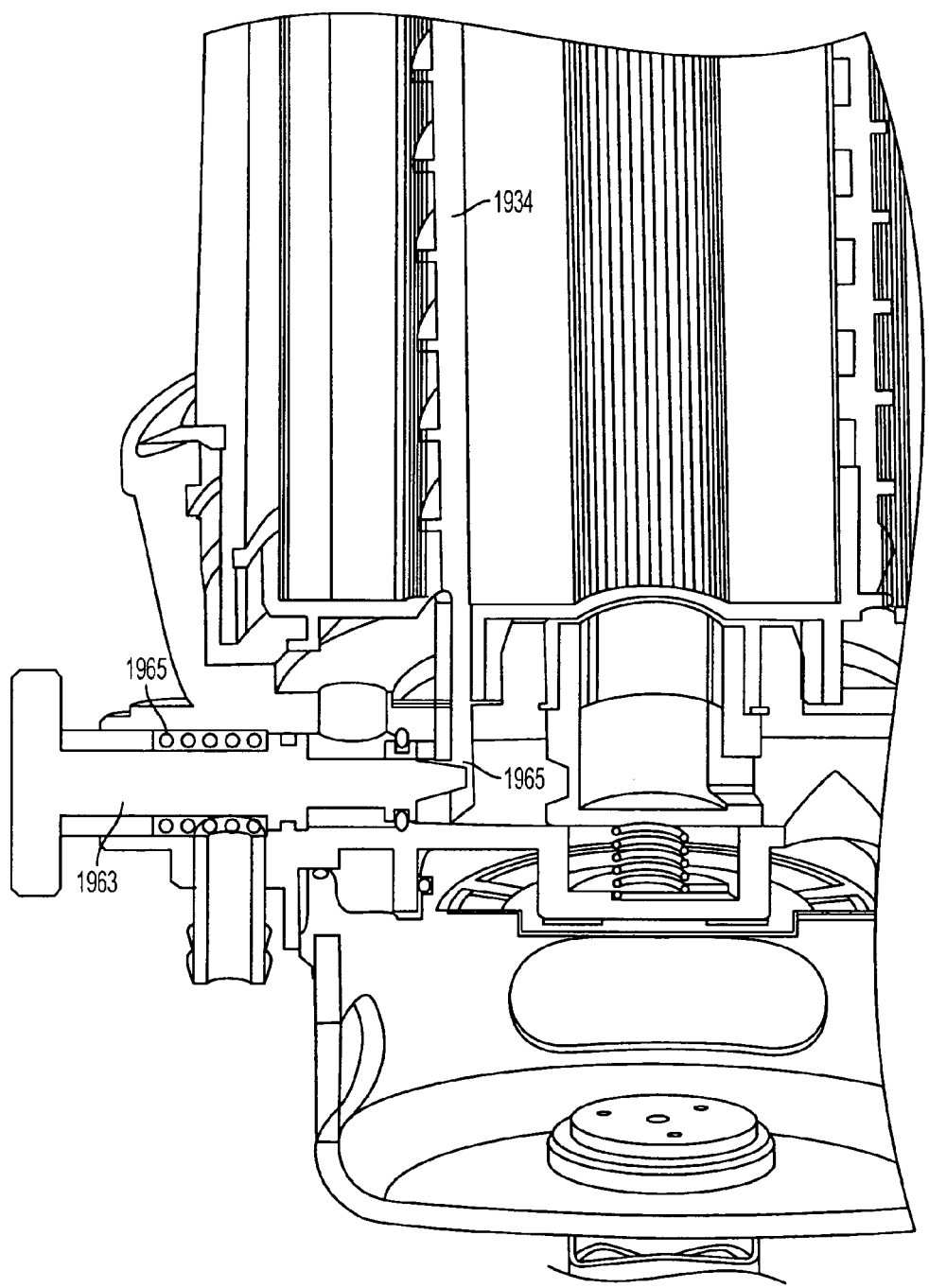
FIG. 44 is a cross-sectional view of another embodiment with a knob engaging the center tube.

Referring to FIG. 44, another embodiment of the filter apparatus is shown. In this embodiment a spring pin 1963 engages the flow tube 1934. The flow tube 1934 may include a detent 1965 which the pin 1963 may engage. Thus, this arrangement prevents rotation of the filter element. In another embodiment, a threaded drain valve may be used in place of the spring biased pin. This configuration may be used with any of the embodiments disclosed herein, as appropriate.

Referring to FIG. 45, another embodiment of the filter apparatus is shown. In this embodiment, the housing 2006 may include a collar 2007. The collar may include a ramp 2009 on the interior of the collar. The base 2002 may include a ramp 2011. The ramp may be located on the exterior of the base. The ramp 2009 on the collar will engage the ramp 2011 on the base. In addition, the housing may include an exterior ramp 2096 which may engage an interior ramp 2094 in the base. The collar 2007 may be used to lock the housing to the base. This configuration may be used with any of the embodiments disclosed herein as appropriate.

Figure 46:
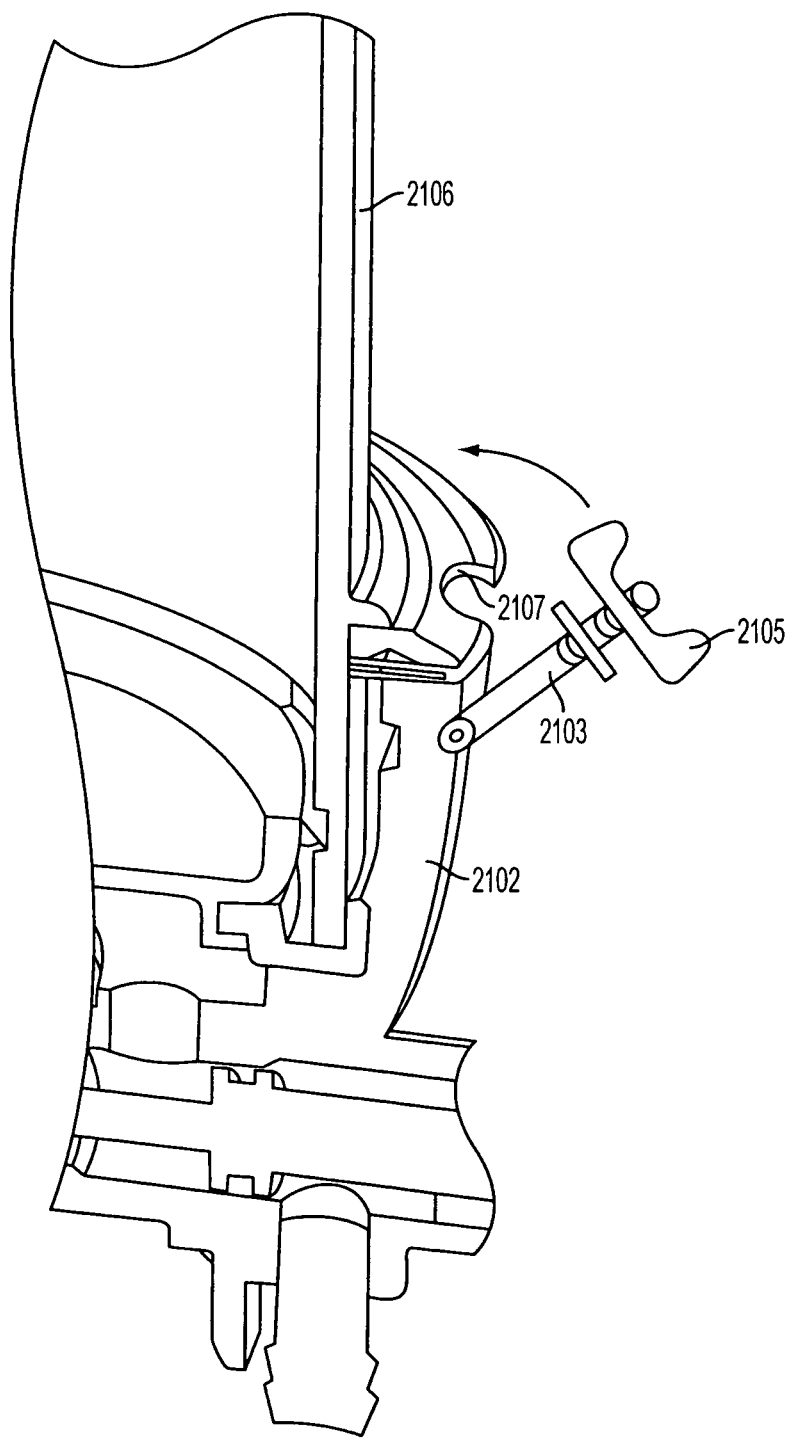
FIG. 46 is a perspective view of another embodiment which utilizes a rotating bolt to attach the base to the housing.

FIG. 46 shows another embodiment of a locking mechanism. The base 2102 may include a threaded pin 2103. A fastener 2105, such as a wing nut, may be connected to the threaded pin 2103. The housing 2106 may include a notch 2107 which may be engaged by the pin 2103. After the housing has been assembled to the base, the user may position the pin 2103 in the notch 2107 and then tighten the fastener 2105. Thus, the housing may be locked to the base. This configuration may be used in any of the embodiments disclosed herein as appropriate.

Figure 47:
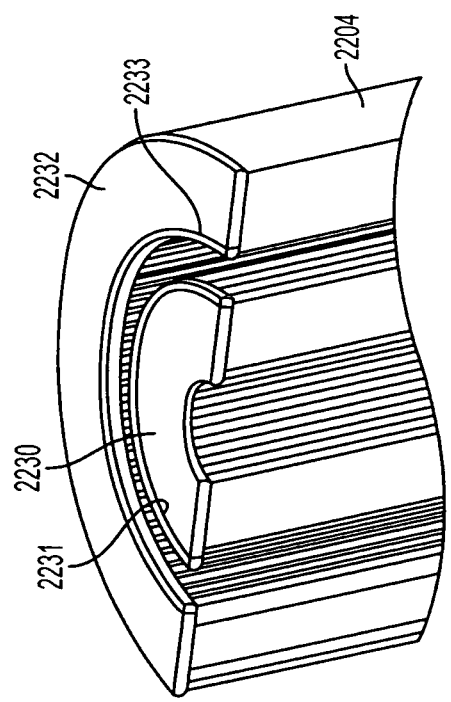
FIG. 47 is a perspective view of another embodiment of the filter element with overmolded seals.

Referring to FIG. 47, another embodiment of the filter element is shown. In this embodiment, the filter element may include end caps with seals. The filter element 2204 may include an inner end cap 2230 and an outer end cap 2232. The end caps may include seals 2231 and 2233, which are connected to the end caps. In one embodiment, the seals may be connected to the end caps by overmolding. Thus, the seals may be made of a material different than the end caps. In one embodiment, the seals may be made of an elastomer and the end caps may be made of a plastic. This seal configuration may be used with any of the embodiments disclosed herein as appropriate.

Figure 48:
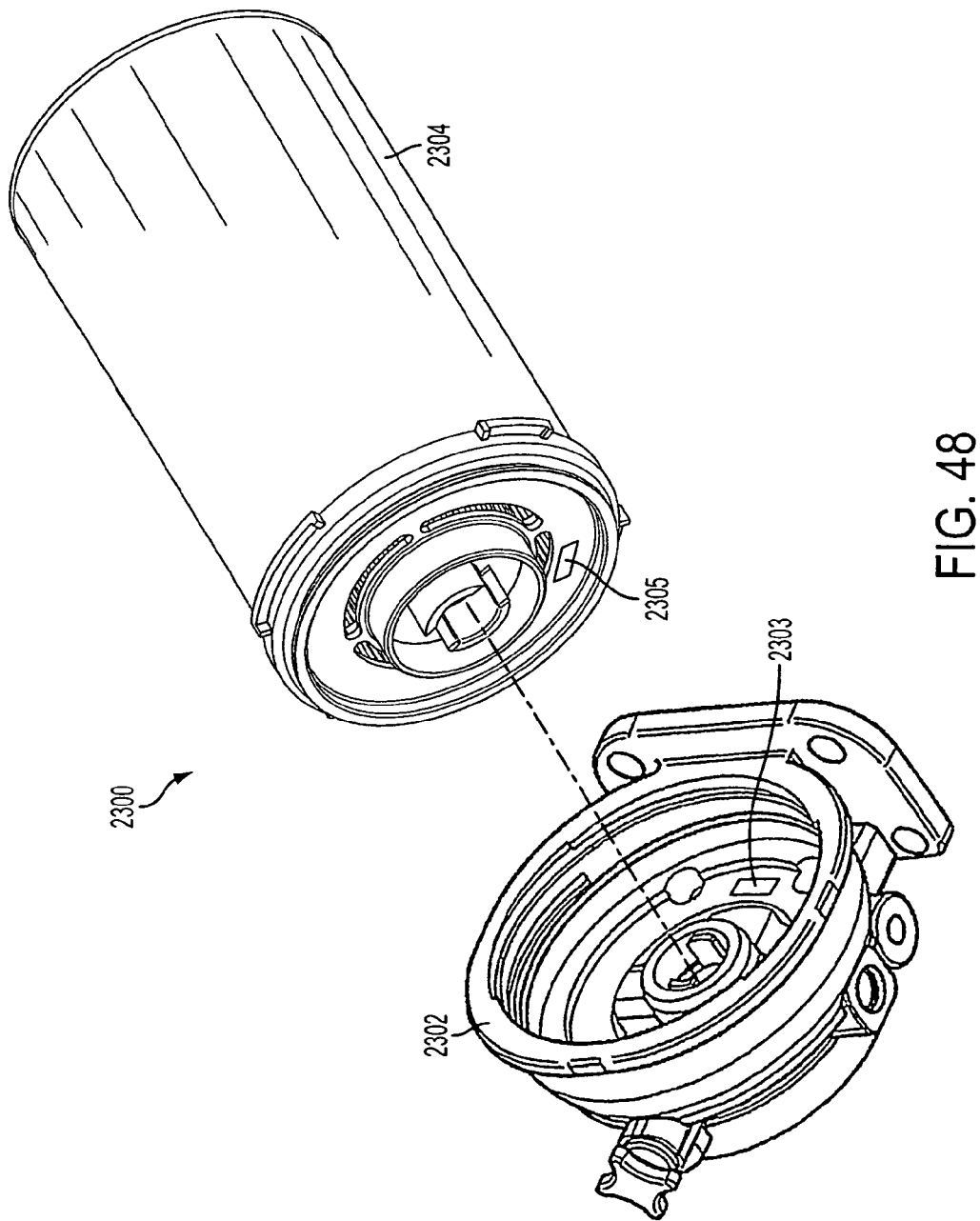
FIG. 48 is a perspective view of another embodiment of a filter with an RFID tag and an RFID reader.

The filter apparatus may also include a system for providing information relating to the filter apparatus. Referring to FIG. 48, the filter apparatus 2300 may include a radio frequency identification (RFID) system. In this embodiment, the filter 2304 may include an RFID tag 2305 and the base 2302 may include an RFID reader 2303. When the filter is positioned into the base, the reader 2303 will be able to read the tag 2305. The tag will be able to provide information to the system, such as whether the proper filter has been utilized, the manufacturer of the filter, the date of manufacture of the filter and other filtration parameters. In addition, the system will indicate whether the filter change has been completed and the mileage and/or date of the filter change. In other embodiments, the reader may be located in another location on the vehicle and may be able to read information concerning other filters, such as the primary fuel filter, secondary fuel filter, primary lubrication filter or secondary lubrication filter. Other systems for providing information concerning the filter apparatus may include two dimensional bar codes, three dimensional bar codes, resistors, reed switches, mechanical switches, magnets, conductive plastic, conductive ink, or other systems. These configurations may be included in any of the embodiments disclosed herein as appropriate.

Figure 49:
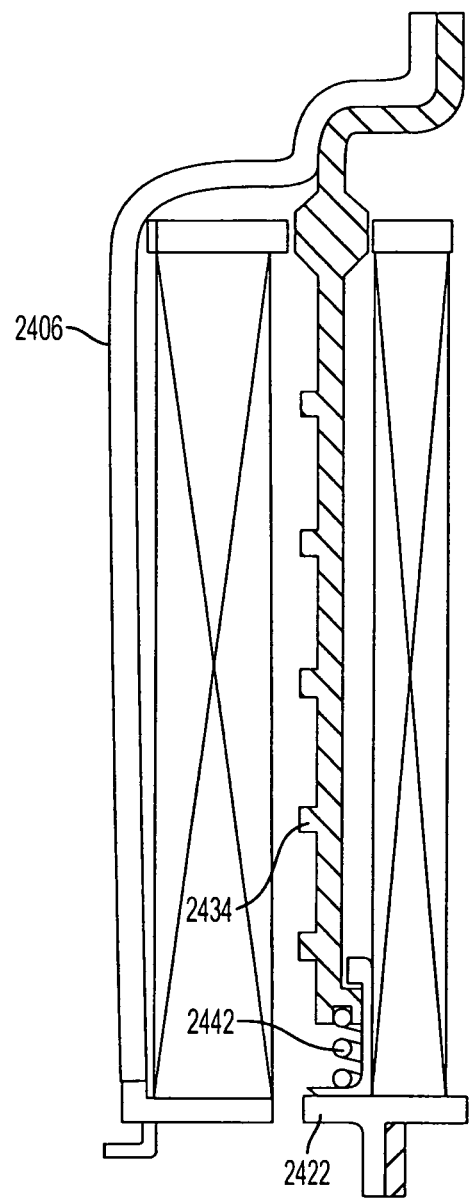
FIG. 49 is a cross-sectional view of another embodiment which shows a spring at the base end of the filter element.
Figure 50:
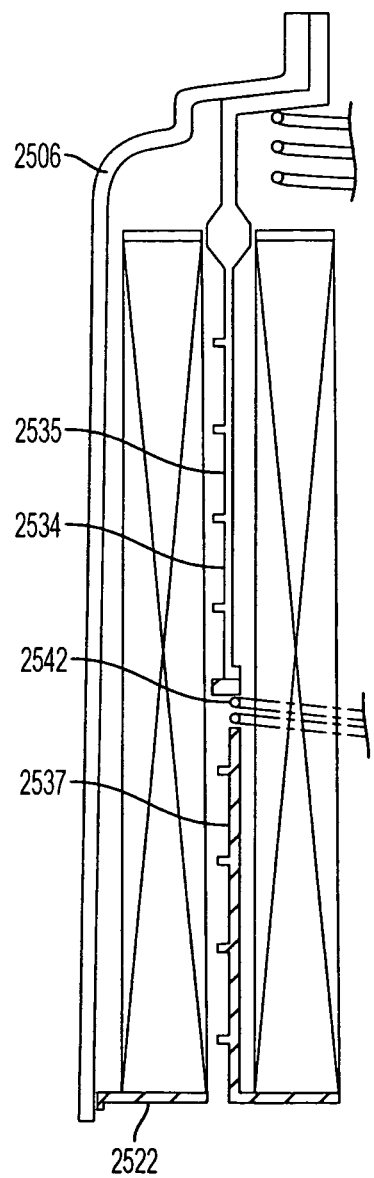
FIG. 50 is a cross-sectional view of another embodiment which shows a flow tube with a first and second portions and a spring located between the two portions.

Referring to FIG. 49, another embodiment of the filter apparatus is shown. In this embodiment, a spring is located at the base end of the flow tube. As shown in FIG. 50, a spring 2442 is located between the flow tube 2434 and the end cap 2422. The center tube 2434 may be connected to the housing 2406. This configuration may be used with any of the embodiments disclosed herein, as appropriate.

Referring to FIG. 50, another embodiment of the filter apparatus is shown. In this embodiment the flow tube 2534 includes a first portion 2535 and a second portion 2537. The first portion 2535 is connected to the housing 2506. The second portion 2537 is connected to the end cap 2522. A spring 2542 may be located between the first portion 2535 and the second portion 2537. This configuration may be used with any of the other embodiments disclosed herein as appropriate.

The outer wrapping may be attached to the filter element in several ways. Referring to FIGS. 51 and 52, the outer wrapping 2736 may be applied to the filter material 2737 with an adhesive 2739. If the filter material 2737 is a pleated filter, then the adhesive may be applied to the pleat tips. The outer wrapping 2736 will maintain the spacing of the pleats. The configuration may be used with any of the embodiments disclosed herein, as appropriate.

Referring to FIGS. 53 and 54, the outer wrapping 2836 may be potted into the end cap 2816. In another embodiment shown in FIG. 55, the outer wrapping 2936 may be spaced from the end cap 2916 and/or end cap 2922 to create a gap 2917 and gap 2923. In yet another embodiment, the outer wrapping 3036 may be attached to the outside diameter of the end cap 3016 as shown in FIG. 57. In another embodiment, the outer wrapping 3136 may be folded over the end cap 3116 as shown in FIG. 58. Any of these configurations may be used with any of the embodiments disclosed herein, as appropriate.

Figure 59:
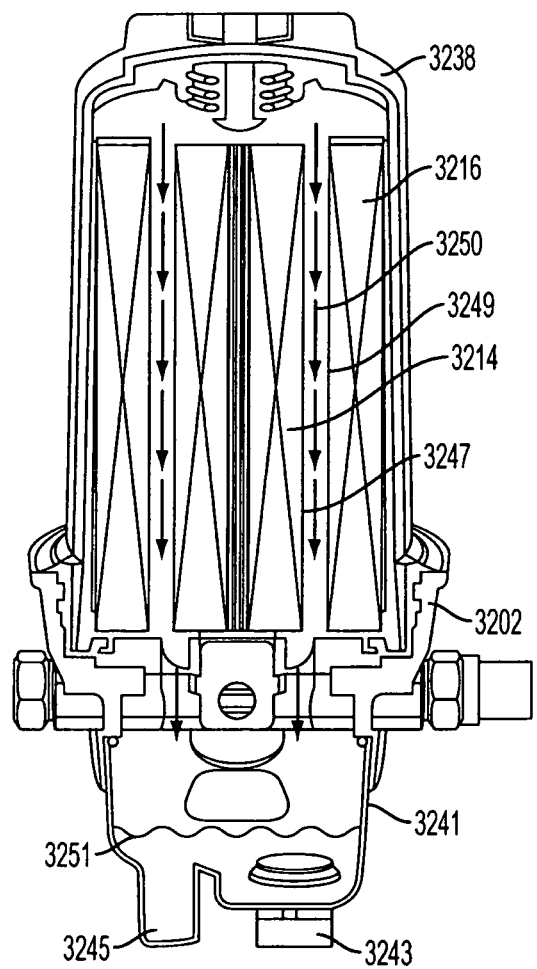
FIG. 59 is a cross-sectional view of another embodiment of the filter apparatus with water separation.

The filter apparatus may also include water separation. Referring to FIG. 59, in this embodiment, the filter is shown with the dome 3238 in an upward position. The filter apparatus may include a bowl 3241 connected to the base 3202. The bowl may include a drain knob 3243 and a water indicator 3245. The filter may include a coalescing material 3247 on the output side of the inner media pack 3214 and a coalescing material 3249 on the output side of the outer media pack 3216. The coalescing material causes the water to coalesce into larger droplets and flow to the bowl 3241 as shown by arrows 3250. The water 3251 accumulates at the bottom of the bowl 3241 where it may be drained using the drain knob 3243. This configuration may be used with any of the embodiments disclosed herein, as appropriate.

Figure 61:
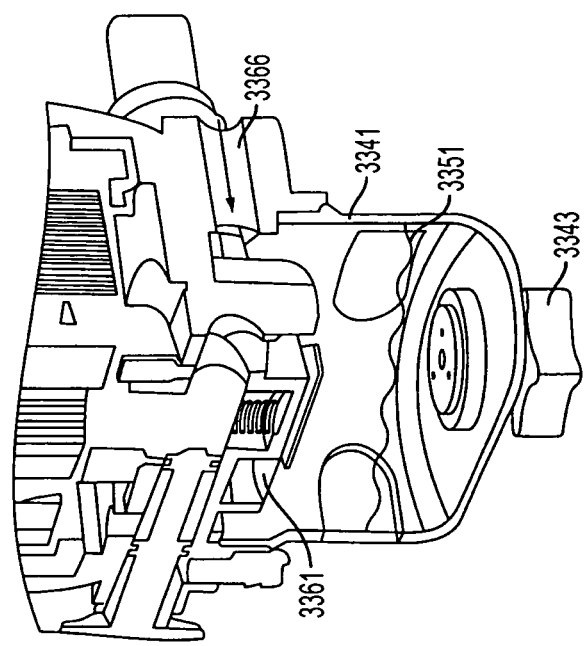
FIG. 61 is another view of the embodiment shown in FIG. 60.
Figure 60:
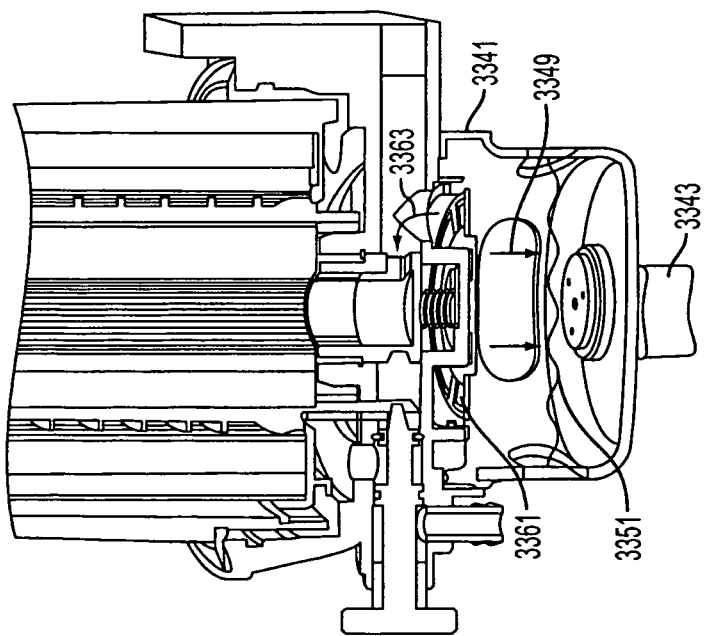
FIG. 60 shows another embodiment of the filter apparatus with water separation.

Referring to FIGS. 60 and 61, another embodiment of water separation is shown. In this embodiment the filter apparatus is shown with the dome in the up position. The bowl 3341 may include a water stripping screen 3361. The fuel and water mixture would enter the bowl through the inlet port 3366. The fuel and water mixture would enter the bowl and then pass upwards through the screen 3361. The fuel and water mixture would continue upwards toward the filter as shown by arrow 3363 in FIG. 60. The water would be stripped from the fuel water mixture by the water stripping screen 3361. The water would then travel towards the bottom of the bowl as shown by arrows 3349. The water 3351 would then accumulate at the bottom of the bowl and could be drained using the drain knob 3343. This configuration could be used with any of the embodiments disclosed herein, as appropriate.

Figure 62:
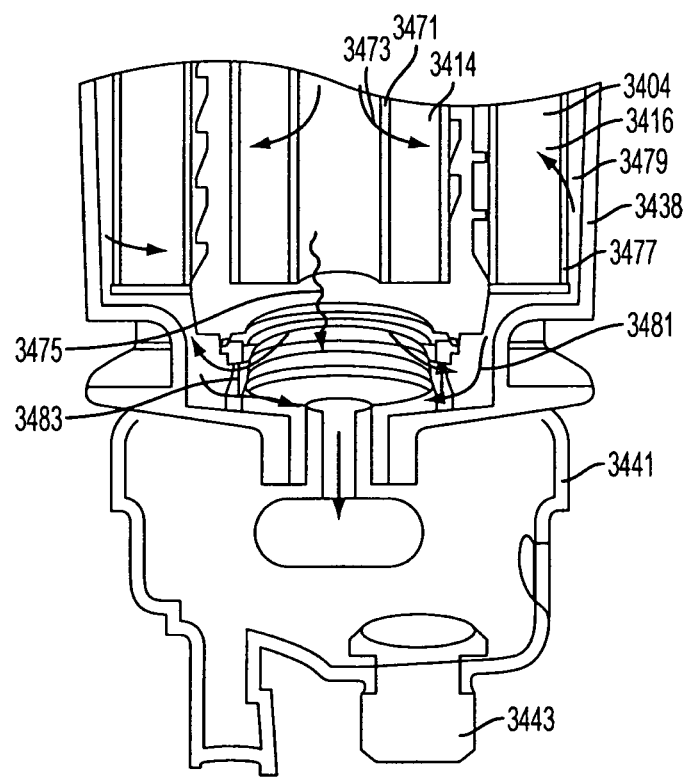
FIG. 62 is a cross-sectional view of another embodiment with water separation.

Water separation may also be used in a dome down situation. Referring to FIG. 62, the filter apparatus may include a bowl 3441 connected to the dome 3438. The filter element 3404 may include a coalescing material 3471 at the interior of the inner media pack 3414. Thus, the fuel and water mixture as shown by arrow 3473 will engage the coalescing material 3471 and cause the water as shown by arrow 3475 to fall into the bowl 3441. The outer media pack 3416 may include a coalescing material 3477 on the outer surface. As the fuel water mixture as shown by arrow 3479 engages the coalescing material 3477, the coalescing material separates the water as shown by arrow 3481 which then falls to the bowl 3441. As noted above, the water may be drained from the bowl 3441 by using the knob 3443. In another embodiment, coalescing screens 3483 may be placed at the openings in the retainer clip or similar structure. These coalescing screens would separate the water prior to engaging the outer media pack 3416. The coalescing screens 3483 may be used instead of the coalescing material 3477 or may be used in conjunction with the coalescing material 3477 on the outer media pack 3416. These configurations may be used with other embodiments disclosed herein, as appropriate.

Figure 63:
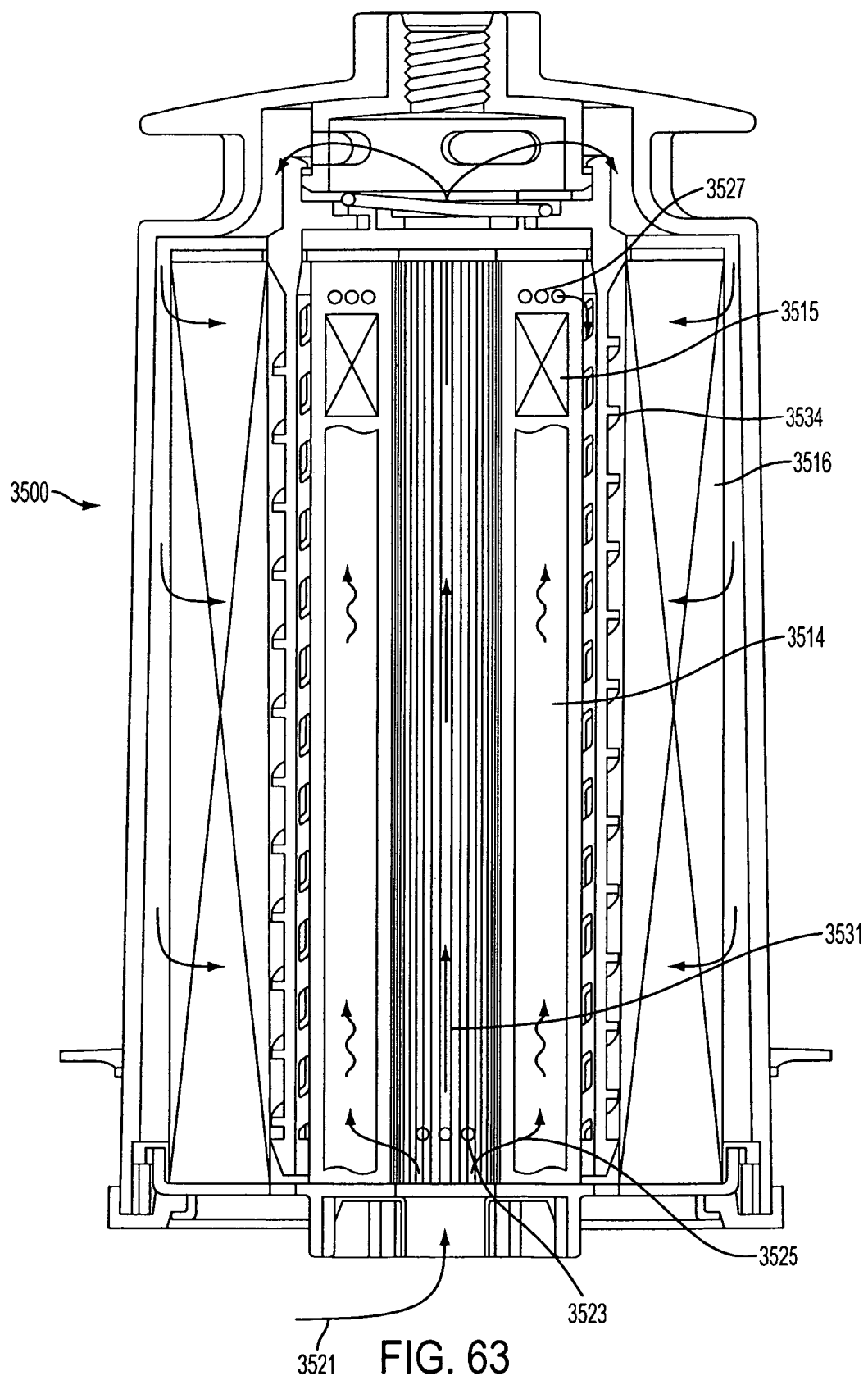
FIG. 63 is a cross-sectional view of another embodiment with different filter media packs.

As noted above, the filter apparatus may include various filter media. Referring to FIG. 63, one embodiment of the filter apparatus is shown. The filter apparatus 3500 may include a first inner media material 3514, a second inner media material 3515 and an outer media material 3516. In one embodiment the media material 3514 may be a fluid conditioning material. For example, the media 3514 may be an acid neutralizing material such as calcium carbonate. The second inner media material 3515 may be a filter material. In addition, the outer media pack 3516 may also be a filter material. The inlet fluid flow is represented by arrow 3521. A portion of the inlet flow will create a by-pass flow as shown by arrow 3525 and enter the filter media 3514 at holes 3523. The by-pass flow 3523 will continue through the second inner filter 3515 and exit at the holes 3527 to proceed along the flow tube 3534. The remaining flow 3531 will continue upwards and pass through the filter media pack 3516 before it enters the flow tube 3534. The media 3514, 3515 and 3516 may include many different media, such as pleated cellulose, spun bonded polyester, impregnated films, synthetic nanofibers, chemical treatment beds, depth type beds of recycled material, coalescing screens, and composite materials. These media may be used in a variety of combinations. This configuration may be used in any of the embodiments disclosed herein, as appropriate.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any element not expressly described herein as being essential to the practice of the invention. For example, the use of the term "weldment" in context with describing certain preferred embodiments of the invention is not intended to limit the invention to structures constructed by welding, or to structures formed from multiple components.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventor intend for the invention to be practiced otherwise than as specifically described herein. Accordingly, this invention includes all modifications and equivalents of the subject matter recited or suggested herein as permitted by applicable law. Moreover, any combination of the above-described elements in all possible variations thereof is encompassed by the invention unless otherwise indicated herein or otherwise clearly contradicted by context.

What is claimed is:

1. A filter cartridge for filtering particles in a fluid, the filter cartridge comprising:
a generally cylindrical filter element having a first end cap, a second end cap, and a filter media pack, the filter media pack having a first end and a second end, the first end cap being coupled to the first end and the second end cap being coupled to the second end, the first end cap having a filter element key disposed on an outer periphery of the first end cap; and
a filter housing having a sidewall for surrounding the filter element when the filter element is disposed within the filter housing and an opening to allow the filter element to be inserted into and removed from the filter housing, the sidewall having an inner surface, the inner surface having a filter housing key;
such that when the filter element is disposed within the filter housing and the filter element key is engaged with the filter housing key, the engagement between the filter element key and the filter housing key restricts rotational movement of the filter element relative to the filter housing such that the filter element cannot be rotated to a position to remove the filter element from the filter housing;
a biasing element operably acting on the filter element to bias the filter element out of the opening, wherein the filter element is insertable into the filter housing by inserting the filter element through the opening and compressing the biasing element, rotating the filter element relative to the filter housing, and releasing the filter element such that the filter element key is axially engaged with the filter housing key under biasing force of the biasing element.

2. The filter cartridge of claim 1 wherein when the filter element is disposed within the filter housing and the filter element key is engaged with the filter housing key, the filter element is prevented from moving in a direction toward the opening.

3. The filter cartridge of claim 1 wherein when the filter element is disposed within the filter housing and the filter element key is engaged with the filter housing key, rotational movement of the filter element relative to the filter housing is substantially prevented in both angular directions.

4. The filter cartridge of claim 1 wherein at least one of the filter element key and the filter housing key is generally u-shaped and axially receives the other one of the filter element key and the filter housing key when the filter element key and the filter housing key are engaged.

5. The filter cartridge of claim 1 wherein the filter element comprises a plurality of filter element keys and the filter housing comprises a plurality of filter housing keys.

6. The filter cartridge of claim 5 wherein at least two of the plurality of filter element keys have unequal lengths.

7. The filter cartridge of claim 5 wherein at least two of the plurality of filter housing keys have unequal lengths.

8. The filter cartridge of claim 5 wherein the filter housing further comprises intermediate openings disposed between the plurality of filter housing keys for receiving the plurality of filter element keys when the filter element is inserted into and removed from the filter housing; and wherein the filter element further comprises intermediate openings disposed between the plurality of filter element keys for receiving the plurality of filter housing keys when the filter element is inserted into and removed from the filter housing.

9. The filter cartridge of claim 1 wherein at least one of the filter element key and the filter housing key comprises a locking tab for restricting rotational movement of the filter element relative to the filter housing such that when the filter element is disposed within the filter housing and the filter element key is engaged with the filter housing key, the filter element cannot be rotated to a position to remove the filter element from the filter housing.

10. The filter cartridge of claim 1 wherein the filter housing sidewall further comprises an outer surface and a key disposed on the outer surface for engaging a filter base.

11. The filter cartridge of claim 1 wherein the filter element is removable from the filter housing by moving the filter element in a direction away from the opening and compressing the biasing element, rotating the filter element, and moving the filter element out of the filter housing through the opening.

12. The filter cartridge of claim 1, wherein the filter element includes a locking feature having a locking recess, whereby the locking recess is engageable by a locking structure in a filter base to substantially prevent rotational movement of the filter element when the filter element is coupled to the filter base.

13. The filter cartridge of claim 12 wherein the first end cap includes the locking feature.

14. The filter cartridge of claim 12 further comprising a flow tube and wherein the flow tube includes the locking feature.

15. The filter cartridge of claim 1, wherein the filter element key defines a recess and the filter housing key is axially received within the recess when the filter housing key engages the filter element key, such that the filter element is prevented from moving in either angular direction relative to the filter housing when the filter housing and filter element keys are engaged.

16. The filter cartridge of claim 1, wherein the filter element key includes at least one locking tab that extends axially away from the second end cap.

17. The filter cartridge of claim 16, wherein the filter housing key is formed from at least a pair of radially inward projections forming an axial slot angularly therebetween, the slot axially receiving the at least one locking tab when the filter element and filter housing keys are engaged such that rotational motion between the filter element and filter housing is prevented in either angular direction.

18. The filter cartridge of claim 17, wherein the filter element key defines a recess and at least one of the radially inward projections of the filter housing key is axially received within the recess when the filter housing key engages the filter element key.

19. The filter cartridge of claim 18, wherein the filter element key is angularly larger than the axial slots such that the filter element key cannot pass axially therethrough to remove the filter element from the filter housing.

20. The filter cartridge of claim 17, wherein the at least one locking tab includes first and second locking tabs connected to one another and angularly spaced apart from one another, the pair of locking tabs forming the recess therebetween.

21. The filter cartridge of claim 20, wherein the first locking tab has an axial dimension that is greater than the second locking tab.

22. The filter cartridge of claim 15, further comprising a biasing element axially biasing the filter element key into the recess in the filter housing key when the filter element key is engaged with the filter housing key.

23. The filter cartridge of claim 18, further comprising a biasing element axially biasing the filter element key into the recess in the filter housing key when the filter element key is engaged with the filter housing key.

24. The filter cartridge of claim 1, wherein the filter housing is configured to be releasably joined to a filter base, the engagement between the filter element key and the filter housing key restricts rotational movement of the filter element relative to the filter housing such that the filter element cannot be rotated to a position to remove the filter element from the filter housing when the filter housing is removed from the filter base.

25. A filter cartridge for filtering particles in a fluid, the filter cartridge comprising:
- a generally cylindrical filter element having a first end cap, a second end cap, and a filter media pack, the filter media pack having a first end and a second end, the first end cap being coupled to the first end and the second end cap being coupled to the second end, the first end cap having a filter element key disposed on an outer periphery of the first end cap; and
- a filter housing having a sidewall for surrounding the filter element when the filter element is disposed within the filter housing and an opening to allow the filter element to be inserted into and removed from the filter housing, the sidewall having an inner surface, the inner surface having a filter housing key, the filter housing being configured to be releasably connected to a filter base;
- wherein when the filter element is disposed within the filter housing and the filter housing is not connected to the filter base and the filter element key is engaged with the filter housing key, rotational movement of the filter element relative to the filter housing is restricted such that the filter element cannot be rotated to a position to remove the filter element from the filter housing when the filter housing is not connected from the filter base;
- a biasing element operably acting on the filter element to bias the filter element out of the opening, wherein the filter element is insertable into the filter housing by inserting the filter element through the opening and compressing the biasing element, rotating the filter element relative to the filter housing, and releasing the filter element such that the filter element key is axially engaged with the filter housing key under biasing force of the biasing element.

\* \* \* \* \*